US006453354B1

(12) United States Patent
Jiang et al.

(10) Patent No.: US 6,453,354 B1
(45) Date of Patent: *Sep. 17, 2002

(54) FILE SERVER SYSTEM USING CONNECTION-ORIENTED PROTOCOL AND SHARING DATA SETS AMONG DATA MOVERS

(75) Inventors: Xiaoye Jiang, Shrewsbury; Uresh K. Vahalia, Waban; Uday Gupta, Westford; Percy Tzelnic, Concord, all of MA (US)

(73) Assignee: EMC Corporation, Hopkinton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,626

(22) Filed: Mar. 3, 1999

(51) Int. Cl.[7] .............................................. C06F 15/16
(52) U.S. Cl. ...................................... 709/229; 709/213
(58) Field of Search ............................ 707/10; 709/201, 709/203, 213, 217, 223, 229, 219, 234; 713/201

(56) References Cited

U.S. PATENT DOCUMENTS

| 5,774,660 | A | * | 6/1998 | Brendel et al. ............. 709/201 |
| 5,950,203 | A | | 9/1999 | Stakuis et al. ................ 707/10 |
| 6,085,234 | A | * | 7/2000 | Pitts et al. .................. 709/217 |
| 6,161,104 | A | * | 12/2000 | Stakutis et al. ............... 707/10 |
| 6,167,446 | A | * | 12/2000 | Lister et al. ................ 709/223 |
| 6,185,601 | B1 | * | 2/2001 | Wolff .......................... 709/203 |
| 6,192,408 | B1 | * | 2/2001 | Vahalia et al. .............. 709/229 |
| 6,212,640 | B1 | * | 3/2001 | Abedelnur .................. 713/201 |
| 6,230,190 | B1 | * | 5/2001 | Edomonds et al. ......... 709/213 |
| 6,269,431 | B1 | * | 7/2001 | Dunham ..................... 711/162 |
| 6,298,386 | B1 | * | 10/2001 | Vahalia et al. .............. 709/234 |

OTHER PUBLICATIONS

CIFS: A Common Internet System, from the Microsoft Interactive Developer, issued Nov. 1996, by Paul Leach and Dan Perry.*

* cited by examiner

Primary Examiner—N. Le
Assistant Examiner—Walter Benson
(74) Attorney, Agent, or Firm—Howrey Simon Arnold & White, LLP

(57) ABSTRACT

A first data mover computer services data access requests from a network client, and a second data mover computer is coupled to the first data mover computer for servicing data access requests from the first data mover computer. The first data mover computer uses a connection-oriented protocol to obtain client context information and to respond to a session setup request from the client by authenticating the client. Then the first data mover computer responds to a file system connection request from the client by forwarding the client context information and the file system connection request to the second data mover computer. Then the first data mover computer maintains a connection between the first data mover computer and the second data mover computer when the client accesses the file system and the first data mover computer passes file access requests from the client to the second data mover computer and returns responses to the file access requests from the second data mover computer to the client. In a preferred embodiment, the connection-oriented protocol is the Common Internet File System (CIFS) Protocol, and multiple clients share a Transmission Control Protocol (TCP) connection between the first data mover computer and the second data mover computer by allocation of virtual channels within the shared TCP connection and multiplexing of data packets of the virtual channels over the shared TCP connection.

38 Claims, 22 Drawing Sheets

FILE SERVER SYSTEM USING CONNECTION-ORIENTED PROTOCOL AND SHARING DATA SETS AMONG DATA MOVERS

BACKGROUND OF THE INVENTION

1. Field of the Invention

The present invention relates generally to data storage systems, and more particularly to network file servers.

2. Background Art

Mainframe data processing, and more recently distributed computing, have required increasingly large amounts of data storage. This data storage is most economically provided by an array of low-cost disk drives integrated with a large semiconductor cache memory. Such cached disk arrays were originally introduced for use with IBM host computers. A channel director in the cached disk array executed channel commands received over a channel from the host computer.

More recently, the cached disk array has been interfaced to a data network via at least one data mover computer. The data mover computer receives data access commands from clients in the data network in accordance with a network file access protocol such as the Network File System (NFS). (NFS is described, for example, in RFC 1094, Sun Microsystems, Inc., "NFS: Network File Systems Protocol Specification," Mar. 1, 1989.) The data mover computer performs file locking management and mapping of the network files to logical block addresses of storage in the cached disk storage subsystem, and moves data between the client and the storage in the cached disk storage subsystem.

In relatively large networks, it is desirable to have multiple data mover computers that access one or more cached disk storage subsystems. Each data mover computer provides at least one network port for servicing client requests. Each data mover computer is relatively inexpensive compared to a cached disk storage subsystem. Therefore, multiple data movers can be added easily until the cached disk storage subsystem becomes a bottleneck to data access. If additional storage capacity or performance is needed, an additional cached disk storage subsystem can be added. Such a storage system is described in Vishlitzky et al. U.S. Pat. No. 5,737,747 issued Apr. 7, 1998, entitled "Prefetching to Service Multiple Video Streams from an Integrated Cached Disk Array," incorporated herein by reference.

Unfortunately, data consistency problems may arise if concurrent client access to a read/write file is permitted through more than one data mover. These data consistency problems can be solved in a number of ways. For example, as described in Vahalia et al., U.S. Pat. No. 5,893,140 issued Apr. 6, 1999, entitled "File Server Having a File System Cache and Protocol for Truly Safe Asynchronous Writes," incorporated herein by reference, locking information can be stored in the cached disk array, or cached in the data mover computers if a cache coherency scheme is used to maintain consistent locking data in the caches of the data mover computers. However, as shown in FIG. 1, labeled "Prior Art," a more elegant solution to the data consistency problem has been implemented at EMC Corporation in a network file server system having multiple stream server computers and one or more cached disk arrays.

FIG. 1 shows a network file server system having at least two data mover computers 21 and 22. The first data mover 21 has exclusive access to read/write files in a first file system 23, and the second data mover 22 has exclusive access to read/write files in a second file system 24. As shown, the file systems 23, 24 are respective volumes of data contained in the same cached disk array 25, although alternatively each file system 23, 24 could be contained in a respective one of two separate cached disk arrays. For example, each of the data mover computers 21, 22 has a respective high-speed data link to a respective port of the cached disk array 25. The cached disk array 25 is configured so that the file system 23 is accessible only through the data port connected to the first data mover 21 and so that the file system 24 is accessible only through the data port connected to second data mover 22. Each of the data movers 21, 22 maintains a directory of the data mover ownership of all of the files in the first and second file systems 23, 24. In other words, each of the data movers maintains a copy of the file system configuration information in order to recognize which data mover in the system has exclusive access to a specified read/write file.

Each of the data movers 21, 22 may receive file access requests from at least one network client. For example, the first data mover 21 has a network port 28 for receiving file access requests from a first client 26, and the second data mover 22 has a network port 29 for receiving file access requests from a second client 27. The clients 26, 27 communicate with the data movers using the connection-oriented NFS protocol. Whenever the data mover 21 receives a file access request from the client 26, it checks the configuration directory to determine whether or not the file specified by the request is in a file system owned by the data mover 21. If so, then the data mover 21 places a lock on the specified file, accesses the file in the file system 23, and streams any read/write data between the client 26 and the file system 23. If the file specified by the request is not a file system owned by the data mover 21, then the data mover 21 forwards the request to the data mover that owns the file system to be accessed. For example, if the client 26 requests access to a file in the file system 24, then the first data mover 21 forwards the file access request to the second data mover 22. The second data mover 22 places a lock on the file to be accessed, the second data mover accesses the file, and the second data mover streams any read/write data between the first data mover 21 and the file in the file system 24. The first data mover then streams the read/write data between the second data mover 22 and the client 26. The second data mover 22 responds to file access requests from its client 27 in a similar fashion, by directly servicing file access request to files in the file system 24 that it owns, or forwarding to other data movers the requests for access to the files in file systems that it does not own.

The solution as shown in FIG. 1 is rather efficient because the data movers 21, 22 can be linked by a dedicated high-speed data link for the exchange of read/write data between them. Therefore, there is no additional loading of the data network between the data movers and the clients and no additional loading of the data links between the cached disk array 25 and the data movers 21, 22. The data movers can cache the file access information (e.g., file locks) and file data and attributes for the files that they own, so that the loading on the data links between the cached disk array and the data movers 21, 22 can be somewhat reduced. In the network file system implemented at EMC Corporation, when a data mover did not own the file system to be accessed, the data mover forwarded to or exchanged NFS data packets with the data mover that owned the file system to be accessed. Such a system was relatively easy to implement, since it involved creating a proxy router routine that would recognize whether or not a NFS data packet from a client was for access to a file system owned by another data mover, and if so, routing the data packet to the data mover that owned the file system. The data mover owning the file system could treat the forwarded data packet in a fashion similar to a data packet received directly from a client.

Although the system of FIG. 1 is satisfactory for handling NFS file access requests, it has a number of limitations that will become increasingly significant. The current trend is toward higher-speed network links and interconnection technology, such as technology for the Fibre-Channel standards being developed by the American National Standards Institute (ANSI). In a network employing high-speed links and interconnection technology, the delays inherent in a connectionless communications protocol such as NFS become more pronounced.

The Internet uses a connection-oriented protocol known as the Transmission Control Protocol (TCP/IP). In order to provide read/write file sharing over the Internet, the Internet Network Working Group has drafted a specification for a Common Internet File System (CIFS) Protocol. The CIFS protocol is described, for example, in Paul L. Leach and Dilip C. Naik, "A Common Internet File System," Microsoft Corporation, Dec. 19, 1997, incorporated herein by reference. The status of development of CIFS is posted on the Internet at http://www.microsoft.com/workshop/networking/cifs/default.asp. CIFS is touted as incorporating the same high-performance, multi-user read and write operations, locking, and file-sharing semantics that are the backbone of today's sophisticated enterprise computer networks.

According to the CIFS protocol specification of Leach and Naik, p. 14–15, protocol dialects of NT LM 0.12 and later support distributed file system operations. The distributed file system is said to give a way for this protocol to use a single consistent file naming scheme which may span a collection of different servers and shares. The distributed file system model employed is a referral-based model. This protocol specifies the manner in which clients receive referrals. The client can set a flag in the request server message block (SMB) header indicating that the client wants the server to resolve this SMB's paths within the distributed file system known to the server. The server attempts to resolve the requested name to a file contained within the local directory tree indicated by the tree identifier (TID) of the request and proceeds normally. If the request pathname resolves to a file on a different system, the server returns the following error: "STATUS_DFS_PATH_NOT_COVERED—the server does not support the part of the DFS namespace needed to resolved the pathname in the request." The client should request a referral from this server for further information. A client asks for a referral with the TRANS2_DFS_GET_REFERRAL request containing the DFS pathname of interest. The response from the server indicates how the client should proceed. The method by which the topological knowledge of the DFS is stored and maintained by the servers is not specified by this protocol.

SUMMARY OF THE INVENTION

In accordance with one aspect of the invention, there is provided a method of operating a data mover computer using a connection-oriented protocol for permitting a client to access a file system. A network file server system has at least a first data mover computer coupled to a data network for servicing data access requests from at least one network client, and at least a second data mover computer coupled to the first data mover computer for servicing data access requests from the first data mover computer. At least one file system in data storage is accessible to the second data mover computer. The first data mover computer uses the connection-oriented protocol to obtain client context information and to respond to a session setup request from the client by authenticating the client. Then the first data mover computer responds to a file system connection request from the client by forwarding the client context information and the file system connection request to the second data mover computer. Then the first data mover computer maintains a connection between the first data mover computer and the second data mover computer when the client accesses the file system and the first data mover computer passes file access requests from the client to the second data mover computer and returns responses to the file access requests from the second data mover computer to the client.

In accordance with another aspect of the invention, there is provided a method of operating a data mover computer to use the Common Internet File System (CIFS) Protocol for maintaining a connection with a client for permitting the client to access a file system. A network file server system has at least a first data mover computer coupled to a data network for servicing data access requests from at least one network client, and at least a second data mover computer coupled to the first data mover computer for servicing data access requests from the first data mover computer. At least one file system in data storage is accessible to the second data mover computer. The first data mover computer uses the Common Internet File System (CIFS) Protocol to respond to a negotiate request from the client and to respond to a session setup request from the client to authenticate the client and assign a user identification for a client session. Then the first data mover computer responds to a file system connection request from the client by assigning a tree identifier and forwarding the user identification for the client session and the tree identifier and the file system connection request to the second data mover computer. Then the first data mover computer maintains a connection between the first data mover computer and the second data mover computer when the client accesses the file system and the first data mover computer passes file access requests from the client to the second data mover computer and returns responses to the file access requests from the second data mover computer to the client.

In accordance with still another aspect of the invention, there is provided a method of operating a data mover computer to use the Common Internet File System (CIFS) Protocol for maintaining a connection with a client for permitting the client to access a file system. A network file server system has at least a first data mover computer coupled to a data network for servicing data access requests from at least one network client, and at least a second data mover computer coupled to the first data mover computer for servicing data access requests from the first data mover computer. At least one file system in data storage is accessible to the second data mover computer. The first data mover computer uses the Common Internet File System (CIFS) Protocol to respond to a negotiate request from the client and to respond to a session setup request from the client to authenticate the client and assign a user identification for a client session. Then the first data mover computer responds to a file system connection request from the client by assigning a tree identifier and forwarding the user identification for the client session and the tree identifier and the file system connection request to the second data mover computer. Then the first data mover computer maintains a connection between the first data mover computer and the second data mover computer when the client accesses the file system and the first data mover computer passes file access requests from the client to the second data mover computer and returns responses to the file access requests from the second data mover computer to the client. The first data mover computer forwards the user identification for the client session and the tree identifier and the file system connection request to the second data mover computer by appending stream context information to the file system connection request and forwarding the file system connection request including the appended stream context information to the second data mover computer. The stream context information includes the user identification for the client session, the tree identifier, a server message block (SMB) protocol dialect, a maximum SMB message packet size, and access credentials associated with the user identification. Multiple clients of the first data mover computer request access to file systems accessed through the second data mover computer and the multiple clients share at least one Transmission Control Protocol (TCP) connection between the first data mover computer and the second data mover computer by allocation of virtual channels within the shared TCP connection. Data packets of more than one of the virtual channels are multiplexed over the shared TCP connection.

In accordance with another aspect of the invention, there is provided a network file server. The network file server includes a first data mover computer having a port for coupling to a data network for servicing data access requests from at least one network client, and at least a second data mover computer coupled to the first data mover computer for servicing data access requests from the first data mover computer. At least one file system in data storage is accessible to the second data mover computer. The first data mover computer is programmed to use a connection-oriented protocol for maintaining a connection with the client for permitting the client to access the file system. The first data mover computer is programmed for using the connection-oriented protocol to obtain client context information and to respond to a session setup request from the client by authenticating the client, and then responding to a file system connection request from the client by forwarding the client context information and the file system connection request to the second data mover computer, and then maintaining a connection between the first data mover computer and the second data mover computer when the client accesses the file system and the first data mover computer passes file access requests from the client to the second data mover computer and returns responses to the file access requests from the second data mover computer to the client.

In accordance with still another aspect of the invention, there is provided a program storage device containing a program for at least a first data mover computer in a network file server. The first data mover computer has a port for coupling to a data network for servicing data access requests from at least one network client. The first data mover computer is coupled to at least a second data mover computer for servicing data access requests from the first data mover computer. At least one file system in data storage is accessible to the second data mover computer. The program is executable by the first data mover computer for using a connection-oriented protocol for maintaining a connection with the client for permitting the client to access the file system. The program is executable by the first data mover computer for using the connection-oriented protocol to obtain client context information and to respond to a session setup request from the client by authenticating the client, and then responding to a file system connection request from the client by forwarding the client context information and the file system connection request to the second data mover computer, and then maintaining a connection between the first data mover computer and the second data mover computer when the client accesses the file system and the first data mover computer passes file access requests from the client to the second data mover computer and returns responses to the file access requests from the second data mover computer to the client.

BRIEF DESCRIPTION OF THE DRAWINGS

Additional features and advantages of the invention will be described below with reference to the drawings, in which.

Figure 1:
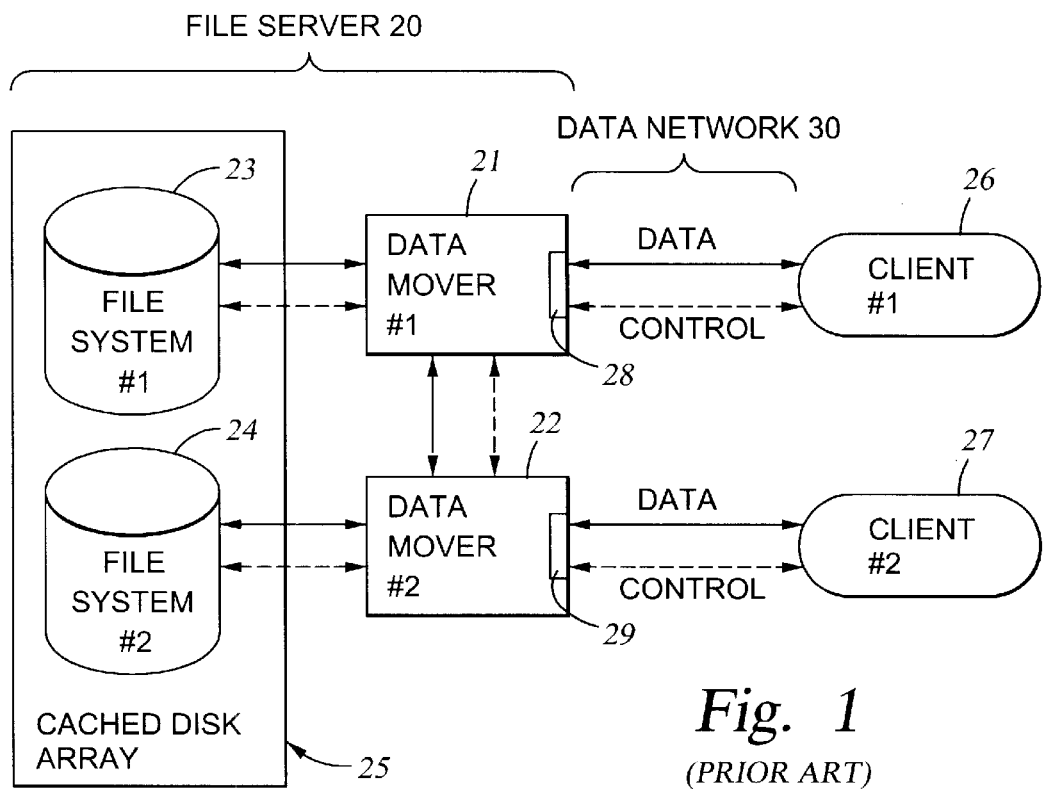
FIG. 1 is a block diagram of a Prior Art file server including a cached disk array and a plurality of data mover computers.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

I. Introduction to Network File Server Architectures for Shared Data Access

A number of different network file server architectures have been developed that can be used individually or in combination in a network to provide different performance characteristics for file access by various clients to various file systems. In general, the increased performance is at the expense of additional network links and enhanced software.

FIG. 1 shows the basic architecture of a file server 20 that has been used to permit clients 26, 27 to access the same read/write file through more than one data mover computer 21, 22. As described above in the section entitled "Background of the Invention," this basic network file server architecture has been used with the NFS protocol. NFS has been used for the transmission of both read/write data and control information. The solid interconnection lines in FIG. 1 represent the transmission of read/write data, and the dashed interconnection lines in FIG. 1 represent the transmission of control information. The NFS protocol has been used for the transmission of data and control over the data network 30 between the data movers 21, 22 and also between each data mover 21, 22 and the client 26 or clients connected to the data mover through the data network. NFS data packets transmitted between the data movers 21, 22 were substantially the same as data packets that were transmitted between the data movers 21, 22 and the clients 26, 27. If a data mover did not own the file system including the file to be accessed, it functioned as a proxy router by forwarding the NFS data packets from the client to the data mover that owned the file system, and by forwarding to the client any data packets returned from the data mover that owned the file system.

As will be described in detail below, the basic network file server architecture of FIG. 1 can be used with a connection-oriented protocol such as CIFS to enable clients to access the same read/write file through more than one data mover computer. In this case, when a data mover 21 receives from one of its clients 26 a request to access a file in a file system 24 that it does not own, then the data mover 21 maintains a connection to its client 26 and also maintains a connection with the data mover 22 that owns the file system 24 to be accessed. The data mover 21 that does not own the file system 24 to be accessed maintains a proxy or virtual connection between its client 26 and the data mover 22 that owns the file system 24 to be accessed.

Figure 2:
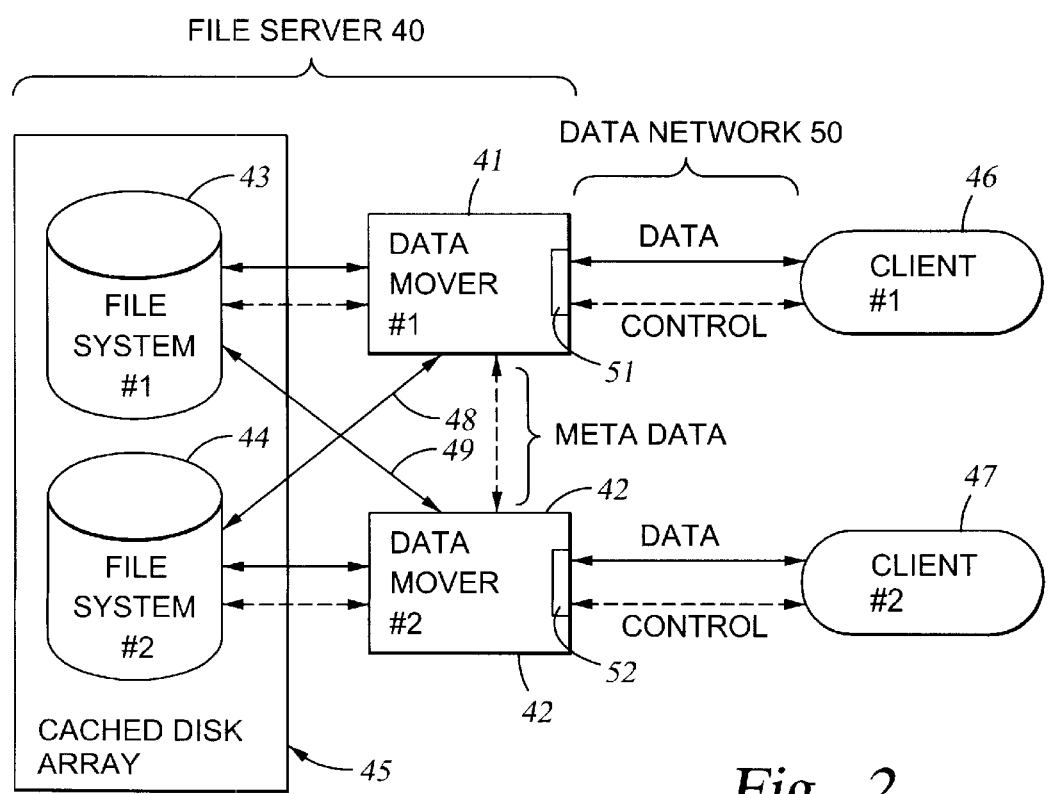
FIG. 2 is a block diagram of a file server in which a secondary data mover request a distributed file lock from a primary data mover that owns the file, and receives metadata from the primary data mover in order to directly access the file in data storage of the file server.

Referring to FIG. 2, there is shown a network file server 40 that may provide a significant improvement in data access time by using a data bypass path around the data mover that owns the file system during the transmission of read/write data. The network file server includes at least two data movers 41, 42 that access at least two file systems 43, 44 in storage of a cached disk array 45. The first data mover 41 owns the file system 43, and the second data mover 42 owns the second file system 44. The file server 40 is linked by a data network 50 to a plurality of clients 46, 47. The first data mover 41 has a network port 51 for receiving file access requests from at least one client 46, and the second data mover 42 has a network port 52 for receiving file access requests from at least one other client 47.

In contrast to FIG. 1, the network file server architecture in FIG. 2 includes a data bypass path 48 between the first data mover 41 and the second file system 44 in order to bypass the second data mover 42, and a data bypass path 49 between the second data mover 42 and the first file system 43 in order to bypass the first data mover 41. It is possible for each of the data movers 41, 42 to access data in each of the file systems 43, 44, but if a data mover does not own the file access information for the file system to be accessed, then the data mover should ask the owner for permission to access the file system, or else a data consistency problem may arise. For example, when the first data mover 41 receives a file access request from its client 46, it accesses its directory of file ownership information to determine whether or not it owns the file system to be accessed. If the first data mover 41 does not own the file system to be accessed, then the first data mover 41 sends a metadata request to the data mover that owns the file system to be accessed. For example, if the first client 46 requests access to the second file system 44, then the first data mover 41 sends a metadata request to the second data mover 42.

The term metadata refers to information about the data, and the term metadata is inclusive of file access information and file attributes. The file access information includes the locks upon the files or blocks of data in the files. The file attributes include pointers to where the data is stored in the cached disk array. The communication of metadata between the data movers 41, 42 is designated by the dotted line interconnection in FIGS. 1 to 4.

In response to a metadata request, the data mover owning the file system accesses file access information and file attributes in a fashion similar to the processing of a file access request, but if the file access request is a read or write request, then the data mover owning the file does not read or write data to the file. Instead of reading or writing data, the data mover owning the file system places any required lock on the file, and returns metadata including pointers to data in the file system to be accessed. For example, once the first data mover 41 receives the pointers to the data to be accessed in the second file system 44, then the first data mover communicates read or write data over the bypass path 48. For a read operation, the first data mover 41 sends a read command over the data bypass path 48 to the file system 44. In response, read data from the file system 44 is returned over the data bypass path 48, and the first data mover 41 forwards the read data to the first client 46. For a write operation, the first data mover 41 receives write data from the first client, and forwards the write data over the data bypass path 48 to be written in the second file system 44. The first data mover 41 transmits the write data in a write command including the pointers from the metadata received from the second data mover 42.

If a write operation changes any of the file attributes, then the new file attributes are written from the first data mover 41 to the second data mover, and after the write data is committed to the second file system 44, the second data mover 42 commits any new file attributes by writing the new file attributes to the file system. As described in the above-referenced Vahalia et al., U.S. Pat. No. 5,893,140 issued Apr. 6, 1999, a data security problem is avoided by writing any new file attributes to storage after the data are written to storage. If the network communication protocol supports asynchronous writes, it is possible for a data mover that does not own a file system to cache read or write data, but in this case any data written to the cache should be written down to the nonvolatile storage of the file system and the cache. invalidated just prior to releasing the lock upon the file system. Otherwise, data in the cache of a data mover that does not own a file system may become inconsistent with current data in the file system or in a cache of another data mover.

The network file server architecture of FIG. 2 may appear more complex than the architecture of FIG. 1 due to the presence of the bypass data paths 48 and 49 in FIG. 2. In practice, however, the bypass data paths can be paths that are internal to and inherent in the single cached disk array 45 that contains the first file system 43 and the second file system 44. These data paths are inherent in the cached disk array 45 since the first file system 43 and the second file system 44 share a cache in the cached disk array, and therefore the bypass data paths 48, 49 can be enabled by programming the configuration of cached disk array 45 to permit the first file system 43 to be accessed from the port of the cached disk array connected to the first data mover 41 and also from the port of the cached disk array connected to the second data mover 42, and to permit the second file system 44 to be accessed from the port of the cached disk array connected to first data mover 41 and also from the port of the cached disk array connected to the second data mover 42.

Figure 3:
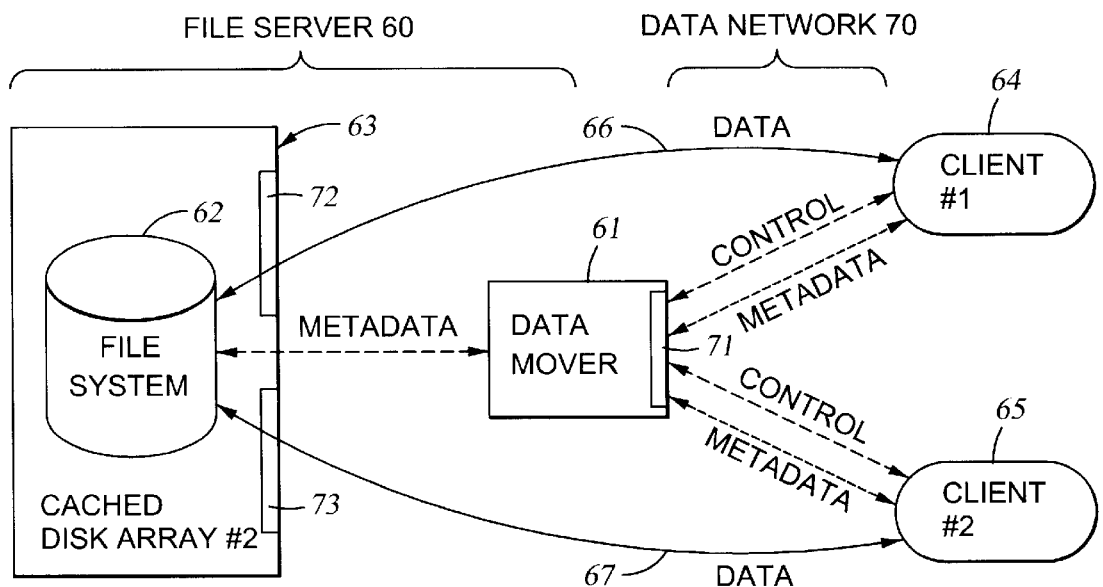
FIG. 3 is a block diagram of a data storage network in which a client requests a distributed file lock from a file server and receives metadata from the server in order to directly access the file in data storage of the file server.

Referring to FIG. 3, there is shown yet another network file server architecture. In this example, a file server 60 includes a data mover 61 and data storage such as a file system 62 in a cached disk array 63. The data mover 61 owns the file system 62, and the data mover 61 exchanges metadata with the file system 62. The data mover 61 has at least one network port 71 connected through the data network 70 to a first client 64 and a second client 65. As shown, one network port 71 is shared among requests from the clients 64, 65, although a separate respective network port could be provided for each of the clients 64, 65. Each client 64, 65 also has a respective bypass data path 66, 67 that bypasses the data mover 61 for reading data from and writing data to the file system 62. As shown, the cached disk array 63 has one network port 72 for the bypass data path 66, and another network port 73 for the bypass data path 67. Alternatively, the two bypass data paths 66, 67 could share one network port of the cached disk array 63, although such sharing could limit the maximum data transfer rate to the data storage in the cached disk array 63 for simultaneous data access by the clients 64, 65. Before reading or writing to the file system 62, however, a client first issues a request for metadata to the data mover 61. The data mover 61 responds by placing an appropriate lock on the file to be accessed, and returning metadata including pointers to where the data to be accessed is stored in the file system. The client uses the metadata to formulate a read or write request sent over the bypass data path to the file system 62. If the write request changes the file attributes, then the client writes the new file attributes to the data mover 61 after the data is written to the file system 62. In this regard, a client in the data network of FIG. 3 behaves in a fashion similar to a data mover in FIG. 2 that does not own a file system to be accessed.

Figure 4:
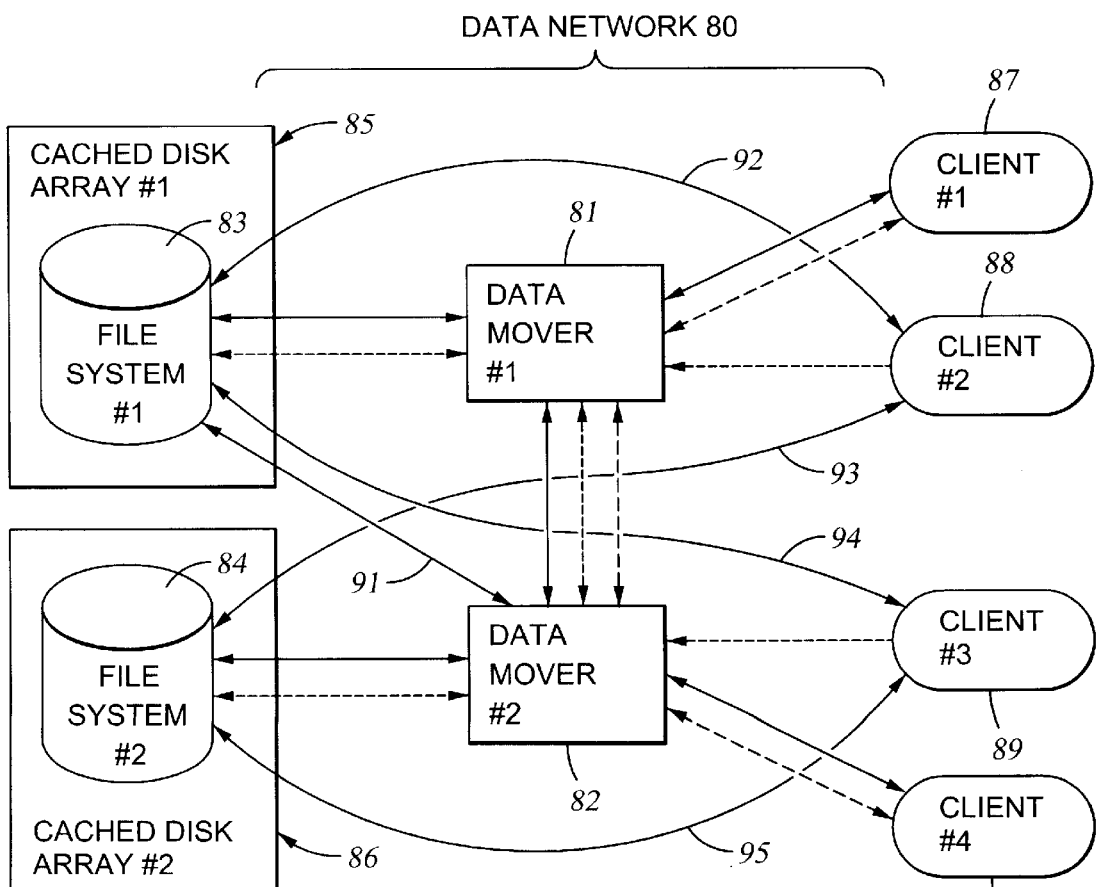
FIG. 4 is a block diagram of a data storage network which combines various aspects of the file servers of FIGS. 2 to 4.

Turning now to FIG. 4, there is shown a more complex network file server architecture that combines the architectural features of FIGS. 1, 2 and 3. In this example, a data network 80 includes a first data mover 81, a second data mover 82, a first cached disk array 85, a second cached disk array 86, and a plurality of clients 87, 88, 89, 90. In this example, the data movers 81, 82 and the cached disk arrays 85, 86 could be spaced from each other, placed at various geographic locations, and interconnected by high-speed Fibre Channel data links. The first data mover 81 owns a first file system 83 in the first cached disk array 85, and the second data mover 82 owns a second file system 84 in the second cached disk array 86. The first data mover 81 is connected to the first cached disk array 85 for the communication of data and metadata, and the second data mover 82 is connected to the second cached disk array 86 for the communication of data and metadata. The first data mover 81 is connected to the second data mover 82 for the communication of data, metadata, and control information. The second data mover 82 has a bypass data path 91 to the first file system 83 for bypassing the first data mover 81, but the first data mover 81 does not have a bypass data path to the second file system 84 for bypassing the second data mover 82.

The first data mover 81 is linked to a first client 87 for the communication of data and control information, and is linked to a second client 88 for communication of metadata. The second client 88 has a bypass data path 92 to the first file system 85 for bypassing the first data mover 81, and a bypass data path 93 to the second file system 84 for bypassing the first data mover 81 and also bypassing the second data mover 82.

The second data mover 82 is linked to a third client 89 for the communication of metadata, and is linked to a fourth client 90 for the communication of data and control information. The third client 89 has a bypass data path 94 to the first file system 83 for bypassing the first data mover 81 and the second data mover 82, and a bypass data path 95 to the second file system 84 for bypassing the second data mover 82.

The first client 87 accesses the first file system 83 and the second file system 84 in the fashion described above with respect to FIG. 1. For example, to access the second file system 84, the first client 87 sends a file access request to the first data mover 81, the first data mover 81 forwards the request to the second data mover 82, and the second data mover 82 accesses the second file system.

The fourth client 90 accesses the first file system 83 and the second file system 84 in the fashion described above with reference to FIG. 2. For example, to access the first file system 83, the fourth client 90 sends a file access request to the second data mover 82, and the second data mover 82 sends a corresponding metadata request to the first data mover 81. The first data mover 81 places a lock on the file to be accessed, and returns metadata including pointers to the data to be accessed. The second data mover uses the pointers to formulate a corresponding data access command sent over the bypass data path 91 to the first file system 83, and any read or write data is communicated over the bypass path 91 and between the second data mover 82 and the fourth client 90.

The second client 88 accesses the first file system 83 in the fashion described above with reference to FIG. 3, and the third client 89 accesses the second file system 84 in the fashion described above with reference to FIG. 3. For example, to access the first file system 83, the second client 88 sends a metadata request to the first data mover 81. The first data mover 81 places a lock on the file to be accessed, and returns metadata including pointers to the data in the file to be accessed. The second client 88 uses the pointers to formulate a corresponding data access command sent over the bypass data path 92 to the first file system 83, and any read or write data is also communicated over the bypass data path 92 between the first file system 83 and the second client 88. In a similar fashion, the second client 88 can access the second file system 84, and the third client 89 can access the first file system, but in these cases a respective metadata request is forwarded between the first and second data movers 81 and 82.

There are various reasons why it may be advantageous to use the different access methods in the same file server network. The method of FIG. 2 is easy to use when file systems owned by different file servers are located in the same cached disk array, but when the file systems are located in different cached disk arrays, the bypass connections between the data movers and the cached disk arrays may be relatively scarce and costly. Therefore, as illustrated by the example in FIG. 4, if the fourth client 90 is more likely than the first client 87 to load the file server network with read/write operations, then a bypass connection 91 should be allocated to the second data mover 82 to prevent the fourth client 90 from overloading the network. In a similar fashion, the second and third clients 88, 89 are provided with more direct bypass connections 92, 93, 94, 95 to each of the file systems 83, 84, and therefore the second and third clients 88, 89 can also engage in highly intensive read/write operations.

Whenever a client has a bypass data path to a file system and can therefore send data access commands to the file system without passing through a data mover computer, the client can potentially access all of the files in the file system. In this situation, the client must be trusted to access only the data in a file over which the client has been granted a lock by the data mover that owns the file system to be accessed. Therefore, the methods of client access as described above with reference to FIGS. 2 and 3 have a security risk that may not be acceptable for clients located in relatively open regions of the data network. The method of client access as described above with reference to FIG. 3 also requires special client software, in contrast to the methods of client access as described above with reference to FIGS. 1–2 which can use standard client software.

In general, a data network may have a more complex topology than the example in FIG. 4. A data network may have a multiplicity of cached disk arrays connected to a multiplicity of data movers, and each data mover could be connected to a multiplicity of clients. Some of the clients may have bypass data paths to some of the cached disk arrays, and some of the data movers may have bypass data paths to cached disk arrays containing file systems owned by other data movers. In the general case, however, each data mover can be programmed to respond in a similar fashion to a file access request, which could be a request for data from the file, or a request for metadata about the data in the file. A procedure executed by a data mover for responding to such a file access request is illustrated by the flowchart of FIG. 5.

Figure 5:
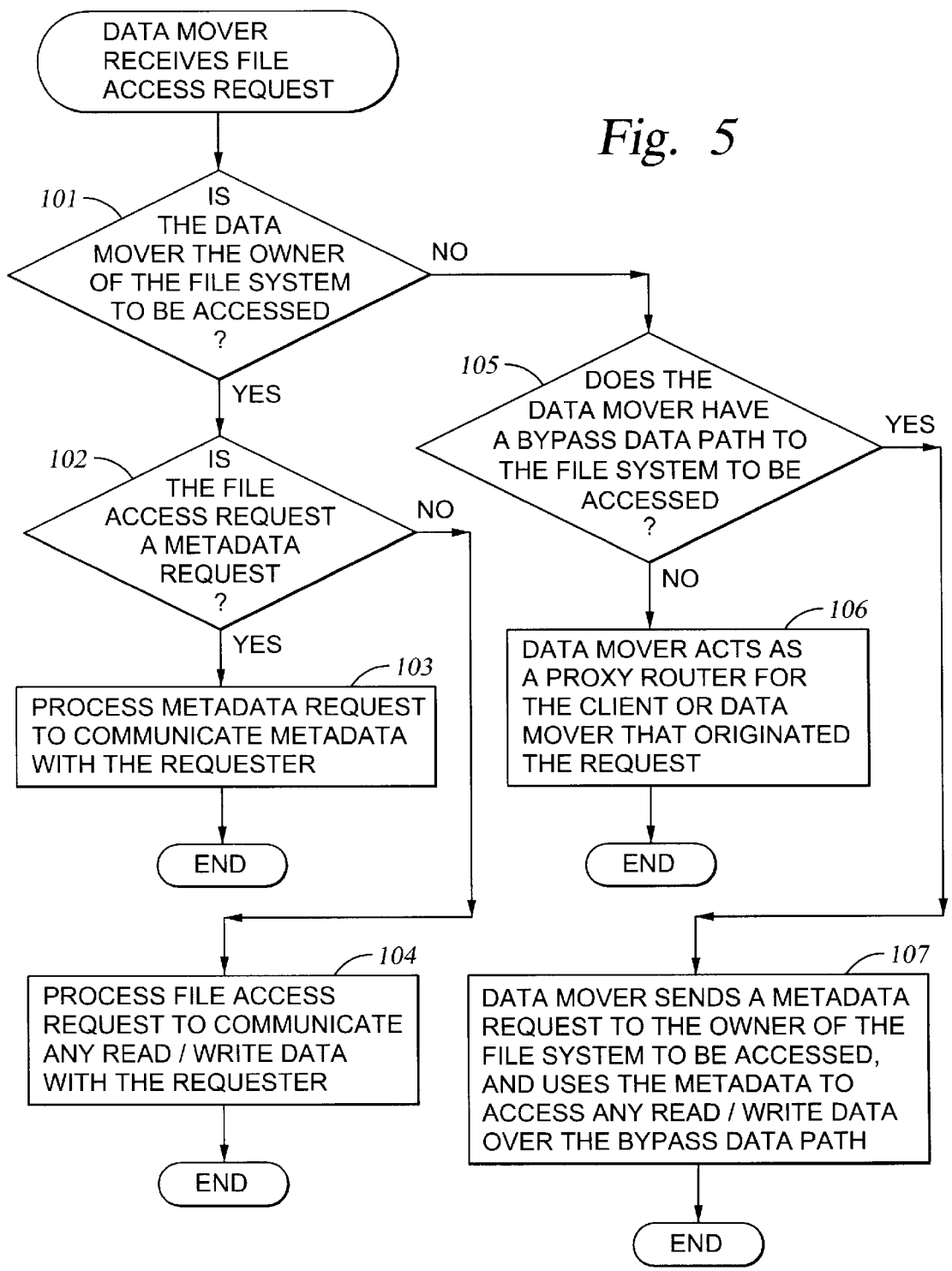
FIG. 5 is a flowchart of a procedure followed by each of the data movers in FIG. 4 upon receipt of a file access request from a client or another data mover.

In a first step 101 of FIG. 5, execution branches depending on whether or not the data mover is the owner of the file system to be accessed. If the data mover is the owner of the file system to be accessed, execution continues from step 101 to step 102. In step 102, execution branches depending on whether or not the file access request is a request for metadata about the file. If the file access request is a request for metadata, then execution continues to step 103 to process the metadata request and to communicate metadata with the requester. If the file access request is not a request for metadata, then execution continues from step 102 to step 104 to process the file access request, and to communicate any read/write data with the requester (i.e., the client or data mover having sent the request to the data mover executing the procedure of FIG. 5). Steps 103 and 104 may each include similar operations of checking the authenticity of the client having originated the request, checking the authority of the client to access the file, and checking whether the client process having originated the request has any required lock on the file to be accessed, and if not, attempting to grant the client process a lock sufficient for the requested file access. For example, the authenticity of the client request is checked by accessing a cache of client attribute data and comparing the client's password in the cache of client attribute data to a password included in the request, and the authority of the client to access the file is checked by accessing a cache of file attribute data and comparing the file access rights in the cache of file attribute data to access rights of the client. If the client request is authenticated, the client is authorized to access the file, and the client has any required lock upon the file, then the specified metadata or read/write data can be exchanged with the requester. After steps 102 or 104, the procedure of FIG. 5 is finished.

In step 101, if the data mover responding to the file access request is not the owner of the file system to be accessed, then execution branches to step 105. In step 105, execution branches depending on whether or not the data mover has a bypass data path to the file system to be accessed. If the data mover does not have a bypass data path to the file system to be accessed, then execution continues from step 105 to step 106. In step 106, the data mover processing the file access request acts as a proxy router for the client or data mover that originated the request. After step 106, the procedure of FIG. 5 is finished. If in step 105 the data mover has a bypass data path to the file system to be accessed, then execution branches from step 105 to step 107. In step 107, the data mover processing the request sends a metadata request to the owner of the file system to be accessed, and uses metadata communicated with the owner to formulate a read/write command to access the file system by communicating read/write data over the bypass path. After step 107, the procedure of FIG. 5 is finished.

II. Using the CIFS Protocol for Sharing Data Sets Among Data Movers

A. General Overview

As described above with reference to FIGS. 1, 4, and 5, a data mover that is not the owner of the file system to be accessed will often receive a file access request from a client. If the data mover is the owner of the file system to be accessed, then the file access request can be handled in the conventional way as in any ordinary file server. If not, then the file access request is forwarded to the owner of the file system. A data mover that receives a file access request from a client and forwards the file access request will be referred to as a Forwarder, and the data mover that owns the file system to be accessed will be referred to as the Owner. In the example of FIG. 1, the file access request is forwarded directly from the Forwarder to the Owner. In the more general case, as described above with reference to FIG. 5, the file access request could be forwarded through one or more additional data movers along a path between the Forwarder and the Owner, and if the file access request is a read or write request, it could be converted to a metadata request by one of the additional data movers.

The forwarding of a file access request is a relatively simple task when using a connectionless communications protocol such as the protocol used by a NFS file server. In a network employing high-speed links and interconnection technology, the delays inherent in a connectionless communications protocol become more pronounced. One way of avoiding these inherent delays is to use a file system protocol that is based on a connectionless communications protocol. For example, the CIFS file system protocol is based on the connection-oriented Transmission Control Protocol (TCP/IP).

By forwarding data access requests between CIFS file servers, the same file system can be accessed by the CIFS clients through different CIFS file servers. The group of CIFS file servers appears to the CIFS clients as a single file server. The group of CIFS file servers, however, may provide enhanced data availability, reliability, and storage capacity.

Besides file access requests (e.g. open, read, write, close, etc.), the CIFS file server recognizes a user session setup request, a file system (dis)connection request, and a session logoff request. In the preferred scheme, the client authentication and identification number allocation is done in the Forwarder. The first forwarded request to the Owner is the file system connection request combined with the client context in the Forwarder and the allocated identification number for this connection. The basic client context is the per client based information including negotiated dialect, user identification numbers, client operating system, connection identification numbers, and maximum network packet size. The extended client context also includes all the open file information. The Owner will use those Forwarder-allocated client and connection identification number and client context from the Forwarder to reconstruct the client context in its own space. The Forwarder accesses file system ownership information to determine the Owner for the data access request, and accesses file server configuration information to determine the Recipient for the data access request.

All the file access requests are transparently forwarded from the Forwarder to the Owner. The file system disconnection and user session logoff requests are both handled in the Forwarder and the Owner. After the Forwarder has done the connection/session clean up, the corresponding request is forwarded to the Owner, and the Owner cleans up the associated client context. Since the tasks of the conventional CIFS file server have been divided into the Forwarder and the Owner parts, both file servers need to support the same set of CIFS dialects, and the Owner must trust the negotiation and authentication done by the Forwarder with the client.

In a conventional CIFS file server, each client context is associated with one TCP network connection to the server. In this fashion, it is easy to identify different client context inside the server. However, in a system that forwards data access requests over TCP connections between data movers, the network connecting the data movers will be jammed by the forwarded data access requests if there is only one TCP connection per client context. To solve this problem, a limited number of open TCP connections are pre-allocated between each Forwarder and Owner pair for the forwarding of file access requests. Based on the network type, there may be an additional fixed number of open TCP connections that are in a standby state in case one of the preallocated open TCP connections has a communication failure.

Multiple clients of a Forwarder requesting the same file system will have their requests sent to the same Owner, and their requests will share the same set of TCP connections between this Forwarder and Owner pair. The number of TCP connections may be much less than the number of client contexts shared by this Forwarder and Owner pair. Virtual channels are constructed inside this set of TCP connections. Each virtual channel corresponds to a client context. The Round Robin method is used to allocate virtual channels within this set of open TCP connections. The virtual channels are identified by the context ID chosen by the Forwarder and the Owner.

For those requests that need to have a dedicated TCP connection, such as the write_raw, read_raw, and trans commands, the TCP connections will be obtained from a pool of pre-opened TCP connections. Once allocated, such a dedicated TCP connection will not be altered or intruded by different clients until the connection is released and returned to the pool. By pre-opening TCP connections and keeping the opened TCP connections in a pool, the peers avoid the connecting and closing delays of TCP connections. The number of TCP connections in the pool can be dynamically adjusted according to the server load.

By using this scheme, the clients will see the file server group as a single server. The availability and reliability is the same as the multiple servers' environment. It is a big benefit for the system administrator to let multiple file servers share the same data set.

B. CIFS Request Sequence Processing by Forwarder and Owner

There is a preferred partitioning between the Forwarder and Owner of the performance of the tasks in the request sequence specified by the CIFS protocol. Following is a summary of the CIFS request sequence as specified by the CIFS protocol, and then an explanation of how the tasks of the standard CIFS request are partitioned between the Forwarder and the Owner.

1. CIFS Request Sequence Specified by the CIFS Protocol

In order to access a file on a server, a client has to: (1) parse the full file name to determine the server name, and the relative name within that server; (2) resolve the server name to a transport address (this may be cached); (3) make a connection to the server (if no connection is already available); and (4) exchange CIFS messages. (Leach, p. 6.) The messages that a client exchanges with a server to access resources on that server are called Server Message Blocks (SMBs). (See Leach, p. 15.)

Figures 6, 8:
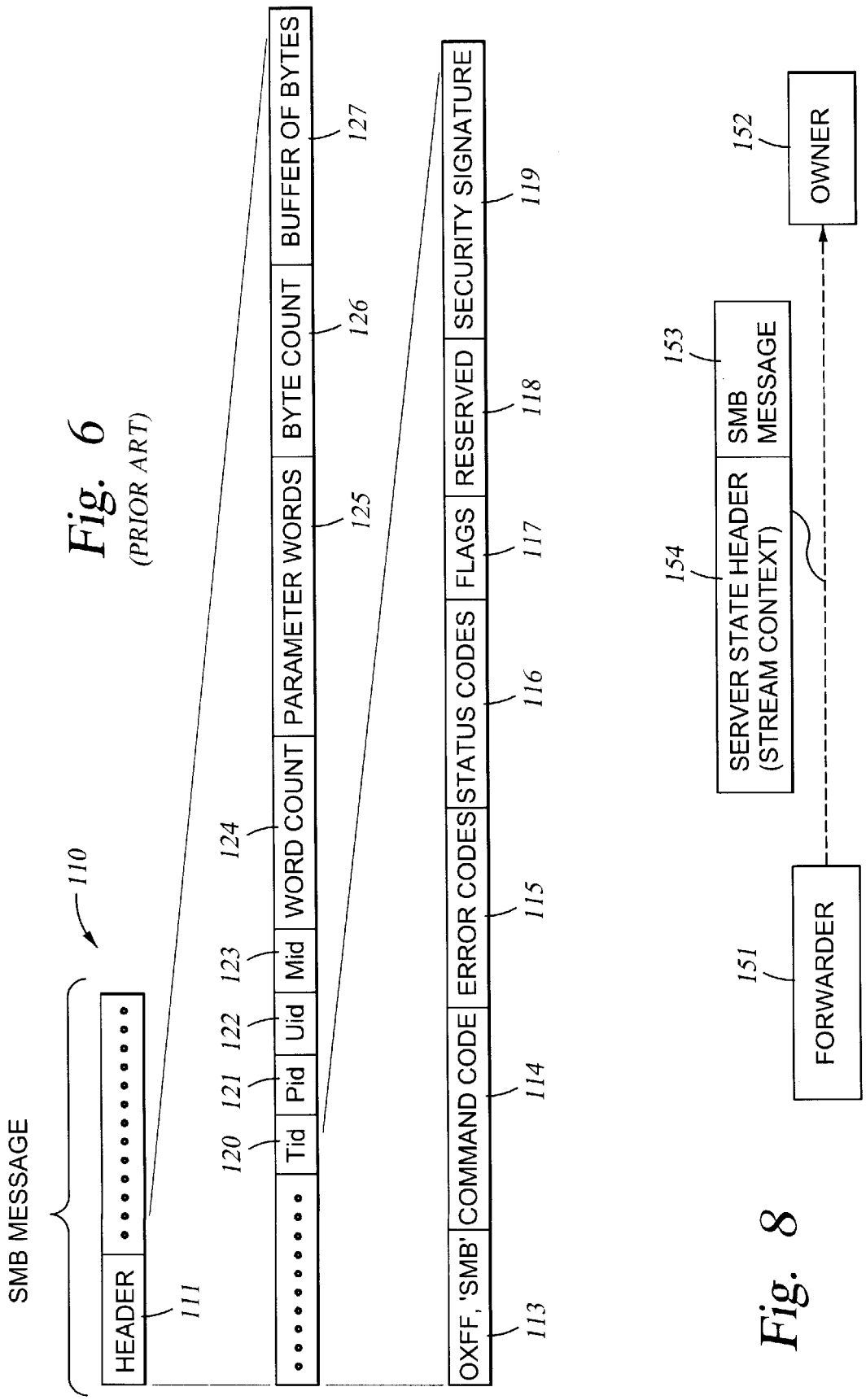
FIG. 6 is a block diagram of various fields in a message block of the conventional CIFS protocol.
FIG. 8 is a block diagram showing a server state header appended to a CIFS message sent from a data mover that forwards the message to a data mover that owns a file to be accessed.

Every SMB message has a common format, which is illustrated in FIG. 6. The SMB message 110 has a header 111, and the header has a multiplicity of fields. The header starts with a field 113 having a value of 0XFF and the ASCII codes for "SMB." The preamble is followed by a command code 114 specifying the command of the SMB message 110, error codes 115, status codes 116, flags 117, some reserved space 118, some space for a security signature 119, a tree identifier (Tid) field 120, a process identifier (Pid) field 121, a user identifier (Uid) field 122, and a multiplex identifier (Mid) field 123, a word count 124 of a number of following parameter words 125, and a byte count 126 of a number of bytes in a buffer of bytes 127. (See Leach, p. 15–16.)

The Tid represents an instance of an authenticated connection to a server resource. The server returns Tid to the client when the client successfully connects to a resource, and the client uses Tid in subsequent requests referring to the resource. (Leach, p. 17.)

The Pid identifies to the server the "process" that opened a file or that owns a byte range lock. This "process" may or may not correspond to the client operating system's notion of process. (Leach, p. 19.)

The Uid is assigned by the server after the server authenticates the user, and that the server will associate with that user until the client requests the association to be broken. After authentication to the server, the client should make sure that the Uid is not used for a different user than the one that was authenticated. (It is permitted that a single user have more than one Uid.) Requests that do authorization, such as open requests, will perform access checks using the identity associated with the Uid. (Leach, p. 19–20.)

The Mid is used to allow multiplexing the single client and server connection among the client's multiple processes, threads, and requests per thread. Clients may have many outstanding requests at one time. Servers may respond to requests in any order, but a response message must always contain the same Mid value as the corresponding request message. The client must not have multiple outstanding requests to a server with the same Mid. (Leach, p. 20.)

The following illustrates a typical message exchange sequence for a client connecting to a user level server, opening a file, reading its data, closing the file, and disconnecting from the server:

| Client Command | Server Response |
| --- | --- |
| 1. SMB_COM_NEGOTIATE | |
| | Must be the first message sent by client to the server. Includes a list of SMB dialects supported by the client. Server response indicates which SMB dialect should be used. |
| 2. SMB_COM_SESSION_SETUP_ANDX | |
| | Transmits the user's name and credentials to the server for verification. Successful server response has Uid field set in SMB header used for subsequent SMBs on behalf of this user. |
| 3. SMB_COM_TREE_CONNECT_ANDX | |
| | Transmits the name of the disk share the client wants to access. Successful server response has Tid field set in SMB header used for subsequent SMBs referring to this resource. |
| 4. SMB_COM_OPEN_ANDX | |
| | Transmits the name of the file, relative to Tid, the client wants to open. Successful server response includes a file id (Fid) the client should supply for subsequent operations on this file; |
| 5. SMB_COM_READ | |
| | Client supplies Tid, Fid, file offset, and number of bytes to read. Successful server response includes the requested file data. |
| 6. SMB_COM_CLOSE | |
| | Client closes the file represented by Tid and Fid. Server responds with success code. |
| 7. SMB_COM_TREE_DISCONNECT | |
| | Client disconnects from resource represented by Tid. |

By using a CIFS request batching mechanism (called the "AndX" mechanism), the second to sixth messages in this sequence can be combined into one, so there are really only three round trips in the sequence, and the last one can be done asynchronously by the client. (Leach. p. 7–9.)

2. CIFS Request Sequence for Request Forwarding

Figure 7:
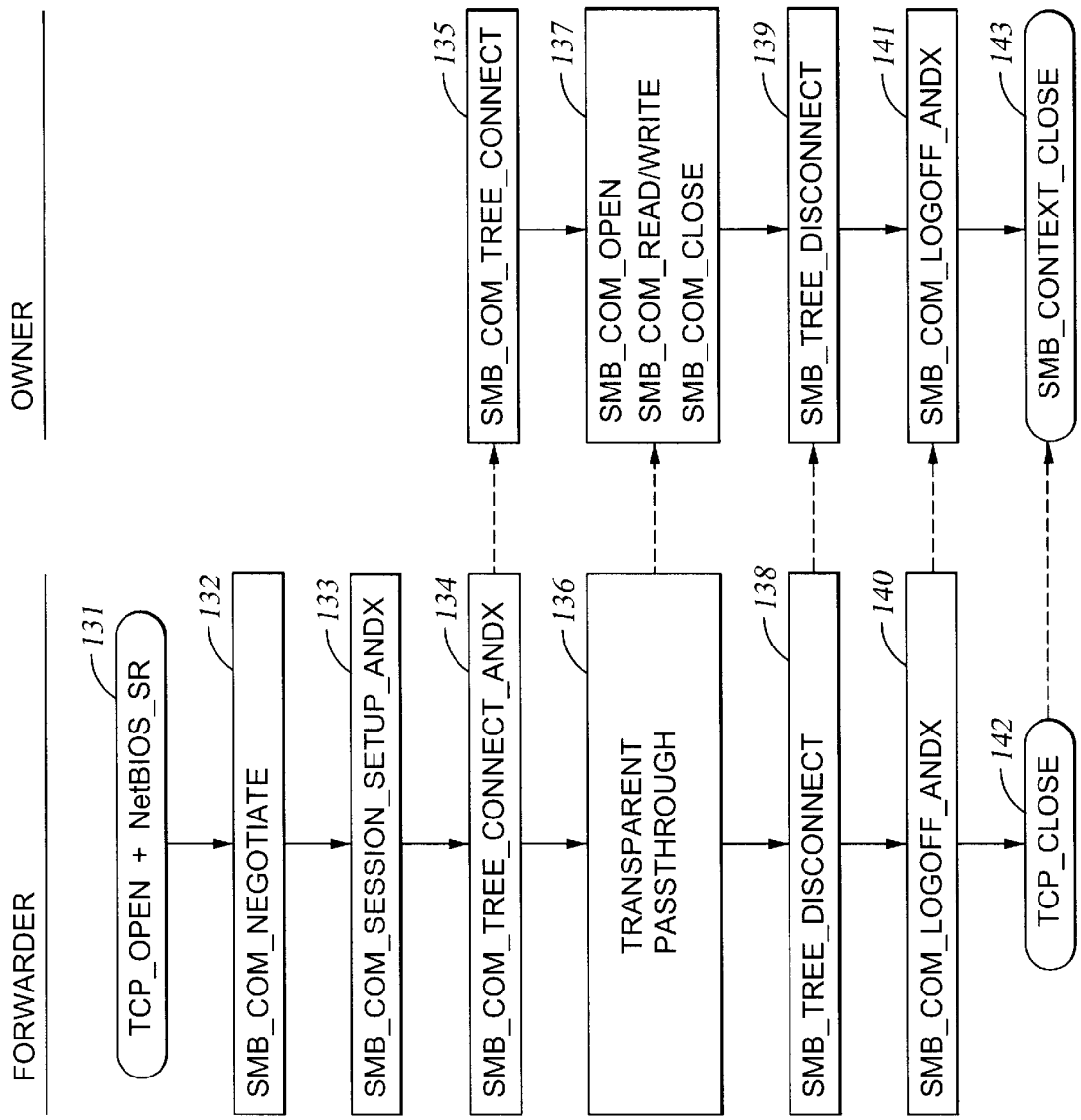
FIG. 7 is a flowchart of a preferred procedure for forwarding CIFS file access messages from a data mover that does not own the file to be accessed to a data mover that owns the file to be accessed.

With reference to FIG. 7, there is shown a flowchart of a preferred method of processing the CIFS request sequence by allocation of tasks between the Forwarder and the Owner. In a first step 131, in response to a file access request from a client, the network opens a TCP connection between the client and the server for NETBIOS transport over the TCP connection. As described in Leach, Appendix A, p. 119–120, this includes resolving the server name in the client request to an IP address of the Forwarder, and establishing a connection between the client and the Forwarder if a connection has not already been set up. Connection establishment is done using the NETBIOS session service, which requires the client to provide a "calling name" and a "called name."

In step 132, the Forwarder responds to a SMB_COM_NEGOTIATE message from the client. The response from the Forwarder to the client indicates which SMB dialect should be used.

In step 133, the Forwarder responds to a SMB_COM_SESSION_SETUP_ANDX message from the client. In this message, the client transmits a user name and credentials to the Forwarder for verification. If the Forwarder is successful in verifying the user name and credentials, then the Forwarder returns a response that has the Uid field set in the SMB header. The client uses the value in the UID field for subsequent SMBs to the Forwarder, until the session is closed. The value in the Uid field indicates a particular one of possible multiple sessions inside the TCP connection between the Forwarder and the client.

In step 134, the forwarder responds to a SMB_COM_TREE_CONNECT_ANDX message from the client. The client transmits the name of the file system that the client wants to access. (In the jargon of the CIFS specification, the file system is referred to as a "disk share".) If the client may access the file system, then the Forwarder returns a response that has the tree identification (Tid) field set in the SMB header set to a Tid value used for subsequent SMBs referring to this file system. Since it is the Owner of the file system that maintains the attributes of the file system determining whether or not the particular client may access the file system, the Owner performs a step 135 providing assistance to the Forwarder in responding to the client. In step 134, however, the Forwarder maintains responsibility for allocating the Tid value, and the Owner will use the Uid and the Tid assigned by the Forwarder as the index of an Access_Credential object, and a connection object defining a connection between the Forwarder and the Owner for client session access of the file system. The Access_Credentials object includes the user credentials that were received from the client in the SMB_COM_SESSION_SETUP_ANDX message and then authenticated by the Forwarder in step 133.

The connection between the Owner and the Forwarder is established during step 134 in the procedure of the Forwarder and at the beginning of step 135 in the procedure of the Owner. To establish the connection between the Owner and the Forwarder, the Forwarder sends a message to the Owner. The transmission of the message is indicated schematically by a dashed line arrow from step 134 to step 135.

In general, the transmission of a message from the Forwarder to the Owner is indicated in FIG. 7 by a dashed line arrow. In general, the Owner may receive SMB messages from clients as well as SMB messages forwarded by other data movers. It is possible that a single link in the data network could convey SMB messages from clients as well as SMB messages from other clients, although it is also possible that the SMB messages transmitted to an Owner from other data movers could be transmitted over one or more dedicated network links that do not convey any SMB messages transmitted directly from clients. It is advantageous to set some of the reserved bytes (118 in FIG. 6) in the SMB message header with a code to indicate whether an SMB message has been transmitted directly from a client or has been transmitted from another data mover. For example, if an SMB message has been transmitted directly from a client, the reserved bytes are set to zero, and if an SMB message has been transmitted from another data mover, then the reserved bytes are set to a non-zero code, such as 0XFE 'EMC'.

The access of files in the file system occurs in step 136 of the procedure of the Forwarder, and in step 137 in the procedure of the Owner. In step 137, the Forwarder passes a series of conventional CIFS file access commands from the client to the Owner in a fashion transparent to the client. The series of conventional CIFS file access commands includes, for each file in the file system to be accessed, an SMB_COM_OPEN request, one or more SMB_COM_READ or SMB_COM_WRITE requests, and an SMB_COM_CLOSE request. Any number of files in the file system could be opened for the client at any given time for reading or writing.

The file access commands in the series are transparently passed through the Forwarder and then processed by the Owner. In an SMB_COM_OPEN request, the client specifies the name of the file, relative to the Tid, that the client wants to open. If the Owner can open the file, the Owner returns a response indicating a file id (Fid) that the client should supply for subsequent operations on this file. The Forwarder receives the response from the Owner, and forwards the response to the client.

In an SMB_COM_READ or SMB_COM_WRITE request, the client supplies Tid, Fid, a file offset, and the number of bytes to be read or written. For the SMB_COM_WRITE request, the client also supplies the data to be written. If the Owner is successful in performing the requested read operation, then the Owner returns a response to the client that includes the requested file data. If the Owner is successful in performing the requested write operation, then the Owner returns a response to the client that the data was written. The Forwarder receives the response from the Owner, and forwards the response to the client.

In an SMB_COM_CLOSE request, the client requests the file represented by Tid and Fid to be closed. The Forwarder transparently passes this request to the Owner. The Owner responds with a success code. The Forwarder receives the response from the Owner, and forwards the response to the client.

In step 138, the Forwarder receives a SMB_COM_TREE_DISCONNECT request from the client. In response, the Forwarder disconnects the client from the resource represented by Tid. The Forwarder also transmits the SMB_COM_TREE_DISCONNECT request to the Owner, and in step 139 the Owner also disconnects the client represented by Tid. In other words, step 138 involves deallocating state memory used in the Forwarder in step 134 for establishing the relationship between the client and the resource represented by Tid, and step 139 involves deallocating state memory used in the Owner in step 135 for establishing the relationship between the client and the resource represented by Tid.

In step 140, the Forwarder receives a SMB_COM_LOGOFF_ANDX request from the client. In response, the Forwarder performs the inverse of the SMB_COM_SESSION_SETUP_ANDX operation of step 133. The user represented by Uid in the SMB header is logged off. The Forwarder closes all files currently open by this user, and invalidates any outstanding requests with this Uid. For closing all files that are currently opened by this user but not owned by the Forwarder, the Forwarder also sends a SMB_COM_LOGOFF_ANDX request to each Owner of any files that are not owned by the Forwarder. In response, in step 141, the Owner closes all files that it owns that are currently open by this user, and invalidates any outstanding requests with this Uid.

Upon completion of step 140, the Forwarder performs a TCP_CLOSE operation in step 142. The Forwarder closes the TCP connection between the client and the server. The Forwarder also sends a SMB_CONTEXT_CLOSE message to the Owner. In response, in step 143 the Owner closes the connection that was established in steps 134 and 135 between the Forwarder and the Owner for access of the client to resources owned by the Owner. This involves deallocating memory in the Owner that had been allocated in step 135 for storing stream context information associated with the client.

In general, there is one stream context per client TCP connection. The stream context is distributed among the Forwarder and the Owners of the file systems to be accessed by the client and that are not owned by the Forwarder. Only at tree connection time (step 134 in FIG. 7) does the Forwarder know to where the file access requests are to be forwarded. Thus, all the CIFS servers in the group need to support the same set of dialects, and trust the negotiation and authentication done by the Forwarder prior to the tree connection time.

Since the SMB message protocol of CIFS is a statefull protocol, the Forwarder cannot merely forward SMB messages to the Owner. In order for the Owner to properly interpret the SMB_COM_TREE_CONNECT message in step 135 and the subsequent SMB messages from the client, the Owner needs some state information of the Forwarder from the steps 131–133 prior to the tree connection time in step 134. Moreover, subsequent to the tree connection time in step 124, state information of the Forwarder that is relevant to the processing of the SMB messages by the Owner may be changed by the Forwarder's processing of a SMB message from the client that is not merely passed through to the Owner.

As shown in FIG. 8, if any new state information of the Forwarder 151 that is relevant to the stream context of a SMB message 153 to be transmitted to the Owner, then the Forwarder appends a server state header 154 containing the new stream context information to the SMB message 153, and the Forwarder transmits the combination of the server state header 154 and the SMB message to the Owner. For example, in step 134 of FIG. 7, the Forwarder appends to the SMB message SMB_COM_TREE_CONNECT a server state header identifying the remote architecture of the client (e.g., Windows, NT, etc.), the SMB protocol dialect, the maximum SMB message packet size, and session related information including the Uid and Tid allocated by the Forwarder, and the Access_Credentials object associated with the Uid.

Figure 9:
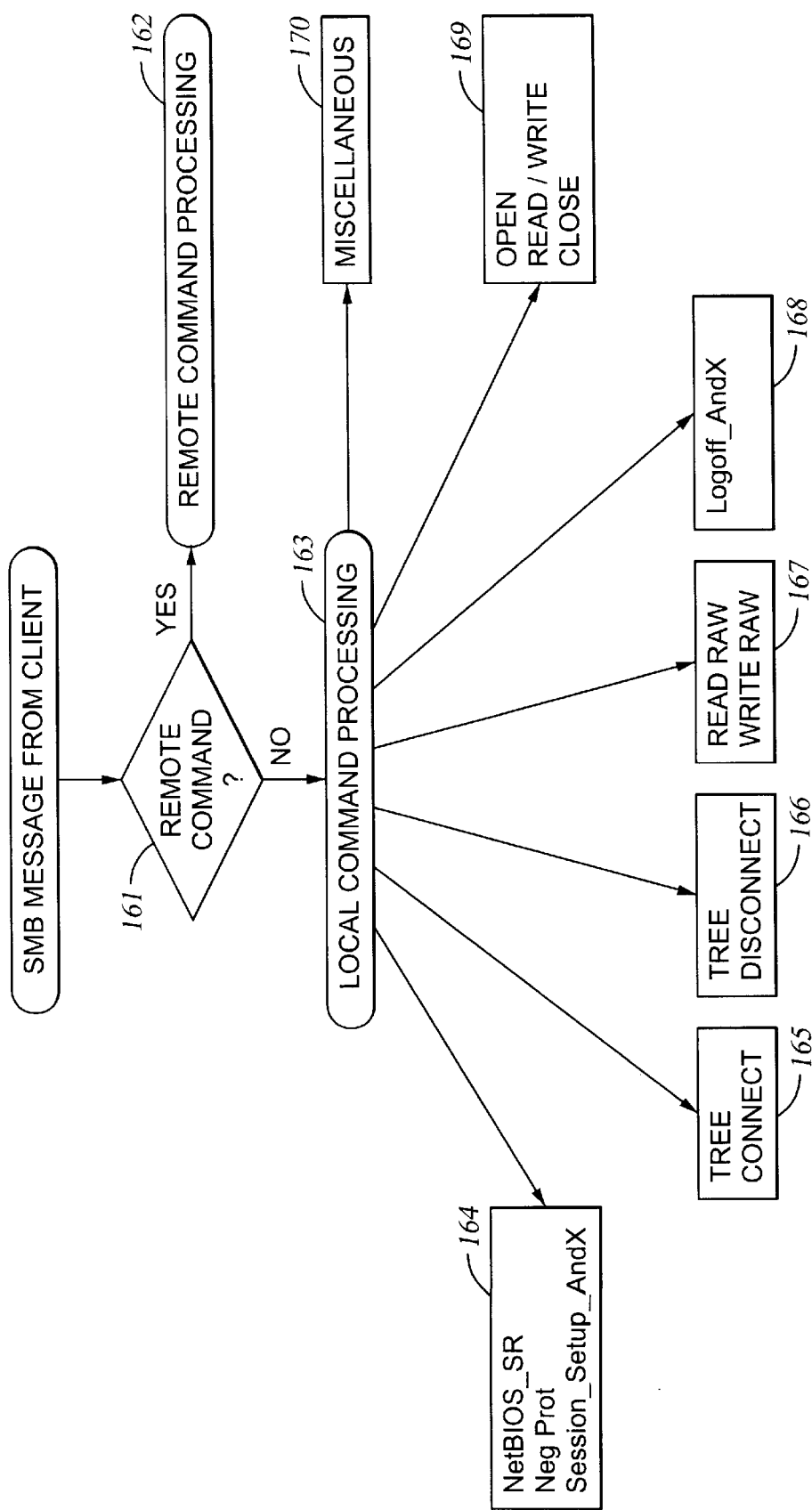
FIG. 9 is a flowchart of a procedure performed by a data mover to process a CIFS message received from a client.

With reference to FIG. 9, there is shown a flowchart of programming in a data mover for processing a SMB message received from a client. In a first step 161, the data mover determines whether or not the command in the SMB message is a remote command or a local command. The command is a remote command if it accesses a file system that is not owned by the data mover. Some commands, such as SMB_COM_NEGOTIATE and SMB_COM_SESSION_SETUP_ANDX, may not have an associated file system and therefore they are local commands. In a similar fashion, some miscellaneous commands have nothing to do with data storage, and therefore they are local commands. For a command having an associated file system, the data mover accesses a file system mapping table in memory of the data mover to determine the owner of the file system. If the data mover is the owner, then the command is a local command. Otherwise, the command is a remote command. If the command is a remote command, then execution branches from step 161 to remote command processing in step 162, where the remote command is processed as will be further described below with reference to FIG. 10. If the command is a local command, then execution continues from step 161 to local command processing in step 163. This local command processing can be done in a conventional fashion. By inspecting the command code in the SMB message, execution is directed to a respective routine for processing the command. As shown in FIG. 9, for example, there are routines 164 for establishing a session stream with the client (NetBIOS_SR, NegProt, Session_Setup_AndX), a Tree_Connect routine 165, a Tree_Disconnect routine 166, Read_Raw and Write_Raw routines 167, a Logoff_AndX routine 168, file access routines 169 including Open, Read, Write, and Close, and routines 170 for miscellaneous commands, such as data access commands from a peripheral data processing device in the data network.

Figure 10:
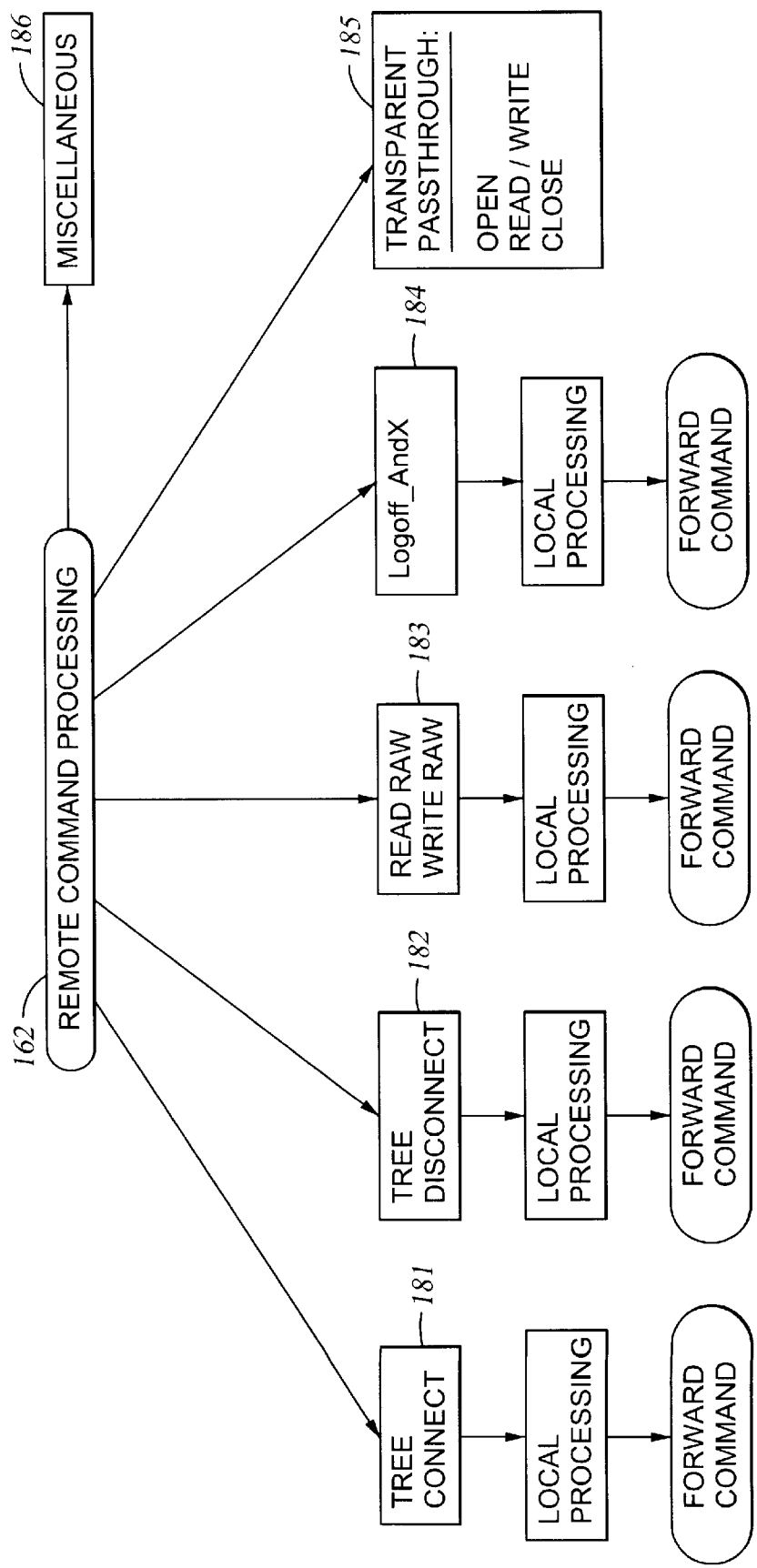
FIG. 10 is a flowchart of a routine used by a data mover to process data access requests upon a file that is not owned by the data mover.

With reference to FIG. 10, there is shown a flowchart for processing of the remote SMB commands. By inspecting the command code in the SMB message in step 162, execution is directed to a respective routine for processing the command. For example, there is a Tree_Connect routine 181, a Tree_Disconnect routine 182, Read_Raw and Write_Raw routines 183, a Logoff AndX routine 184, a routine for transparent passthrough of the SMB messages for Open, Read, Write, and Close commands 185, and routines 186 for miscellaneous commands, such as data access commands from a peripheral data processing device in the data network.

As described above with respect to FIG. 7, the Tree_Connect routine 181, Tree_Disconnect routine 182, the Read Raw and Write Raw routines 183, and the Logoff And_X routine 184 perform some local processing and then forward the corresponding SMB message to the file system Owner. The miscellaneous routines 186 may function in a similar manner or be passed through to the Owner as appropriate.

Figure 11:
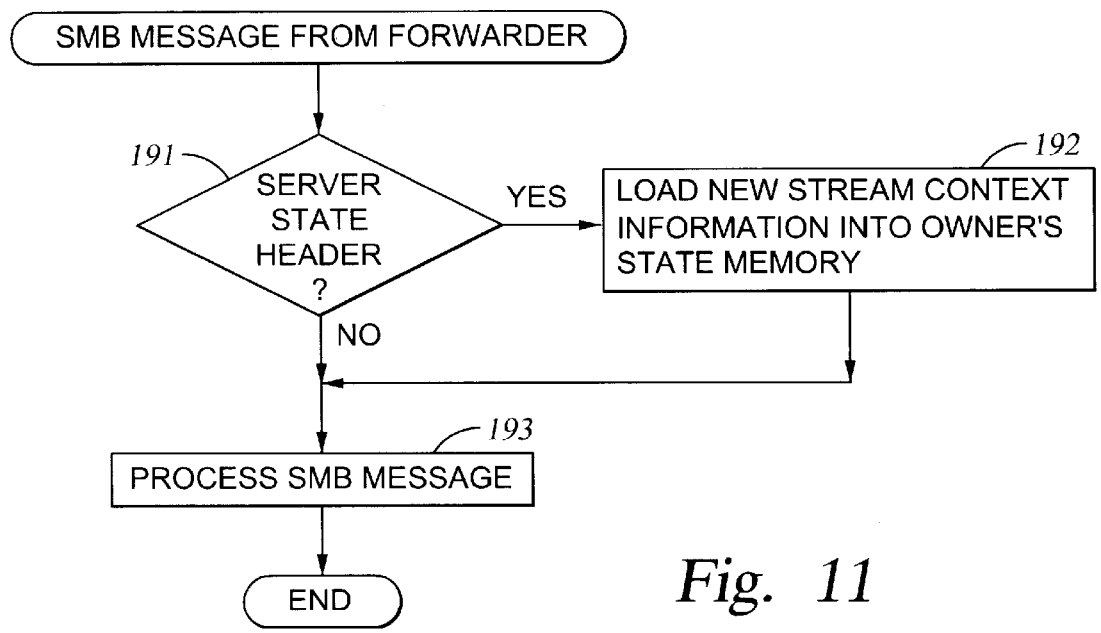
FIG. 11 is a flowchart of a routine used by a data mover upon receipt of a CIFS message received from another data mover.

As shown in FIG. 11, the Owner is programmed with a procedure for inspecting the message packets that it receives from a Forwarder, in order to determine whether or not it receives an SMB message packet with or without a server state header. In step 191, the prefix of the message packet is inspected to determine whether it is the prefix of an SMB message or the prefix of a server state header. For example, an SMB message has a prefix value of 0XFF 'SMB', and a server state header has a prefix value of 0XFF 'EMC'. If the message packet has a server state header prefix, then execution branches from step 191 to step 192. In step 192, the Owner loads the new stream context information from the server state header into the Owner's state memory, and execution continues to step 193. In step 191, if the message packet has a SMB message prefix, then execution continues from step 191 to step 193. In step 193, the SMB message is processed by the Owner, and the message processing task is finished. In this fashion, the programming of the Owner for step 193 is considerably simplified since the Owner can interpret the command of the SMB message in a conventional fashion similar to the local command processing in FIG. 9.

Figure 12:
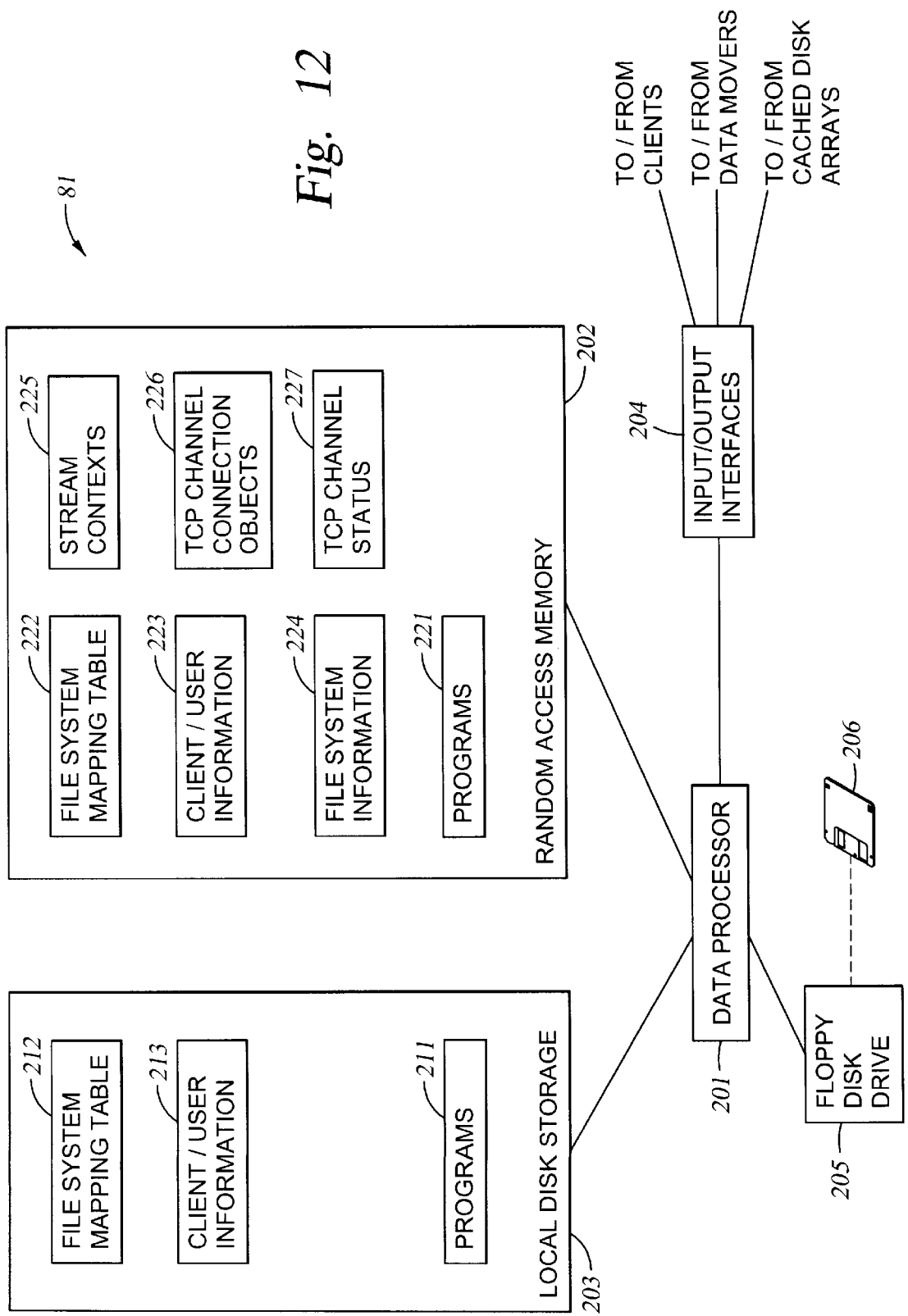
FIG. 12 is a block diagram of a data mover.

With reference to FIG. 12, there is shown a block diagram of the data mover 81 including programming for forwarding CIFS data access requests for accessing a file system not owned by the data mover. The data mover 81 has conventional hardware components including a data processor 201, a random access memory 202, a hard disk drive 203 providing local disk storage, input/output interfaces 204 for providing one or more data links to and from clients, other data movers, and cached disk arrays, and a removable media (floppy) disk drive 205 for receiving programs from a machine-readable program storage device such as a standard 3 and ½ inch floppy disk 206. From the removable disk 206, the local disk storage 203 can be loaded with the programs 211 to be executed by the data processor 201, the file system mapping table 212 identifying the data mover owners of the file systems in the file server system of FIG. 4, and the client/user information 213 including passwords and access rights of the clients and users permitted to access the file systems. Alternatively, the programs 211 and the file system mapping table 212 and client/user information 213 in the local disk storage 203 could be copies from a set of master files in at least one of the cached disk arrays 85, 86 of FIG. 4. In this case, the removable disk 206 need only include a program that could be initially loaded into the random access memory 202 and executed by the data processor 201 for copying the master files from one or both of the cached disk arrays 85, 96 into the local disk storage 203.

The random access memory 202 functions as a cache memory for access to the file system mapping table 212, client/user information 213, and programs 211 in the local disk storage 203. Therefore, the random access memory includes programs 221, a file system mapping table 222, and client/user information 223 that is loaded from the local disk storage 203 for random access by the data processor 201. The random access memory 202 also stores file system information 224 for file systems owned by the data mover 81. This file system information includes a directory of the files in the file systems, and attributes of the files including file access attributes, pointers to where the file data resides in the cached disk array storing the file system, and locking information. A nonvolatile copy of the file system information 224 for each file system owned by the data mover 81 is maintained in the cached disk array that stores the file system, because the file attributes are often changed by read/write file access, and the file attributes are needed for recovery of the file data in the event of a malfunction of the data mover 81. The cached disk array that stores each file system is identified in the file system mapping tables 212, 213.

In order to manage the forwarding of file access commands from the data mover 81 (to the data mover 82 in FIG. 4), the random access memory 202 in FIG. 12 also stores stream contexts 225, TCP channel connection objects 226, and TCP channel status 227.

Figure 13:
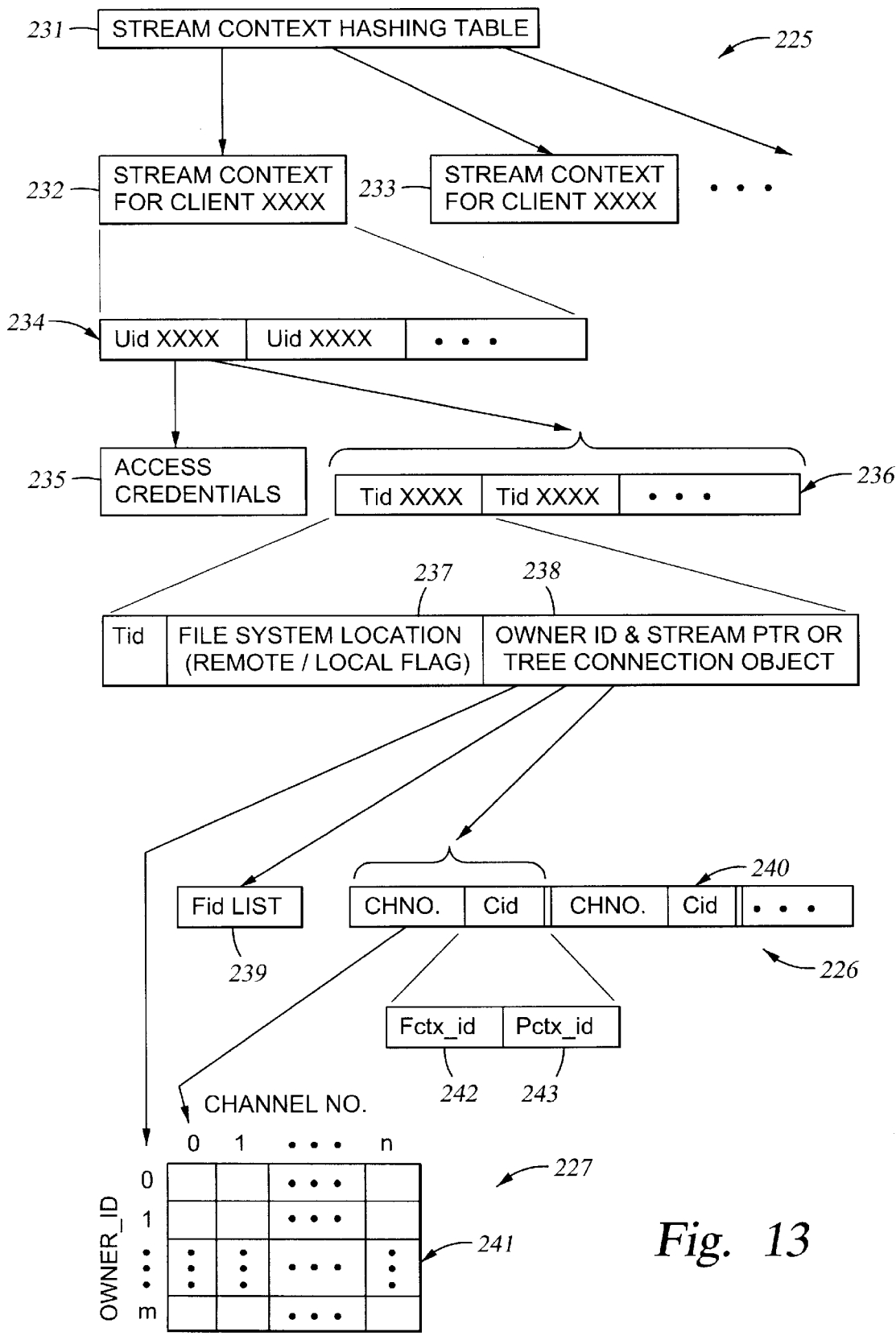
FIG. 13 is a block diagram of stream contexts, TCP channel connection objects, and TCP channel status data structures in random access memory of a data mover.

FIG. 13 further shows the data structures for storing and indexing the stream contexts 225, TCP channel connection objects 226, and TCP channel status 227. A stream context hashing table 231 provides a pointer to the stream context 232, 233 for each client currently having a connection with the data mover. The stream context for each client includes a Uid list 234 containing an entry of information for each Uid being used by the client. The information for each Uid being used by the client includes an Access_Credentials object 235 for the client-Uid session. All Owners working for the same client-Uid session share the same copy of the Access_Credentials object. For each Uid being used by the client, there is also a Tid list 236 containing an entry for each file system being accessed under the Uid. Each entry in the Tid list 236 contains a pointer or flag 237 indicating whether or not the file system is owned by the data mover. Only one Owner holds the local information of a tree connection object for a client, Uid, and file system being accessed by the client and Uid. If the file system is owned by the data mover, then there is an entry 238 in the Tid list that includes the tree connection object. The tree connection object, for example, includes a pointer to a list 240 of opened file objects identified by file identifiers (Fid's).

If the file system is not owned by the data mover, then the entry 238 in the Tid list includes an identifier of the Owner and a pointer to an entry in a stream context table 240 containing information about the use of TCP connections for forwarding file access requests from Forwarders to Owners. The entry in the stream context table 240 includes a channel number (CHNO.) pointing to an entry in a primary channel table 241, and a primary stream context identifier (Cid). The primary stream context identifier includes a Forwarder context identifier field 242 and an Owner context identifier field 243. The primary channel table 241 includes pointers to more detailed information about the status of each TCP connection, such as the stream contexts that are using each TCP connection, and a record of when the TCP connection was last used by the Forwarder and the Owner for each of the stream contexts.

There is a fixed number of open static TCP connections pre-allocated between the Forwarder and each Owner. This fixed number of open static TCP connections is indexed by entries of the primary channel table 241. Multiple clients of a Forwarder requesting access to file systems owned by the same Owner will share the fixed number of open static TCP connections by allocating virtual channels within the fixed number of open static TCP connections. In addition, dynamic TCP connections are built for Write_raw, Read_raw, and Trans commands.

For each pair of Stream_ctx objects from the Forwarder and the Owner, there is a corresponding virtual channel. The data mover uses the Round Robin method to allocate each virtual channel to at least one open static TCP connections. When more than one virtual channel are allocated to one open static TCP connection, the packets of the virtual channels are multiplexed over the one open static TCP connection. The Forwarder and the Owner use a Context identifier (Cid) to distinguish virtual channels within one open static TCP connection. Cid is defined as an ordered pair (Fctx_id, Pctx_id) where Fctx_id is a Forwarder context identifier, and Pctx_id is an Owner context identifier. The Cid is inserted into the message packets transmitted over the assigned opened TCP connection.

To open a virtual channel, the Forwarder creates a Cid by setting Fctx_id equal to the identifier of its stream_ctx object, and zeroes out the Pctx_id part of the Cid. The Forwarder transmits to the Owner a message packet including the Cid containing the Fctx_id and the zeroed Pctx_id. When the Owner receives the message packet and finds the Cid having a zero Pctx_id, it creates a stream_ctx object and sets the Pctx_id to the identifier of the stream_ctx object that it has created. The Owner returns to the Forwarder the Pctx_id to acknowledge that the virtual channel has been established. The Forwarder stores the Pctx_id in the stream Cid object indexed by Fctx_id.

Figure 14:
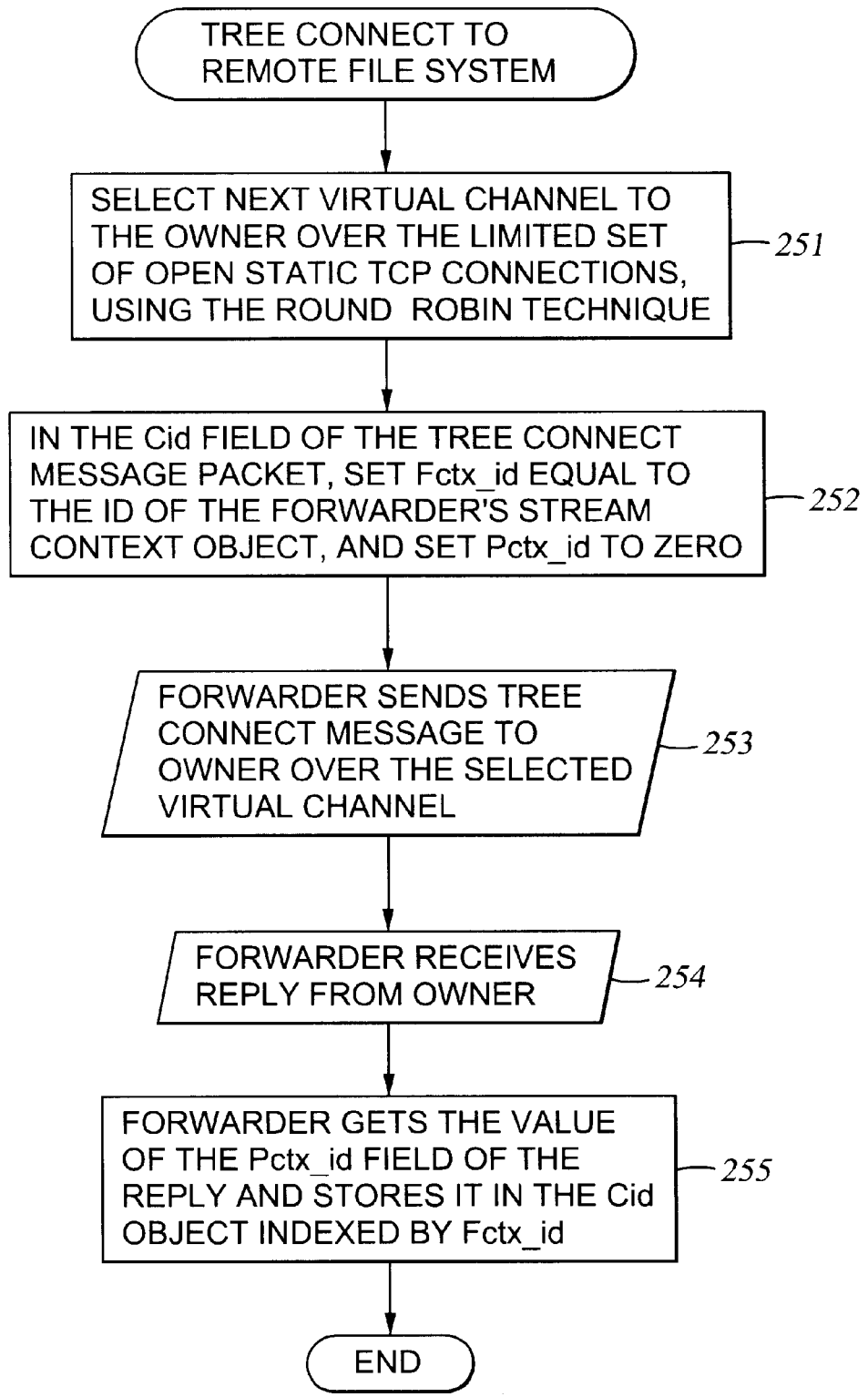
FIG. 14 is a procedure used by a data mover to dynamically assign a pre-opened TCP connection between data movers for remote file access.

FIG. 14 is a flowchart that illustrates programming of the Forwarder for opening a virtual channel between the Forwarder and an Owner when the Forwarder needs to establish a tree connection to a remote file system. In a first step 251, the Forwarder selects the next virtual channel to the Owner over the limited set of open static TCP connections using the Round Robin technique. For example, associated with each row of the primary channel table (227) there is a pointer to the last open channel from the Forwarder to the Owner. The Forwarder increments this pointer, and sets it to zero if it becomes greater than the predetermined maximum (n), and selects the virtual channel indicated by the pointer. Next, in step 252, in the Cid field of the tree connect message packet, the Forwarder sets Fctx_id equal to the identifier of the Forwarder's stream context object, and sets Pctx_id equal to zero. In step 253, the Forwarder sends the tree connect message to the Owner over the selected virtual channel. In step 254, the Forwarder receives a reply from the Owner. Finally, in step 255, the Forwarder gets the value of the Pctx_id field of the reply, and stores the value in the Cid object indexed by Fctx_id in the Forwarder's primary stream context table (240 in FIG. 13).

To close a virtual channel, a message packet is transmitted including one of the Fctx_id or Pctx_id set to 0xfff hexadecimal. For example, the Forwarder closes the virtual connection by transmitting to the Owner a message packet including the Cid containing Fctx_id set to 0xfff hexadecimal and the Pctx_id of the virtual channel to be closed. The Owner responds by removing the stream context object indexed by Pctx_id, and the Forwarder deletes the stream context object indexed by Fctx_id. In a similar fashion, the Owner may close a virtual connection by transmitting to the Forwarder a message packet including the Cid containing the Fctx_id of the virtual channel to be closed. The Forwarder responds by removing the stream context object indexed by Fctx_id, and owner deletes the stream context object indexed by Pctx_id.

Some messages sent from an Owner to a client are not the replies of any request. They are server-initiated messages, such as Notify and Oplock. When a TCP connection has been established from such a client through a Forwarder to such an Owner, the Forwarder will receive such a server-initiated message from the Owner. The Forwarder must determine the client to which the server-initiated message is directed, and the Forwarder must route the server-initiated message to the client. Because the Cid of the virtual channel between the Forwarder and the Owner has the field (Fctx__id, 242 in FIG. 13) holding the stream context id at the Forwarder, the Forwarder obtains the stream context id from the Fctx__id field in the Cid associated with the server-initiated message from the Owner, and then uses this stream context id to index the stream context to locate the client stream handle for the Forwarder-Client connection, and then uses the client stream handle to route the server-initiated message to the client.

Figure 15:
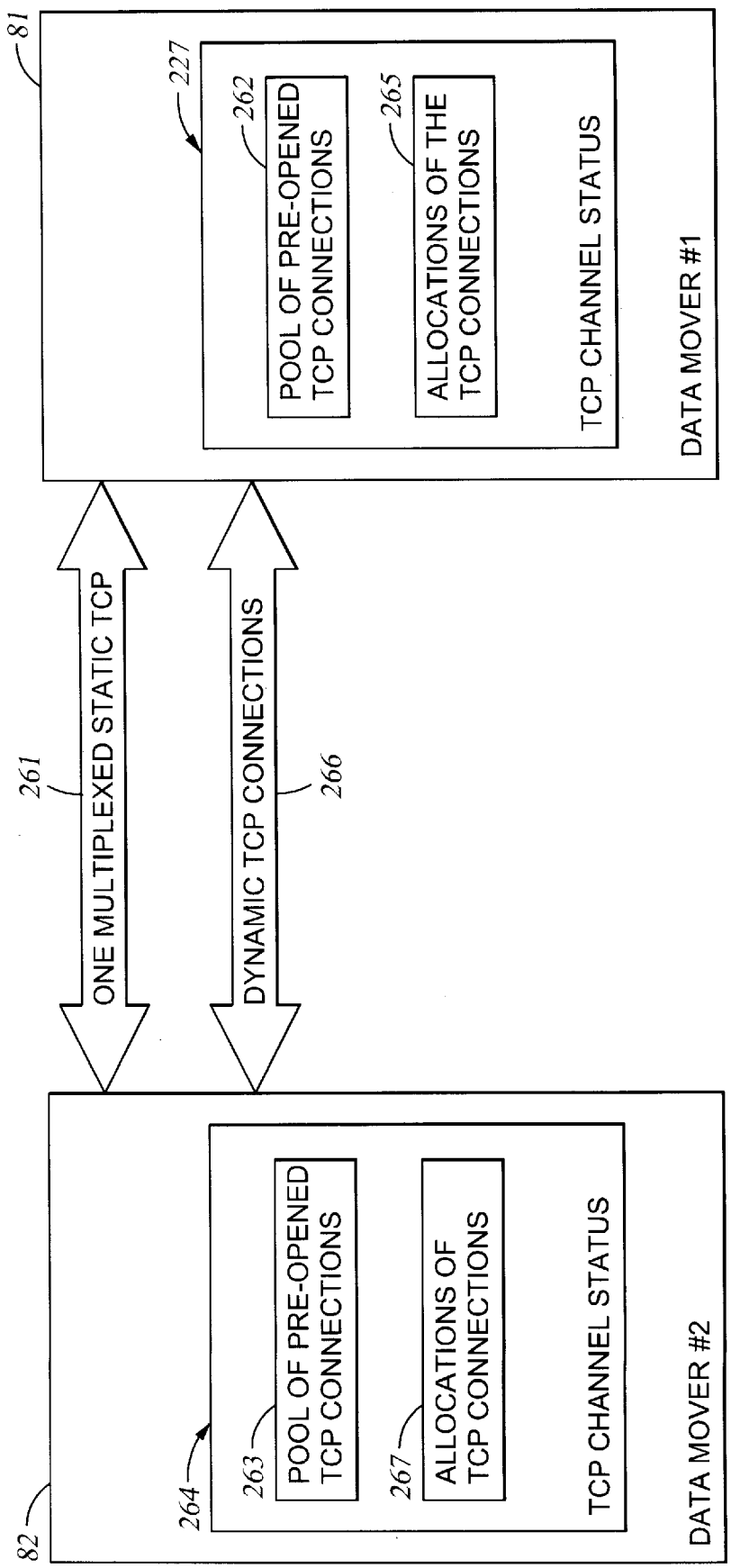
FIG. 15 is a block diagram showing various TCP connections between two data movers and associated data structures in the data movers.

With reference to FIG. 15, one multiplexed static TCP channel 261 is used for forwarding file access requests between the data movers 81 and 82. For some special requests and replies, such as for Write__raw, Read__raw, and Trans commands, the sequence of packets should not be altered or intruded by other request. Therefore, a dedicated communication channel 226 is dynamically allocated to such a request or reply from a pool of pre-opened TCP connections, in order to ensure the atomic property of the packets in the sequence. By pre-opening TCP connections and storing them in a pool, the peers avoid connecting and closing delay of a TCP connection. The number of TCP connections in the pool can be selected or adjusted in accordance with server load in order to reduce the overhead of managing the TCP connections. As shown in FIG. 15, the pool of pre-opened TCP connections is defined by a data structure 262 in the TCP channel status 227 as recorded in the data mover 81, and a similar data structure 263 in the TCP channel status 264 as recorded in the data mover 82. The TCP channel status 227 in the data mover 81 also includes a data structure 265 such as a table indicating the present allocations of the pre-opened TCP connections in the pool 262 to the one multiplexed static TCP connection 261 and any dynamic TCP connections 266 that are dedicated to instances of the special requests and replies. In a similar fashion, the TCP channel status 264 in the data mover 82 includes a data structure 267 indicating the present allocations of the pre-opened TCP connections in the pool 263. Each data mover monitors the communication from the other data mover to detect channel failure and to update its respective recording of the TCP channel status when channel failure is detected.

The connection between each client and a data mover is closed due to client inactivity for more than a predetermined amount of time. Client failure is presumed in this case. If the data mover is a Forwarder for the client, all virtual channels between the Forwarder and Owners for the client's stream context are explicitly closed.

Each virtual connection between each Forwarder and Owner is closed due to Forwarder inactivity for more than a predetermined amount of time. An attempt is made to re-establish a virtual connection over another open TCP connection between the Forwarder and the Owner. If this attempt is unsuccessful, Forwarder failure is presumed, and all virtual connections involved with this Forwarder are explicitly closed by the Owner.

Each virtual connection between each Forwarder and Owner is also closed due to Owner inactivity for more than a predetermined amount of time. An attempt is made to re-establish a virtual connection over another open TCP connection between the Forwarder and the Owner. If this attempt is unsuccessful, then Owner failure is presumed, and all virtual connections with the Owner are explicitly closed by the Forwarder.

Figure 16:
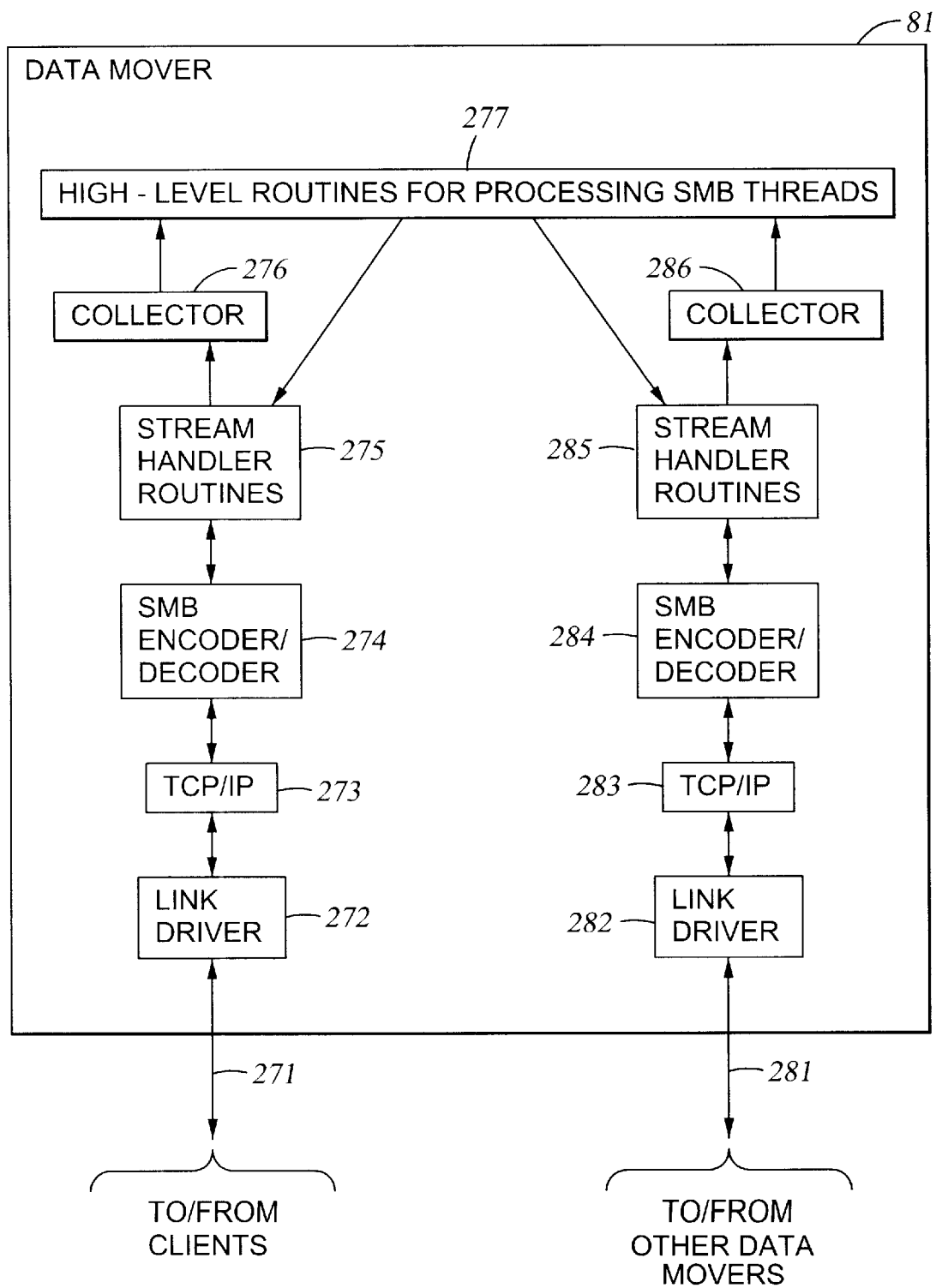
FIG. 16 is a block diagram showing various software programs in a data mover for communication of CIFS messages between the data mover and clients and between the data mover and other data movers.

With reference to FIG. 16, there is shown the organization of software modules in the data mover 81 for handling the message packets to and from network clients and to and from other data movers. The message packets to or from the network clients are conveyed over a network link 271. A link driver module 272 places the message packets in the link 271 for transmission to the clients, and receives message packets from the link 272 transmitted by the clients to the data mover 81. A TCP/IP module 273 handles the TCP/IP protocol of the message packets to and from the network clients. An SMB encoder/decoder module 274 encodes the SMB message packets for transmission to the network clients, and decodes the SMB message packets received from the network clients. Stream handler routines 275 function as an interface between the SMB encoder/decoder module and high-level routines 277 for processing SMB threads. The stream handler routines 275 identify the stream context of each SMB message, place the SMB message in a collector buffer or queue 276, and invoke the high-level routine including a code thread for processing the SMB message in accordance with the stream context. The high-level routines include conventional CIFS routines and routines which interface the stream handler routines 275 and the collector 276 (and also stream handler routines 285 and a collector 286) to the CIFS routines and which control the data-mover functions indicated in the flowcharts of FIGS. 5, 7, 9–11, and 14.

There is a similar layering of software modules between the high-level routines 277 and a data link 281 for transmission of message packets to and from other data movers. A link driver module 282 places the message packets on the link 281 for transmission to the other data movers, and receives message packets from the link 281 transmitted by the other data movers to the data mover 81. A TCP/IP module 283 handles the TCP/IP protocol of the message packets to and from the other data movers. An SMB encoder/decoder module 284 encodes the SMB message packets for transmission to the other data movers, and decodes the SMB message packets received from the other data movers. Stream handler routines 285 function as an interface between the SMB encoder/decoder module 284 and the high-level routines 277 for processing SMB threads. The stream handler routines 285 identify the stream context of each SMB message, place the SMB message in a collector buffer or queue 286, and invoke the high-level routines 277 including a code thread for processing the SMB message in accordance with the stream context. The stream hander routines 285 therefore perform the function of multiplexing the SMB messages of virtual channels that share an open TCP connection.

As suggested by the layering of the software modules in FIG. 16, a data access request from a client passes through the software modules when the data access request is forwarded by the data mover 81 to another data mover. Such a data access request passes from the data link 271 to the link driver module 272, from the link driver module 272 to the TCP/IP module 273, from the TCP/IP module 273 to the SMB encoder/decoder module 274, from the SMB encoder/decoder module 274 to the stream handler routines 275, from the stream handler routines to the collector 276, from the collector 276 to the high-level routines 277, from the high-level routines 277 to the stream handler routines 285, from the stream handler routines 285 to the SMB encoder/decoder module 284, from the SMB encoder/decoder module 284 to the TCP/IP module 283, from the TCP/IP module 283 to the link driver 282, and from the link driver module 282 to the data link 281 for transmission to the other data mover. A reply from this other data mover passes from the data link 281 to the link driver module 282, from the link driver module 282 to the TCP/IP module 283, from the TCP/IP module 283 to the SMB encoder/decoder module 284, from the SMB encoder/decoder module 284 to the stream handler routines 285, from the stream handler routines 285 to the collector 286, from the collector 286 to the high-level routines 277, from the high-level routines 277 to the stream handler routines 275, from the stream handler routines 275 to the SMB encoder/decoder module 274, from the SMB encoder/decoder module 274 to the TCP/IP module 273, from the TCP/IP module 273 to the link driver 272, and from the link driver module 272 to the data link 271 for transmission back to the client.

III. File Server System using File System Storage, Data Movers, and Exchange of Meta Data Among Data Movers for File Locking and Direct Access to Shared File Systems As described above with reference to FIG. 2 and FIG. 4, a data mover that does not own a file can read or write to the file over a data path that bypasses the data mover that owns the file. The data mover that owns the file will be referred to as the Owner or primary data mover with respect to the file being accessed, and the data mover that does not own the file will be referred to as a secondary data mover. In order to avoid data consistency problems, the secondary data mover obtains a lock on the file before it reads or writes to the file. The secondary data mover reads and writes to the file by transmitting data access commands to data storage for the file, such as a cached disk array storing a file system containing the file. These data access commands include storage addresses that specify where the file data is to be read from or written to in the data storage. The secondary data mover sends at least one request to the Owner to place a lock on the file and to obtain metadata of the file. The metadata includes information about where the file data is to be read from or written to in the data storage.

A. Software Modules in a Data Mover

Figure 17:
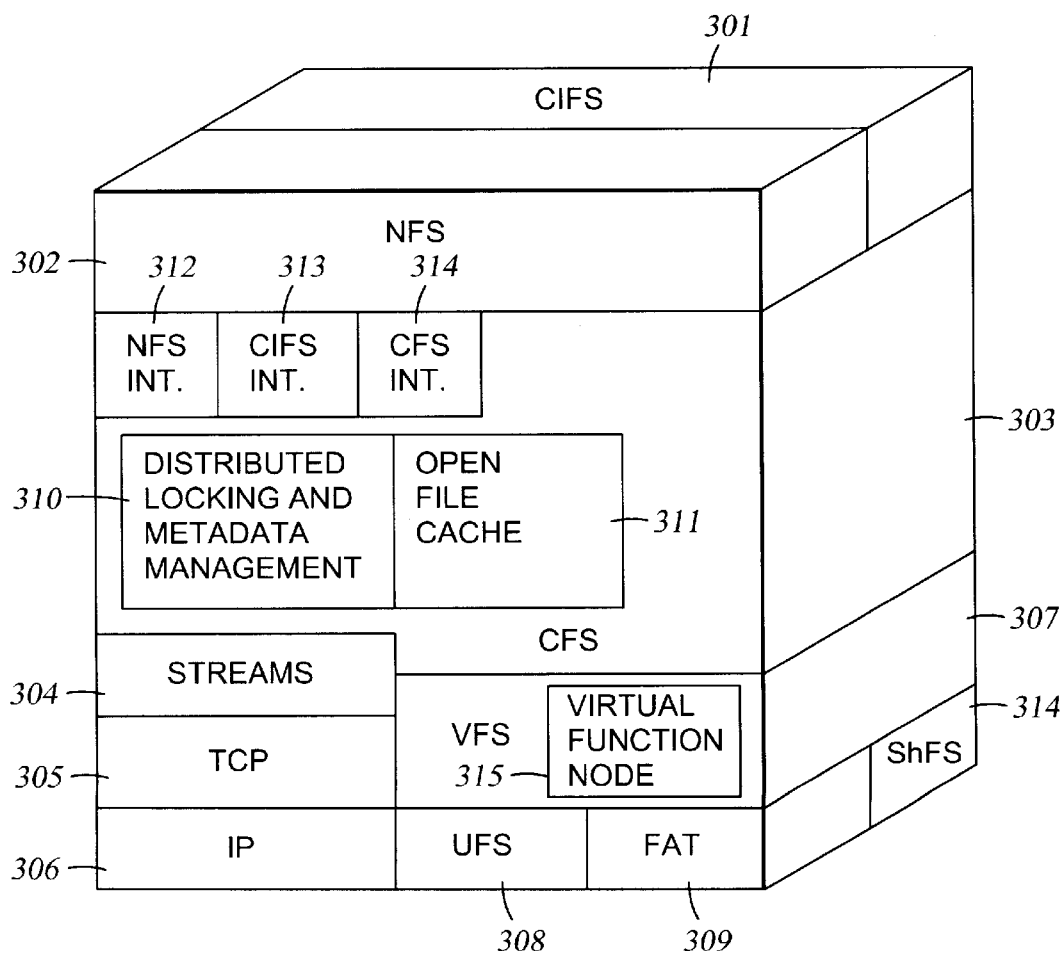
FIG. 17 is a block diagram showing a hierarchy or layering of software modules in a data mover.

With reference to FIG. 17, the preferred software for a data mover in any of FIGS. 2 to 5 includes a number of software modules. These include a Common Internet File System (CIFS) module 301, a Network File System (NFS) module 302, a Streams module 304, a Transmission Control Protocol (TCP) module 305, an Internet Protocol module 306, a Common File System (CFS) module 303, a Virtual File System (VFS) module 307, a Universal File System (UFS) module 308, and a File Access Table (FAT) module 309. The CIFS module 301, the NFS module 302, the TCP module 305, the IP module 306, the UFS module 308, and the FAT module 309 are conventional. The CFS module 303, the Streams module 304, and the VFS module 307 are obtained by modifying conventional modules, as described below.

The modules 301, 301 for network file access protocols (CIFS, NFS) are layered over a first group of modules 304, 305, 306 for network communication (Streams, TCP, IP) and a second group of modules 303, 307, 308, 309 (CFS, VFS, UFS, FAT) for file access. The UFS and FAT modules 308, 309 implement alternative physical file systems corresponding to the physical organization of the file systems owned by the data mover and located on a local data storage device such as a cached disk array interfaced to the data mover through the UFS and FAT modules 308, 309. The control paths from these two groups of modules meet at the network file service layer, such as NFS or CIFS. So a file service protocol module, such as NFS 302 or CIFS 301, receives a request from the Streams module 304 through a respective interface 312, 313, and services the request through the CFS/VFS/UFS path. After servicing the request, the reply is directed to the client through the TCP/IP network interface.

File data is usually cached at the Common File System (CFS) layer 303, while metadata is cached at local file system layer, such as UFS 308. The Common File System (CFS, 303) sits on top of the local file systems (UFS 308, FAT 309), and collaborates with VFS 307 to provide a framework for supporting multiple file system types. To ensure the file system consistency in case of a file systems crash, the metadata is usually written to nonvolatile storage in the local data storage device as a log record instead of directly to the on-disk copy for synchronous operations.

Given this architecture, a distributed locking protocol at a file granularity level can perform well. For very large files, it may be advantageous to lock at a finer, block range level granularity. In the distributed locking protocol, every file has a data mover that is its Owner. All other data movers (secondaries) must acquire proper permission from the Owner of that file before they can directly operate on that file.

Although the distributed file locking protocol could be implemented inside each network file service module (NFS and CIFS), this would not easily provide data consistency for any files or data structures accessible through more than one of the network file service modules. If multiple file services were provided over the same set of local file systems, then providing the distributed file locking protocol to only one network file service protocol will not guarantee file cache consistency. Also some of the data structures of the open file cache, maintained inside the CFS layer, are closely related to the data structures used in the distributed file locking protocol. Thus, maintaining similar data structures for the distributed file locking protocol at two or more places in different file service modules would make the system layering less clear.

In the preferred implementation, a new distributed file locking protocol module 310 is placed inside CFS 303 and is combined with the conventional open file cache 311 that is maintained inside the CFS layer 303. CFS 303 is the central point in the system layering for supporting multiple network file services to the clients upstream and utilizing multiple types of file systems downstream. By placing the distributed file locking protocol module 310 inside CFS 303, the file locking protocol can be used by all network file service protocols and can easily provide file locking across different file services.

In the preferred implementation, the CFS modules of each data mover can exchange lock messages with its peers on other data movers. The lock protocol and messages are file protocol independent. As shown in FIG. 17, CFS 303 uses the Streams module 304 for exchanging messages with other data movers. The Streams module 304 has a conventional interface 312 to the NFS module 302 and a conventional interface 313 to the CIFS module. In order for CFS 303 to use the Streams module 304, a new interface 314 is provided to the Streams module 304. This new interface 314 is a CFS thread handing module for listening for the lock messages received by the stream module, servicing the lock messages by performing any required lock operation including the sending of lock messages to other data movers via the stream module. In addition, a new virtual function node 315 is added inside the VFS module 307 to permit CFS to get information from the underlying local file system (UFS and FAT) that is relevant to the lock operations. For example, the metadata exchanged between the data movers in the distributed file locking messages may include a disk block list. The disk block list includes pointers to the disk blocks of a file being accessed. Usually this information is hidden from VFS and CFS because this information is internal to each local file system and VFS does not care how each local file system implements its disk operations and layout of file data on the disk storage devices. In order to allow local file systems of different data movers to cooperate with each other through the CFS layer, this information is made accessible to CFS.

B. The Preferred Distributed File Locking Protocol

Although CFS currently has a read-write locking functionality (rwlock inside File_NamingNode) for local files, it is not appropriate to use directly this read-write locking functionality for distributed file locking. There are several reasons for this. First, the rwlock function of CFS is for locking different local NFS/CFS threads, and not for locking file access of different data movers. The rwlock function is not sufficient for distributed file locking. For example, the distributed file lock needs to be able to identify which remote data mover holds which kind of lock, and also to revoke and grant locks. Second, the local file access requests and the requests from secondary data movers are at different levels in the system layering. A lock request from a secondary data mover can represent many file access requests that are local to the secondary data mover. It would be inefficient to allow each local NFS request to compete for the data-mover level file locks.

The preferred distributed locking scheme, therefore, a two-level locking scheme. First the data mover itself needs to acquire the global lock which is the data mover level distributed file lock across all data movers. After obtaining the global lock, an individual file access request needs to get the local lock (the current rwlock) and to be serviced, and the individual file access request may or may not immediately obtain a local lock. Once the file access request obtains both a global and a local lock, it can be serviced by UFS; otherwise, if the file access request obtains only a global lock, it will have to wait for other local requests to finish.

There is a design choice as to how the distributed locking scheme should process a thread of the network file service (NFS or CIFS) that cannot proceed because the distributed lock is not available. A first approach is to use a conditional variable so that execution of the threads will wait until the distributed lock (shared or exclusive) becomes available. A second approach is to put the requests of the threads into a waiting queue and return with a status set to be in progress, and when the distributed lock becomes available, all waiting requests are given to the threads from a pre-allocated threads pool inside CFS. The first approach is less complicated to implement, but the second approach gives more parallelism and may improve performance under heavy loading conditions.

The use of the two-level locking scheme permits the locking at the data-mover level of the network file server architecture to be transparent to the clients and transparent any locking at the file system level. At the data-mover level, the Owner keeps track of what kind of permission each secondary data mover has with respect to each file. It is the responsibility of the Owner to keep the locks on its files consistent across all data movers. The ownership of a file does not change. The permissions may have a reasonably long enough valid period.

In the preferred locking scheme, there are two kinds of distributed lock types, shared and exclusive. A shared lock gives a data mover the permission to read the file, while an exclusive lock gives the data mover permission to modify the file and its metadata. No two data movers can hold an exclusive lock simultaneously upon a file. A secondary data mover which has the lock can keep it forever unless the Owner wants it back or the secondary data mover itself releases the lock voluntarily.

For each file opened on any data mover, the distributed locking and metadata management module (310 in FIG. 17) maintains the following data structure:
class LockInfo {
Mutex mutex; //mutex to protect this LockInfo
File Handle file_handle; //uniquely identify the file
u_char lock_type; //can be SHARED, EXCLUSIVE, or NONE.
int local_readers; //reference count for local readers (e.g., NFS requests)
int local writers; //reference count for local writers (e.g., NFS requests)
struct NFS_requests *waiting_read; //list of local read requests waiting for shared lock
struct NFS_requests *waiting_write; //list of local write requests waiting for
//exclusive lock
int version; //version number of the metadata In this fashion, a LockInfo structure is maintained for each file opened on any data mover. Besides the information to uniquely identify the file, the LockInfo structure also records the reference counts of the number of local readers and writers (e.g., counts of NFS requests) who are currently holding the shared or exclusive locks, and the lists of queued local requests (read and write) which are not able to proceed because the required distributed lock is not available. The version number is used to keep the metadata up-to-date among all data movers.

The distributed locking and metadata management module (310 in FIG. 17) also maintains the following data structure of public locking information for each file owned by the data mover:

```
Class PriLockInfo:: public LockInfo {
u_short  remote_readers;      // bit fields indicating all remote readers
                              // (data mover).
u_char   remote_writer;       // remote writer (data mover).
u_short  waiting_readers;     // bit fields indicating all waiting readers
                              // (data movers), including this data
                              // mover.
struct DmList *waiting_writers;  // list of all data movers waiting for
                              // exclusive lock, including this one.
                              // A data mover can only have one entry
                              // in this list.
```

In this fashion, on each Owner, a PriLockInfo is maintained for each file it owns. This includes remote_readers (secondary data movers which have the shared lock), remote_writer (a secondary data mover which has the exclusive lock), waiting readers (secondary data movers who are waiting for a shared lock), and waiting_writers (all data movers who are waiting for exclusive lock).

The distributed locking and metadata management module (310 in FIG. 17) also maintains the following data structure for each file that is opened by the data mover but is not owned by the data mover:
Class SecLockInfo: : public LockInfo {
u_char status; //indicating whether it has been revoked by the Owner or not.

The SecLockInfo data structure therefore is maintained on each secondary data mover and only has an extra status field which indicates whether the lock has been revoked by the Owner or not.

In this preferred data-mover level locking scheme, the distributed lock couples tightly with the open file cache 311, so that the lock only applies to files, not directories.

There are four basic types of lock messages exchanged between data movers: lock request, grant, revoke, and release. The locking scheme favor writers, either local or remote, over readers. This is done to reduce the slight chance that readers are starved because of too many writers. In order to favor writers over readers, if only a shared lock and not an exclusive lock can be granted, and there are waiting writers, no shared lock is normally granted; instead, the Owner waits until the exclusive lock can be granted. This general policy need not always be followed; for example, for certain files, or certain readers or writers.

A lock can be granted to a local file access request if the lock type is compatible with the lock needed by the file access request and there are no conflicting lock requests from other data movers or the lock is not being revoked. A lock can be granted to a secondary data mover when no other data movers in the system are holding conflicting locks. Granting a lock to a secondary data mover will result in sending a lock granting message, while granting a lock to the Owner will just release all local data access requests currently waiting for the lock.

If a secondary data mover receives a local file access request, it first finds the SecLockInfo of the target file to be accessed. If the lock can be granted, the reference count is increased and the call is served. Otherwise, the file access request is put into the waiting request list and a lock request message is sent out to the Owner. When the local file access request finishes, the reference count is decreased, and if the count goes to zero and the lock is revoked, then the lock release message is sent to the Owner. If the lock grant message arrives, the SecLockInfo data structure is updated and all local file access requests waiting for that lock are dequeued and are serviced. If a lock revocation message arrives and the lock can be revoked, then the lock release message is sent out. Otherwise, the status field is set to prevent all further local file access requests from obtaining the lock.

If a local file access request is received in an Owner of the file to be accessed, the action is similar to that on a secondary data mover except that if the lock cannot be granted, then an identification of the Owner is placed into the waiting_readers or waiting_writers field. If there are secondary data movers holding conflicting locks, then the lock revocation messages are sent to them. Similar actions are taken for lock requests from other data movers.

Figure 18:
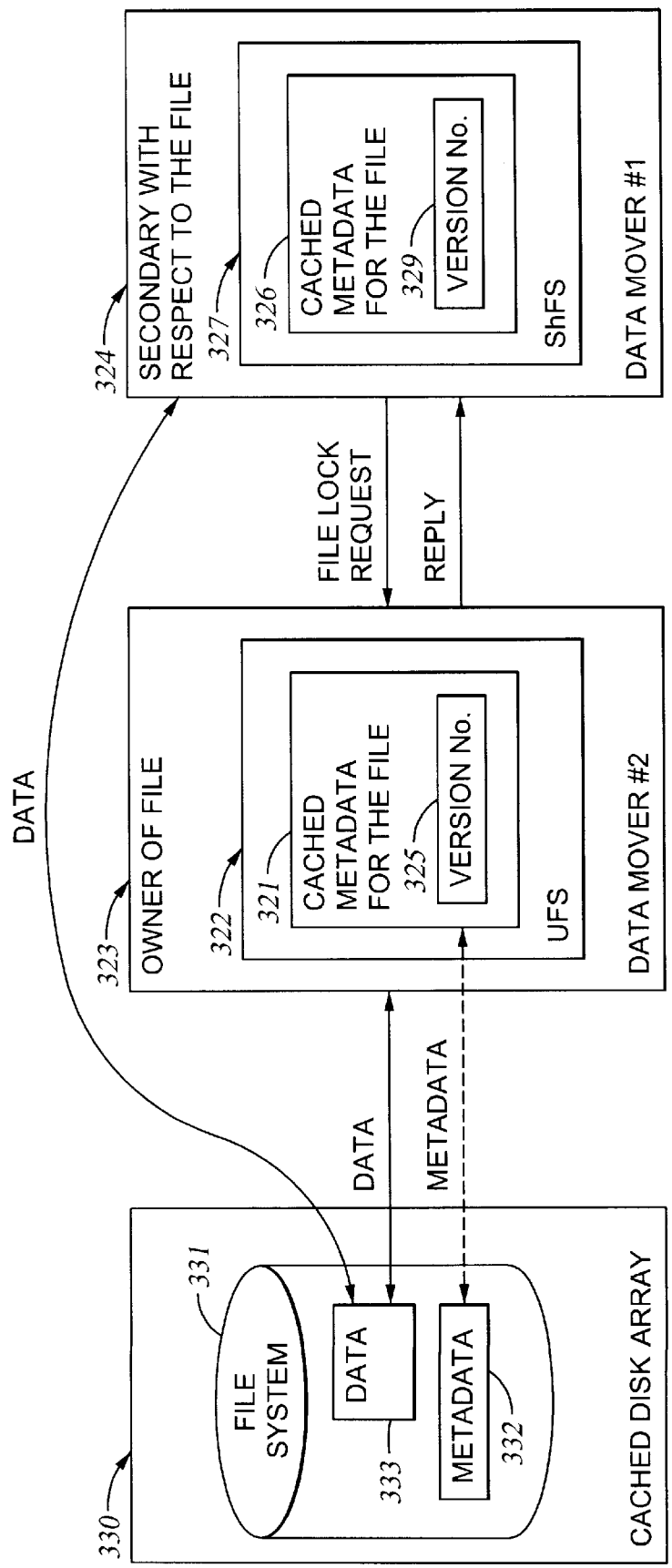
FIG. 18 is a block diagram showing the management of metadata for a file in a data mover that owns the file and a data mover that is secondary with respect to the file.

In the preferred scheme, as show in FIG. 18, a file's metadata 321 is cached inside UFS 322 if the file is owned by the data mover 323, and a synchronous write only updates the metadata log, so that the metadata is only known to the Owner. Therefore, the metadata 321 should be sent to secondary data movers (such as the data mover 324) if they also want to operate on the file. A version number 325 associated with the metadata of each file is used to guarantee that every data mover always uses the most up-to-date version of the metadata to access the file. Metadata is also cached on secondary data movers to improve performance. This metadata 326 is cached inside ShFS 327 in the secondary data mover 324. This metadata 326 also has an associated version number 329 Every time the metadata is changed on a data mover, the version number associated with that metadata on that data mover is increased by one. During a commit or close operation, new metadata is written back from the owner's metadata cache 321 to metadata storage 332 of the file system 331 in the data storage device (such as the cached disk array 330) To avoid a data security problem, the metadata 332 in the file system 331 is always written back to data storage after the corresponding data 333 has been updated.

Figure 19:
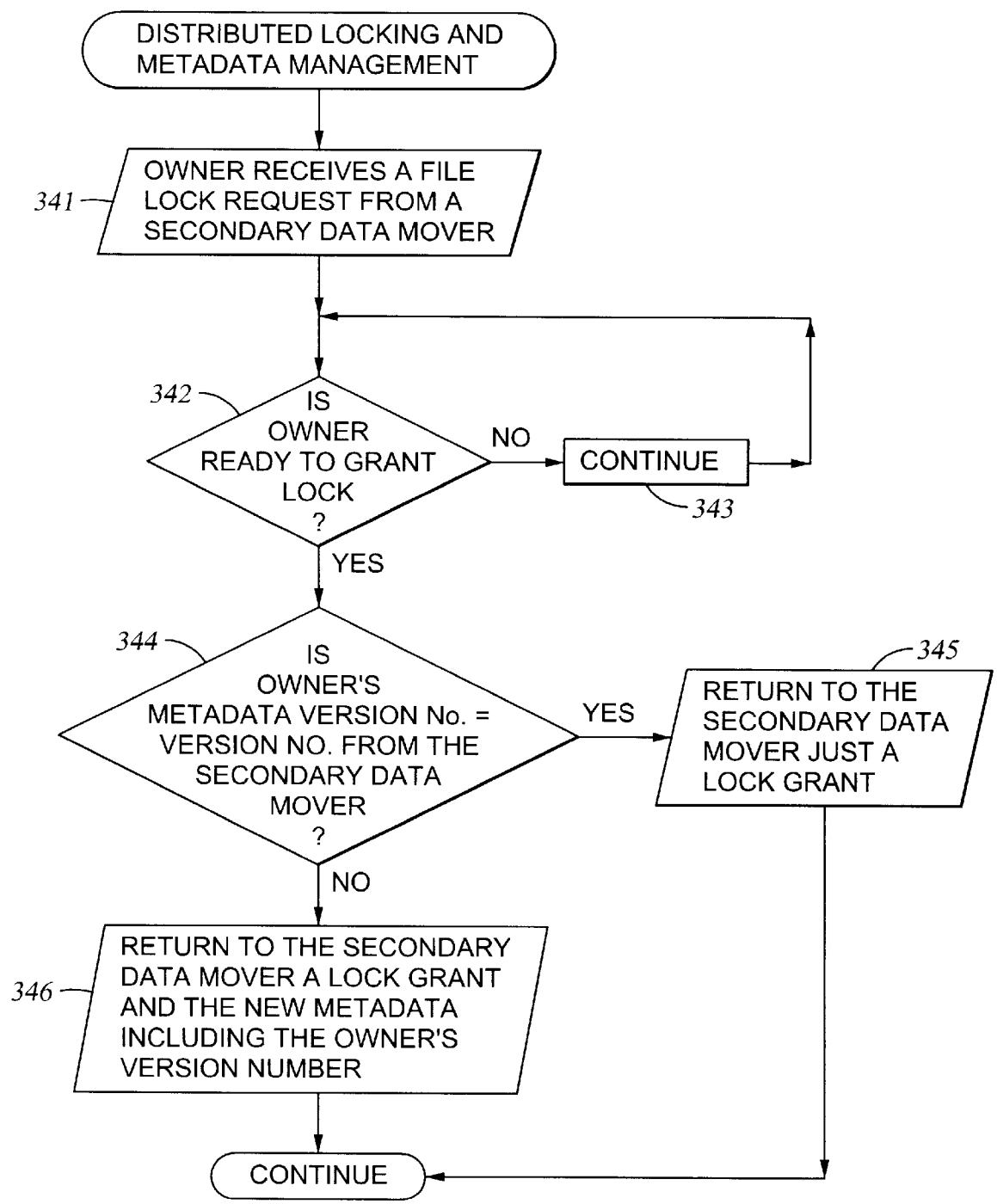
FIG. 19 is a flowchart of a routine used by a data mover that owns a file to respond to a request from a data mover for a distributed lock on the file.

FIG. 19 shows a flowchart of a procedure in the distributed locking and metadata management module (310 in FIG. 17) by which the Owner of a file keeps the metadata in the secondary data movers current with the metadata in its cache. In a first step 341, the Owner receives a request from a secondary data mover for a lock upon a file owned by the Owner. The secondary data mover will include its metadata version number in its lock request message. In step 342, the Owner checks whether it is ready to grant to the secondary data mover a lock on the file. If the Owner cannot presently grant a lock on the file, then execution branches from step 342 to step 343 where execution continues until the Owner is ready to grant the lock. When the Owner is ready to grant the lock, execution continues from step 342 to step 344. In step 344, the Owner checks whether the version number from the lock request is the same as the version number of the metadata that the Owner has. At this time the Owner will have the most up-to-date version of the metadata. If Owner's version number is the same as the version number from the secondary data mover, then the secondary already has the most up-to-date version of the metadata, and execution branches from step 344 to step 345 where the Owner just grants the lock, without any need for sending metadata to the secondary data mover. Otherwise, execution continues from step 344 to step 346 where the Owner grants the lock and also returns the new version of the metadata to the secondary data mover. This new version of the metadata includes the Owner's version number for the new version of the metadata. On the other hand, as further described below with reference to FIG. 21, if a secondary data mover modifies the file and as a result the file's metadata is changed, it will increase the version number, when it releases the lock, it will tell the Owner about the new metadata. In this way, the metadata is not exchanged between the data movers unless it has been modified on some data mover and further requested by others. The version number is exchanged and compared to make sure that every data mover always caches and operates on the most up-to-date version of the metadata, so that the exchange of metadata from a secondary data mover to the Owner follows release consistency, and the exchange of metadata from an Owner to a secondary data mover follows entry consistency.

Figure 20:
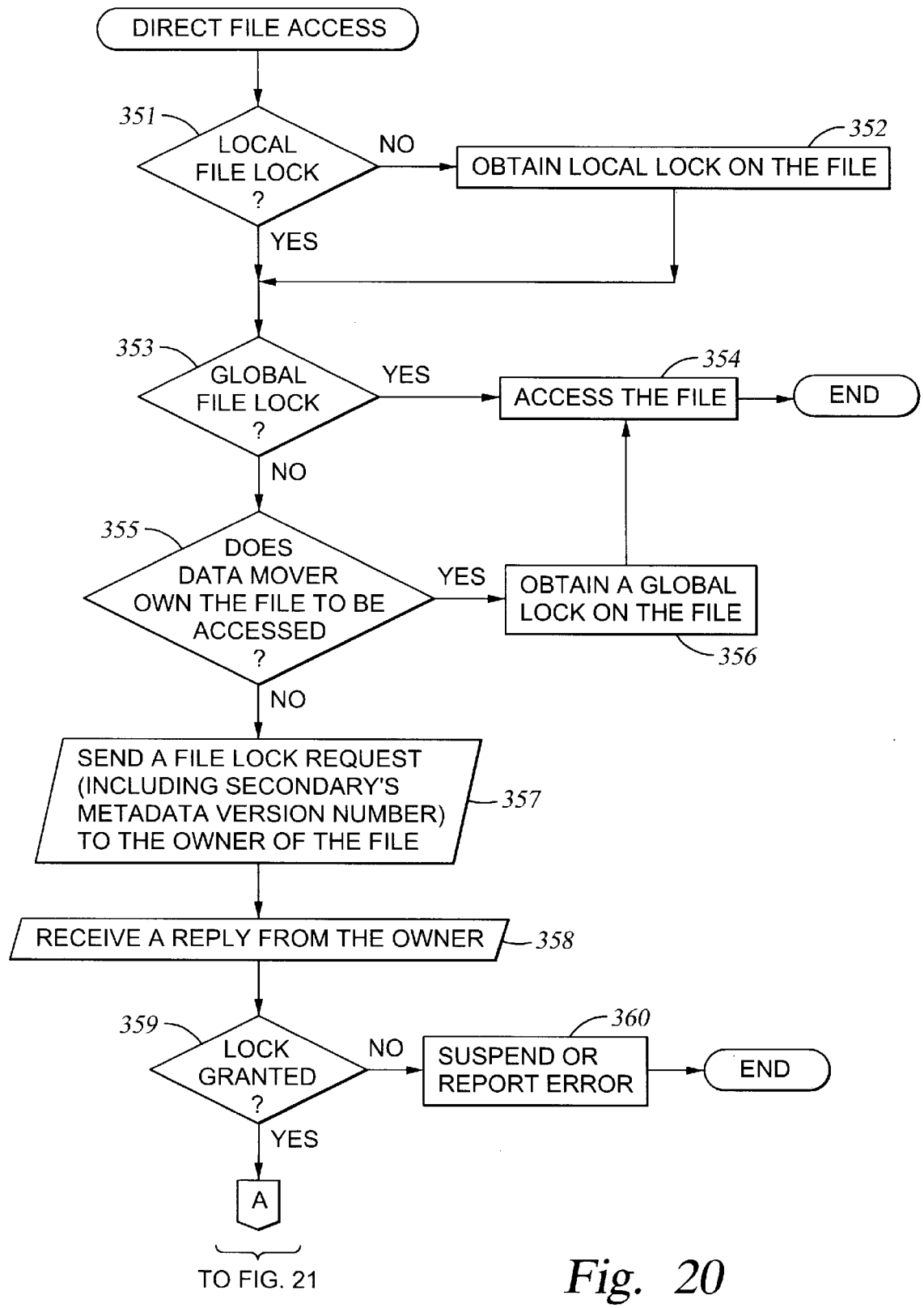
FIG. 20 is a first portion of a flowchart of a routine used by a data mover for directly accessing data of a file in network data storage.
Figure 21:
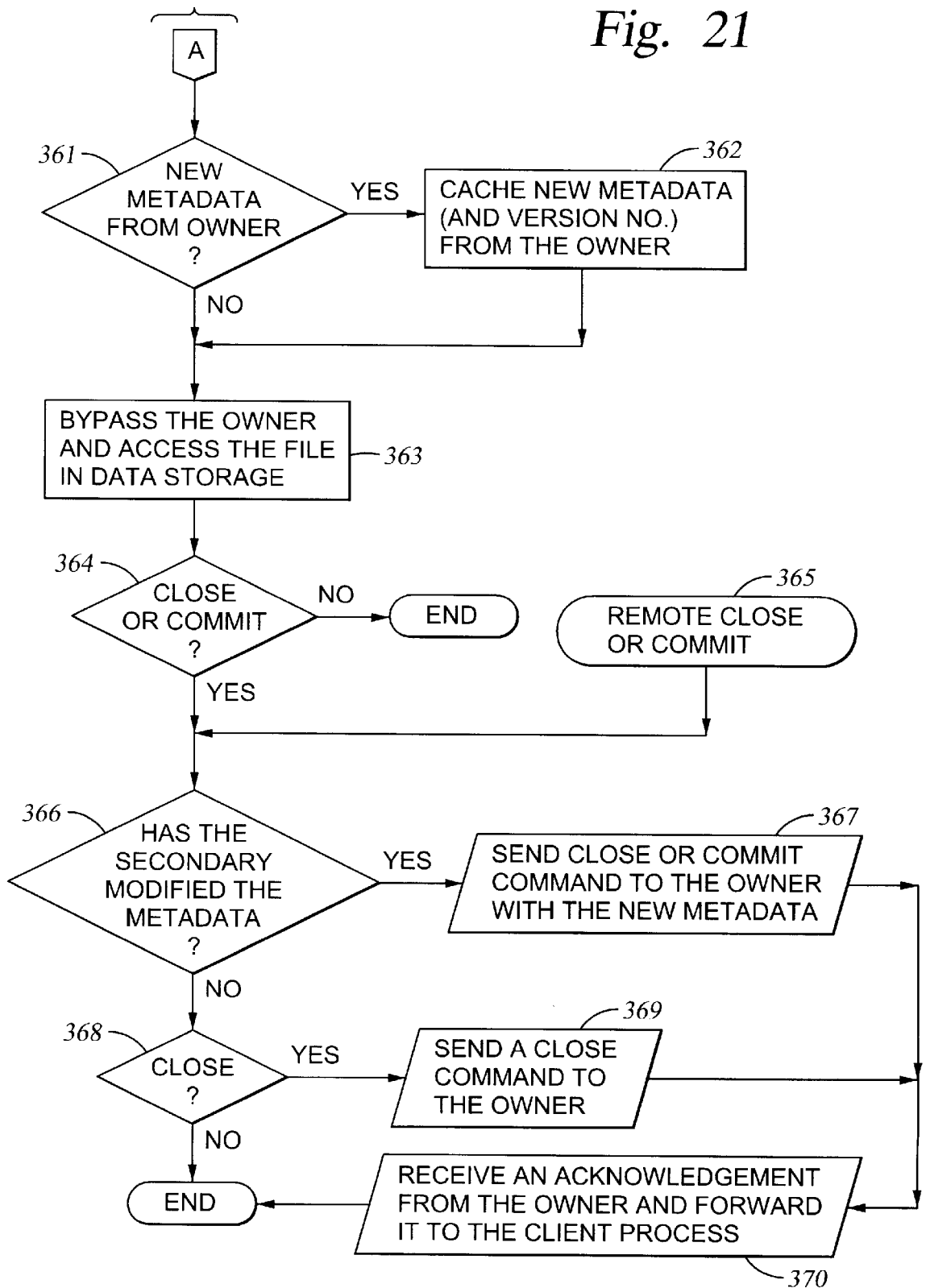
FIG. 21 is a second portion of the flowchart begun in FIG. 20.

With reference to FIGS. 20 and 21, there is shown a flowchart of the preferred procedure by which the data movers 41, 41 in FIG. 2, and the data mover 82 in FIG. 4, accesses a file in response to a request from a client process. In a first step 351, a file directory is inspected to determine whether there is a local lock on the file for the client process. If not, execution branches to step 352 to obtain a local lock on the file. Steps 351 and 352 are conventional. If a local file lock on the file for the client process is found in step 351 or obtained in step 352, then execution continues to step 353. (Steps 353 and 356–369 in FIGS. 20–21 are controlled by execution of instructions in the distributed locking and metadata management module 310 of FIG. 17.) In step 353, the distributed locking data structure is inspected to determine whether the data mover has a global lock on the file. If so, then the file is accessed in step 354. If the file is owned by the data mover, then the file access in step 354 is done in a conventional fashion. Otherwise, if the file is owned by another data mover, then the file data is accessed over a data path from the data mover that bypasses the Owner of the file, and in addition any commit operation or file close operation is performed as described below with reference to FIG. 21, beginning at the entry point 365 in FIG. 21.

If in step 353 it is found that the data mover does not have a global lock on the file, then in step 355 the file system mapping table (212 in FIG. 12) is inspected to determine whether the data mover owns the file to be accessed. If so, then in step 356 the data mover obtains a global lock on the file, and then continues in step 354 to access the file. If in step 355 it is found that the data mover does not own the file to be accessed, then execution continues from step 355 to step 357. In step 357 the data mover (which has been found to be a secondary data mover with respect to the file) sends a file lock request to the Owner of the file. This file lock request includes the secondary data mover's metadata version number. In step 358 the secondary data mover receives a reply from the owner. If this reply is not an acknowledgment of a lock granted, as tested in step 359, then in step 360 the data access request is suspended pending a grant of the lock, or if a lock can never be granted, an error is report. If the reply is an acknowledgment of a lock granted, then execution continues from step 359 to step 361 of FIG. 21.

With reference to FIG. 21, in step 361, the secondary checks the lock granted reply for any new metadata for the file. If there is new metadata, then execution branches to step 362. In step 362, the secondary data mover caches the new metadata and its version number from the owner. After step 362 execution continues to step 363. Execution also continues from step 361 to step 363 if the lock granted reply did not include any new metadata. In step 363 the secondary bypasses the Owner to access the file in data storage. Then in step 364 the processing of the file access request is finished unless there is a "close" or "commit" operation associated with the command. For example, if the file access command is a read or write command in a synchronous mode of operation, then a commit operation will be implied.

If processing of the file access request includes a close or commit operation, then execution continues from step 364 to step 366. In step 366, execution branches depending on whether the secondary data mover has modified the metadata associated with the file. For example, when the secondary data mover modifies the metadata associated with the file, its associated version number is incremented, and a modification flag for the file is also set in the metadata cache. The modification flag for the file is inspected in step 366. If the metadata has been modified, execution branches to step 367. In step 367, the secondary sends a close or commit command to the owner with the new metadata, including the new version number. If in step 366 it is found that the secondary has not modified the metadata, then execution continues from step 366 to step 368. In step 368, for a close command, execution branches to step 369. In step 369, the secondary sends a close command to the Owner. The close command need not include any metadata, since the metadata from the Owner should not have been modified if step 369 is ever reached. After steps 367 or 369, execution continues to step 370. In step 370, the secondary receives an acknowledgment of the close or commit command from the Owner, and forwards the close or commit command to the client process. After step 370, processing of the file access request is finished. Processing of the file access request is also finished after step 368 if processing of the request does not include a file close operation.

C. Management of Metadata in a Secondary Data Mover

As described above, in order for a secondary data mover to access data of a file over a data path that bypasses the Owner, the secondary data mover must obtain metadata of the file in addition to a distributed lock over the file. In the preferred implementation, the metadata is exchanged between an Owner and a secondary data mover as part of the data-mover level distributed file locking protocol. The metadata includes the disk block numbers of the file. The disk block numbers are pointers to the disk storage locations where the file data resides.

The disk block numbers are only valid within a particular file system. Also access of these disk blocks has to go through the underlying logical volume inside the local file system. All this information is usually inside the inode structure of the file, and is stored as an in-memory vnode inside VFS and in an inode inside UFS. The file handle of the request contains the file system id and the inode number of the target file within the file system. Since the inode number is only valid inside a file system (UFS), there is no conventional way for local file systems on a secondary data mover to directly use the inode number of a different local file system on Owner. The conventional software modules such as VFS, UFS, etc., do not provide sufficient infrastructure to permit a secondary data mover to operate on the remote files through the same interface as its local files with the file handle.

A preferred way to solve this problem is to provide a new Shadow File System (ShFS) module (314 in FIG. 17) on every secondary data mover. The ShFS module is used to implement one shadow file system (ShFS) for every local file system on each Owner for which we want to provide read-write sharing. A ShFS on a secondary data mover shadows a real local file system on an Owner, so that under the new structure, the Owners are differentiated from secondary data movers. The Owner has the real local file systems, such as UFS, while secondary data mover has the shadowed local file systems. ShFS serves the file read and write requests locally on secondary data movers through read-write sharing while other NFS or CIFS requests, such as directory operations, file create, and delete, are still forwarded to the Owners because the performance gain for such operations usually are not worth the effort of exchanging locks and metadata information.

In the preferred implementation, ShFS is created and mounted on all secondary data movers that will share a file system when that file system is mounted on its Owner. This is similar to the current secondary file system (SFS) except that ShFS has all the information about the volumes made of the real local file system. ShFSs provide the proper interfaces to CFS and VFS to allow operations on files owned by those data movers they shadow. Unmount UFS on an Owner results in unmounting ShFSs on all data movers that are secondary with respect to the Owner. For a request on a remote file, CFS uses the primary id and file system id inside the file handle to find the proper ShFS, and use the inode number to find the snode. Anything after that should be the same as if the file is owned by a local data mover from the CFS point of view. As soon as CFS receives the lock grant of a file from its Owner, it constructs in ShFS an inode corresponding to the snode of the file in UFS, also constructs in ShFS associated data structures. The inode in ShFS is more specifically called an "snode." ShFS accesses the volume of the file system it shadows directly by creating and opening the same volume again. Every time the volumes are changed on an Owner, the change is propagated to the ShFS on each secondary data mover, so that ShFS shadows newly added volumes or file systems. Therefore, it is preferred that the logical volume database (in the file system mapping tables 212, 213 in FIG. 12) on all data movers within a share group are the same. The implementation of ShFS and the snodes is similar to that of UFS except that ShFS directly operate on file inodes, disk blocks instead of the file names.

Because a secondary data mover is permitted to bypass the Owner to write directly to a file, the secondary data mover obtains at least a portion of the free block list of the file and then update the metadata and the file data. In a preferred implementation, when the Owner grants the exclusive data-mover-level distributed file lock to the secondary data mover, it also gives out some portion of the free-block list to the secondary data mover. In this way the Owner retains the task of exclusive management of the free-block list and knowledge of how to allocate free blocks for each file that it owns. When the secondary data mover receives the portion of the free-block list, it can then update the metadata and file data. For file data, there is no special requirement. If the write is synchronous, then the secondary data mover just writes the file data directly to the disk blocks because it knows where those blocks are. However, metadata is more difficult to update. Because metadata is also written out as a record inside the log, this would require that secondary data mover can also directly write to both the record log and the on-disk metadata structure. This would be rather difficult to do. A compromise is that: secondary data mover only writes the file data, and the metadata is just cached inside ShFS, not written to disk, neither the log nor the on-disk copy.

In the preferred implementation, there are four kinds of metadata that are logged under the file systems. These metadata are inodes, directories, allocation bitmaps, and indirect blocks. Since ShFS only deals with file reads and writes, it can only potentially modify inodes and the indirect blocks of metadata of a file. For file write requests that modify the metadata, the in-memory metadata are changed, but no logs are generated on the log disk. When the exclusive lock is to be revoked, or during a fsck, or the client wants to do a commit, the secondary data mover sends the metadata to the Owner which writes the metadata to both the record log and on-disk copy, in that order. Since using this approach ShFS does not generate log or touch any on-disk log at all, its implementation is much simpler than that of UFS. This approach takes advantage of the fact that NFS v3 has both synchronous and asynchronous writes. Therefore, the Owner allocates disk blocks for the secondary data mover while secondary does the actual disk write operation.

There are several ways that the Owner can allocate disk blocks for the secondary data mover. In a preferred implementation, the secondary data mover tells the Owner that it wants to grow the file for some number of disk blocks. The Owner does the blocks allocation and allocates proper indirect blocks for the growth and informs the secondary data mover. Therefore, a secondary data mover works on the new file's metadata. During this allocation, the blocks are not logged inside the log on the Owner and the file's in-memory inode structure is neither changed nor logged. When the secondary data mover sends the metadata back, the inode and indirect blocks are updated and logged. Some unused blocks are also reclaimed, because the free disk blocks are not shareable across different files inside one shadow file system. This makes ShFS's behavior different from that of UFS. Since ShFS does not have the usual file system structures, it does not support many of the normal file system operations, like name lookup. For those operations, ShFS can just return a proper error code as SFS currently does.

Figure 22:
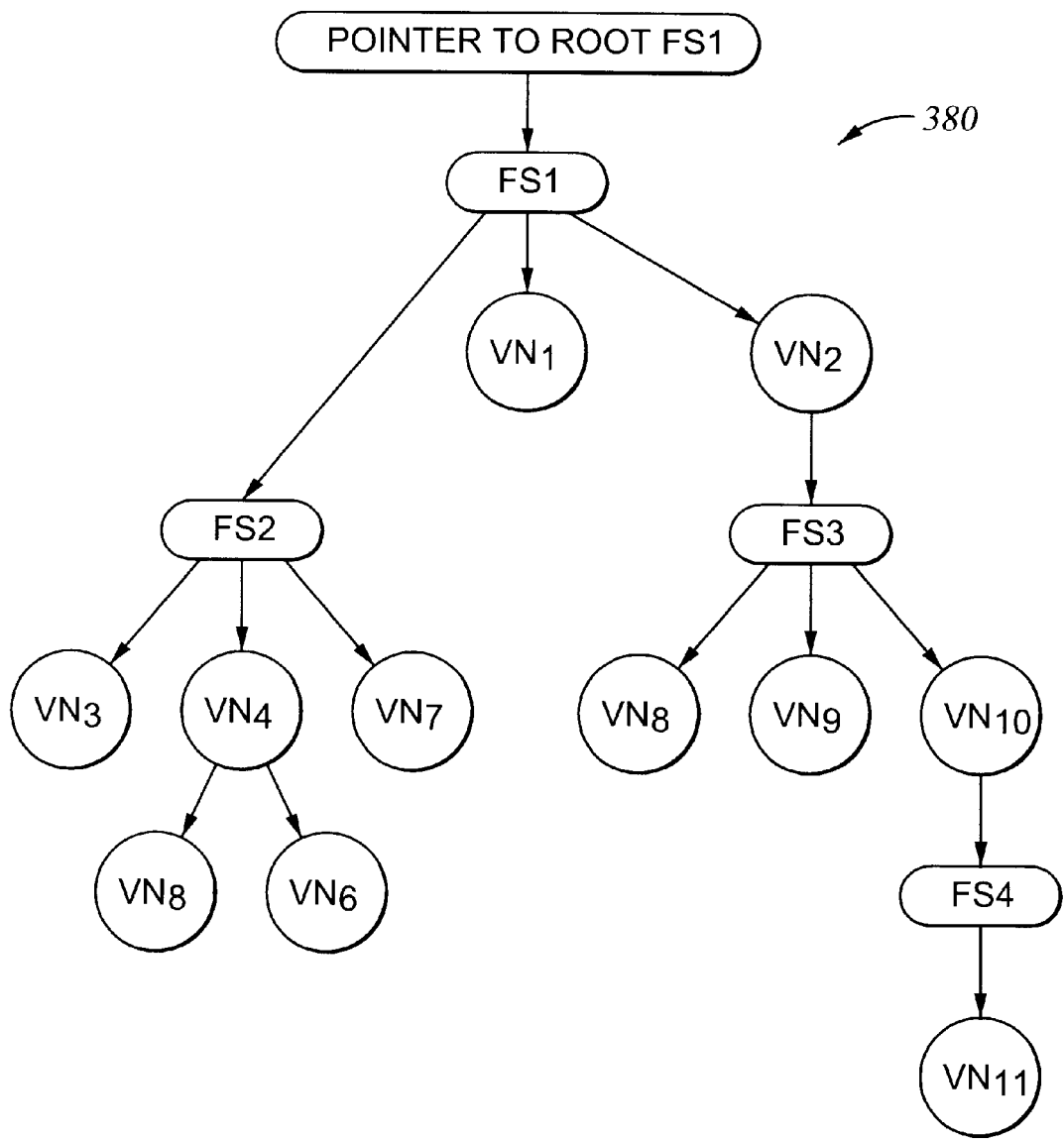
FIG. 22 is a graph of file systems and virtual nodes as maintained by the UFS software mode of FIG. 17.
Figure 23:
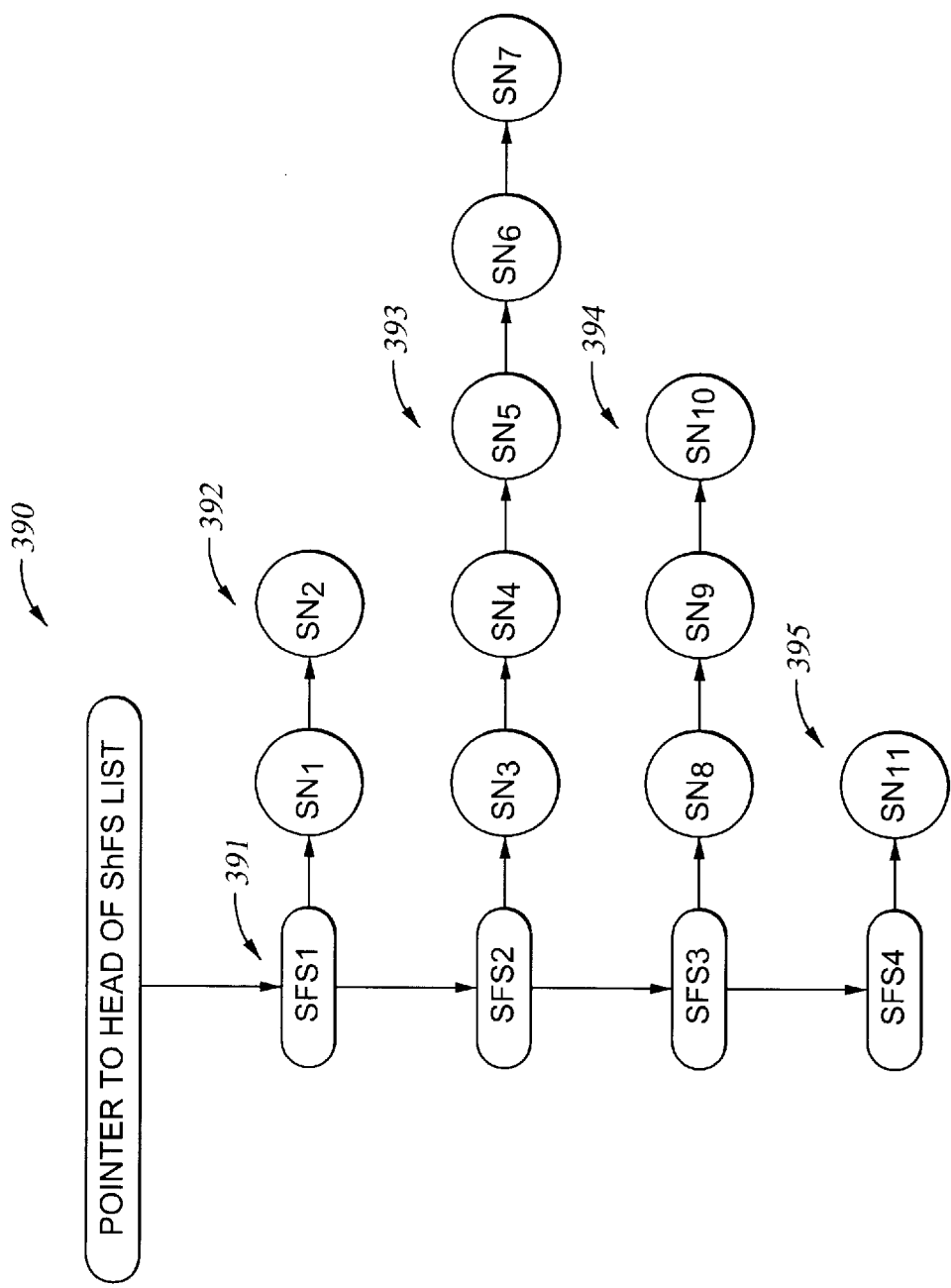
FIG. 23 is a graph of shadow file systems and shadow nodes as maintained by the ShFS software module of FIG. 17.

With reference to FIGS. 22 and 23, there is shown a comparison of the file system node structure between an example of a UFS data structure 380 in FIG. 22 and a corresponding ShFS data structure 390 in FIG. 23. A single shadow file system (SFS1, SFS2, SFS3, SFS4) on a secondary data mover corresponds to a real local file system (FS1, FS2, FS3, FS4) on a remote Owner, while the snode corresponds to the vnode inside UFS. There is a one-to-one relationship between ShFS and UFS, as well as between the snodes ($SN_1$ to $SN_{11}$) and vnode ($VN_1$ to $VN_{11}$), except that ShFS does not have the hierarchical directory structure that UFS has. As shown in FIG. 23, ShFS has a simple list structure, including a list 391 of shadow file systems (SFS1, SFS2, SFS3, SFS4) and a respective list 392, 393, 394, 395 of the snodes in each of the file systems. Based on ShFS, the action of CFS and VFS need not change no matter what the underlying file node is. File data is still cached at the CFS layer. The cache (311 in FIG. 17) is invalidated if the inode is changed. The metadata is cached inside the local file system's inode, either ShFS or UFS. However, the behavior of snode is different from the behavior of the vnode. Only a vnode can be directly read from and written to disk or modified from lock messages, while snode can only be constructed using the message from the Owner and, and modified snode state is sent back to the Owner. ShFS supports the same set of interfaces to VFS/CFS as that of UFS. Buffer cache maintenance in ShFS is similar to that in UFS except that in ShFS, before a lock is granted to a secondary data mover or released to an Owner, then the buffer needs to be flushed to stable storage.

When a client request for a remote file is received, CFS searches for the file system from the primary id and fsid of the file. Then it gets the file naming node using the inode number within the file handle from the file system. During this step, the thread may block if the required lock is not available. For read and write requests, CFS blocks the thread while sending the lock request message to the Owner. Therefore, the get-node-from-handle step may take much longer. For read and write requests, this is also true on Owners if a conflicting lock is being held at secondary data movers. Requests other than read and write requests upon a remote file are done by forwarding the request to the Owner. The get-node-from-handle call is provided with an extra argument which indicates what kind of distributed lock this request needs. When the get-node-from-handle returns, the proper distributed lock is acquired and the reference count has been increased. The implementation of the inode structure of snode might be different from that of the UFS inode. On UFS, the on-disk inode is read into memory if the file is opened; however, the indirect blocks or metadata may be either in-memory or on-disk. If they are in-memory, they are stored inside the file-system-wide indirect blocks cache. This implementation makes sense because it is possible that not all indirect blocks may be in memory at the same time and the cache is necessary. The cache is maintained not on a per file basis inside each vnode but on the whole file system basis. However, on ShFS, since all the indirect blocks and other metadata must be in-memory, it doesn't make sense to use a cache to cache only part of it because ShFS can't get the metadata directly from the disk. Indirect blocks inside snode can be implemented using the structure like the on disk inode structure. On UFS, the nodes are also inside a cache, but on ShFS all nodes are in memory.

A system administrator implements ShFS by sending configuration commands to the data movers. This could be done by sending the configuration commands from a client in the data network over the data network to the data movers, or the system administrator could send the configuration commands from a control station computer over a dedicated data link to the data movers. In any event, to mount a file system to a data mover, all the volume information is sent to the Owner so that the meta volume can be constructed on the Owner. Then the file system mount command is sent to the Owner so that the Owner will create the file system from the volume. Under the new structure with ShFS, the volume create commands are also sent to all the secondary data movers that will be permitted to access that volume, and thereby create a "share group" of data movers including the Owner, and create the volume on each of the secondary data movers in the share group. Then a command to create and mount a ShFS file system is sent to all of the secondary data movers in the share group. The creation of ShFS on each secondary data mover in the share group will open the volume already created using the same mode as on the Owner. In a similar fashion, the same unmount commands are sent to both Owner and the secondary data movers in the share group during unmount.

In addition to the mount and unmount commands, the data movers should recognize a change in ownership command. To perform a change in ownership of a file system, the original owner suspends the granting of distributed file locks on the file system and any process currently holding a file lock on a file in the file system is given a reasonable time to finish accessing the file. Once all of the files in the file system are closed, the original owner changes the ownership of the file system in all of the file system mapping tables (212 in FIG. 12). Then the original owner enables the new owner to grant file locks on the files in the file system.

A procedure similar to a change in ownership is also used whenever a data mover crashes and reboots. As part of the reboot process, the network file system layer (NFS or CIFS) of the data mover that crashed sends a message to other data movers to revoke all of the distributed locks granted by the crashed data mover upon files owned by the crashed data mover. This is a first phase of a rebuild process. In a second phase of the rebuild process, the crashed data mover reestablishes, via its ShFS module, all of the distributed locks that the crashed data mover has upon files owned by the other data movers. This involves the crashed data mover interrogating the other data movers for locking information about any distributed locks held by the crashed data mover, and the crashed data mover rebuilding the ShFS data structures in the crashed data mover for the files for which the crashed data mover holds the distributed locks. This places the system in a recovery state from which client applications can begin to recover from the crash.

The preferred implementation as described above could be modified in various ways. An alternative to placing the distributed lock mechanism in CFS is to put it in inside local file system. In this alternative, a UFS on an Owner would communicate with its corresponding ShFS on a secondary data mover. This would be done so that that current NFS read or write requests would first acquire the file node from the local file system and then open the file cache given the file node. The snode should exist before the opening of the file cache.

In another alternative implementation, a cache of indirect blocks would be used for ShFS. 1f the memory requirements are tight on a secondary data mover, then the secondary data mover may choose to release part of the indirect blocks by sending them to the Owner while still holding the lock over that portion. When the secondary data mover needs that metadata for that portion again, if the information is not inside the cache, then the secondary data mover may get the information from the Owner.

Instead of the disk block allocation method described above, the Owner could just allocate raw disk blocks without any consideration of how those blocks would be used. The secondary data mover would then decide whether to use those blocks for file data or as indirect blocks.

IV. File Server System Providing Direct Data Sharing Between Clients with a Server Acting as an Arbiter and Coordinator As described above with reference to FIG. 3, a file server 60 including a data mover 61 and a cached disk array 63 provides direct data sharing between network clients 64, 65 by arbitrating and coordinating data access requests. The data mover 61 grants file lock request from the clients 64, 65 and also provides metadata to the clients 64, 65 so that the clients can access data storage 62 in the cached disk array 63 over a data path that bypasses the data mover 61. The data mover 81, 82 and the clients 88, 89 in FIG. 4 may operate in a similar fashion.

In a preferred implementation of the data processing system of FIG. 3, the data mover 61 is programmed as described above with respect to FIGS. 17, 18, and 19 to grant distributed file locks to the clients 64, 65 and manage metadata in the same fashion as a data mover that is an Owner of the files to be accessed by the clients. The clients 64, 65 could also be programmed as described above with respect to FIGS. 17, 18, 20, and 21 to function in a fashion similar to a secondary data mover. Since each of the clients 64, 65 need not communicate with any other client nor own any files in the file system 62, the software for the client 64, 65 could be more compact than the software for a data mover.

In the preferred implementation of the system of FIG. 3, the clients 64, 65 may mount file systems on the cached disk array 63 by sending NFS commands to the data mover 61. The clients also have a configuration file associating volumes with file systems. The clients move file data directly to the cached disk array 63 using a high-speed data protocol such as is commonly used to read or write data directly to a disk drive over an SCSI or Fibre Channel link.

In the preferred implementation of the system of FIG. 4, the data movers 81 and 82 are each programmed as described above with reference to FIGS. 17 to 21. In addition, the data mover 81 is programmed to respond to distributed lock requests from the client 88, and the data mover 82 is programmed to respond to distributed lock requests from the client 89. The clients 88 and 89 are programmed in a fashion similar to the clients 64 and 65 in FIG. 3. However, in the system of FIG. 4, it is desirable for the client's configuration file to indicate the volumes that the client can directly access over a bypass data path, and the volumes that the client can only indirectly access through a data mover. When a client can directly access a file, sends a lock request to a data mover in accordance with FIGS. 20 and 21, and when the client can only indirectly access a file through a data mover, then the client sends a read or write request to a data mover in the conventional fashion.

Figure 24:
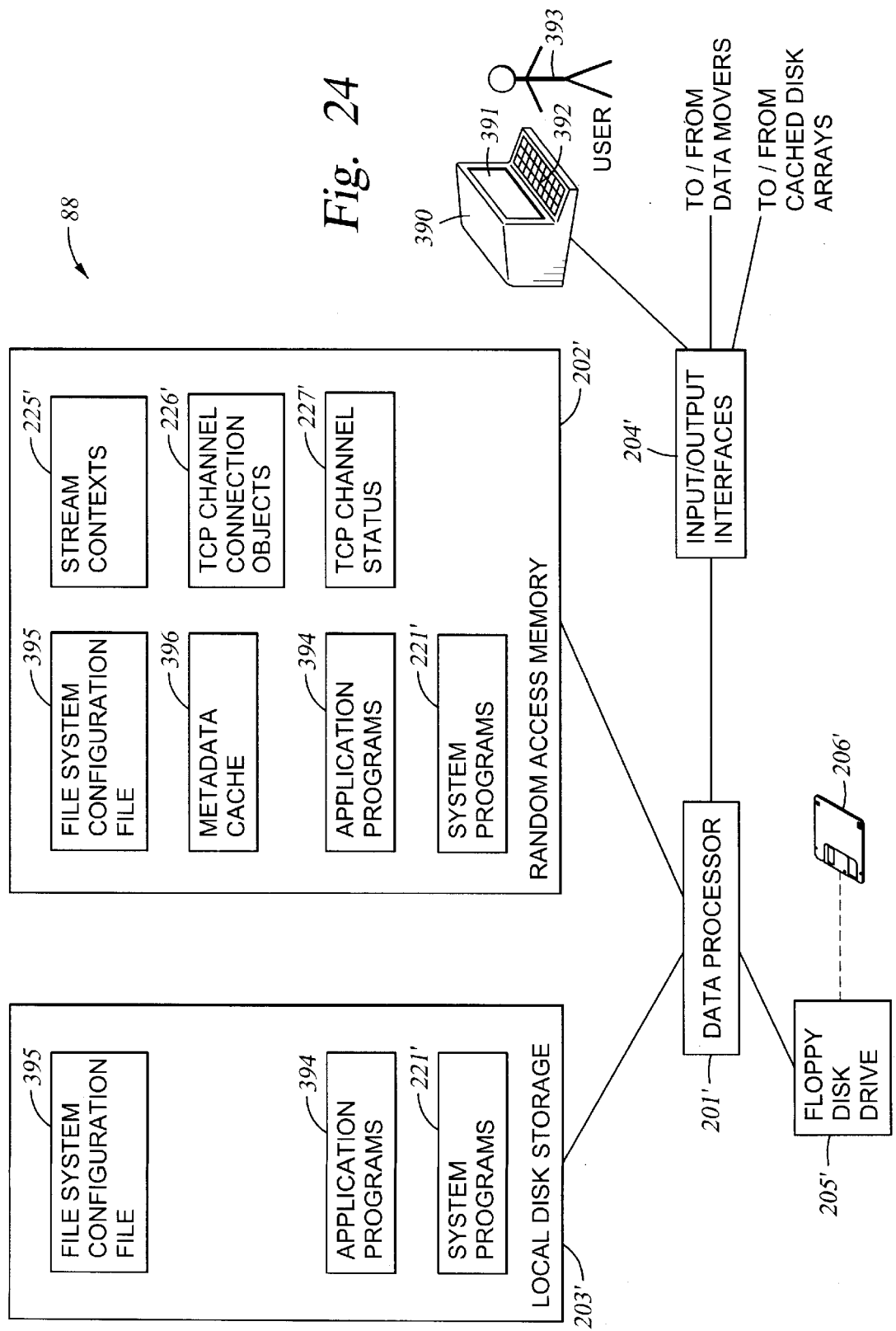
FIG. 24 is a block diagram of a client.

With reference to FIG. 24, there is shown a block diagram of the client 88. The client 88 is a data processing device similar to a data mover. For example, components of the client 68 in FIG. 24 that are similar to components of the data mover 81 in FIG. 12 are designated with similar but primed reference numerals. The client 88 includes a data processor 201', random access memory 202', local disk storage 203', input/output interfaces 204', and a floppy disk drive 205' for receiving programs and data from at least one floppy disk 206'. In addition, the client 88 has an input/output terminal 390 including a display 391 and a keyboard 392 for communicating with a human user 393. The local disk storage 203' contains system programs 221', application programs 394, and a file system configuration file 395. The file system configuration file indicates, for each of a number of file systems, the data movers to which the client should direct data access requests, and also indicates which of the file systems the client 88 can directly access over data paths that bypass the data movers, and the data paths or storage device ports that may be used for accessing each such file system that is directly accessible over data paths. that bypass the data movers. For execution by the data processor 201', the system programs 221' and application programs 394 are loaded into the random access memory 202' from the local disk storage 203'. The random access memory 202' also stores system program state information for controlling the exchange of information with the data movers that are linked to the input/output interfaces 204' in the data network (80 in FIG. 4). This system program state information includes stream contexts 225', TCP channel connection objects 226', and TCP channel status 227'. However, the client could communicate with the data movers by a variety of network communication protocols other than TCP. The random access memory 202' is also loaded with a copy of the file system configuration file 395 and functions as a metadata cache memory 396 for storing the metadata of files that have been opened by the client 88 for direct access of the cached disk arrays over data paths that bypass the data movers.

Figure 25:
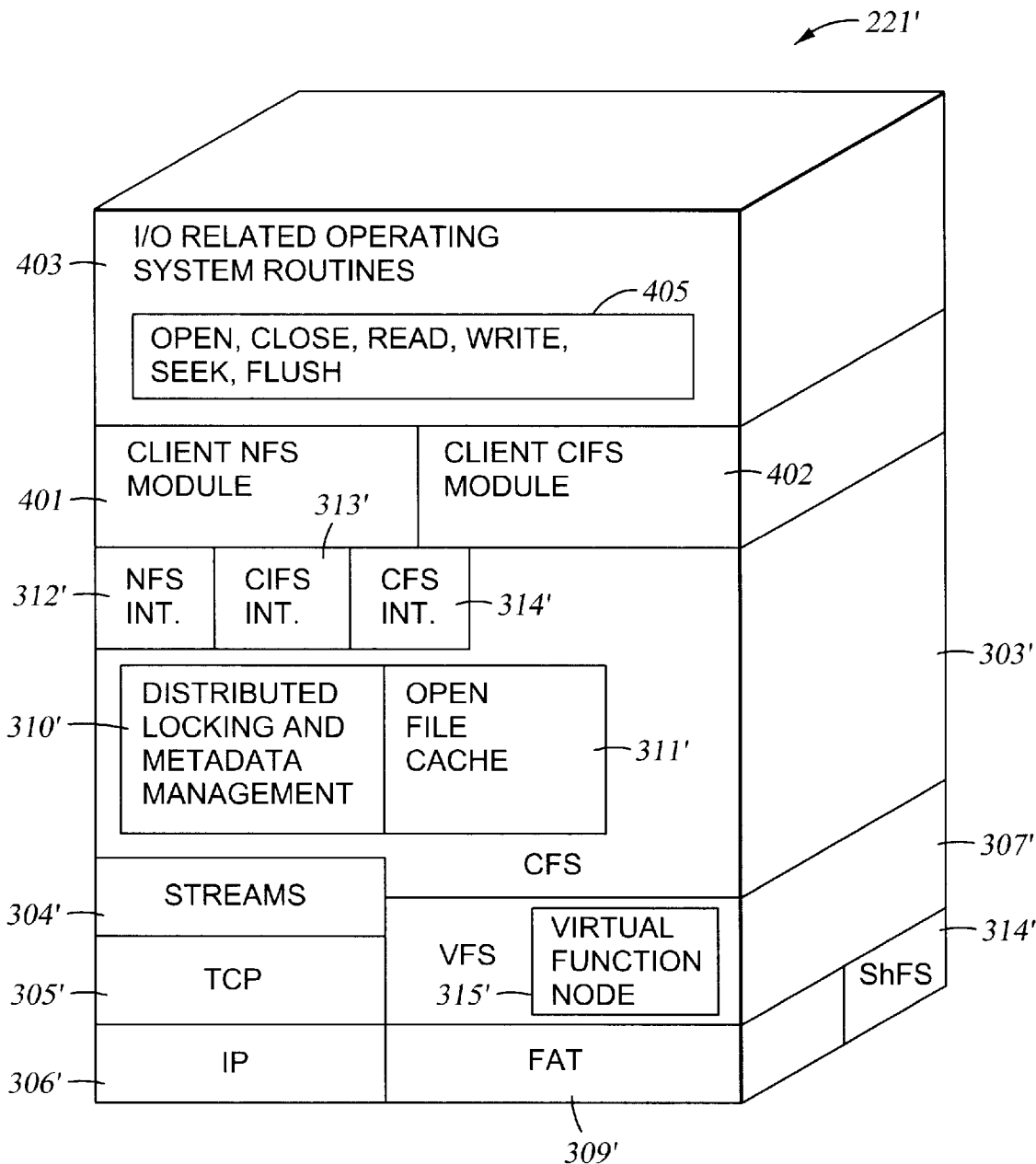
FIG. 25 is a hierarchy or layering of software modules in a client for directly accessing data in a file in network data storage.

The preferred software for the clients 64 and 65 of FIG. 3 and 88 and 89 of FIG. 4 is shown in FIG. 25. Software modules in FIG. 25 that are similar to software modules in FIG. 17 are designated with similar but primed reference numerals. The software for the clients need not include routines (such as a UFS module) used by a data mover for accessing files owned by the data mover, and the server NFS and CIFS routines used by a data mover for establishing communication with a client. The client software modules include a conventional client NFS module 401 or client CIFS module 402 for transmitting client messages to the data mover (61 in FIG. 3). The conventional client NFS module 401 or client CIFS module 402, however, does not serve as the interface between the client applications and the distributed locking and metadata management module 310'. Instead, some of the client's system call routines 403 are modified to or trap I/O related system calls. The modified routines 405 include routines for intercept the open, close, read, write, seek, and flush (i.e., commit) calls from the client's application processes. For example, the modified routines replace corresponding routines in the standard C language library, and the modified routines are dynamically linked with the application programs so that recompiling or relinking of the application programs is not necessary. These modified routines serve as an interface between the client applications and the distributed locking and metadata management module 310. When such an I/O related system call occurs, it is processed as a file access command using the procedure of FIGS. 20 and 21. Also, when the client 64, 65 in FIG. 3 would use the file access routine of FIGS. 20–21, the file access operation 354 in FIG. 20 would always involve bypassing the data mover 61 of FIG. 3, so that the client would perform the file access operation 354 of FIG. 20 by transferring execution to step 363 of FIG. 21. Moreover, execution would always pass from step 355 to step 357 for the case where the data mover 61 always owns the file to be accessed.

Figure 26:
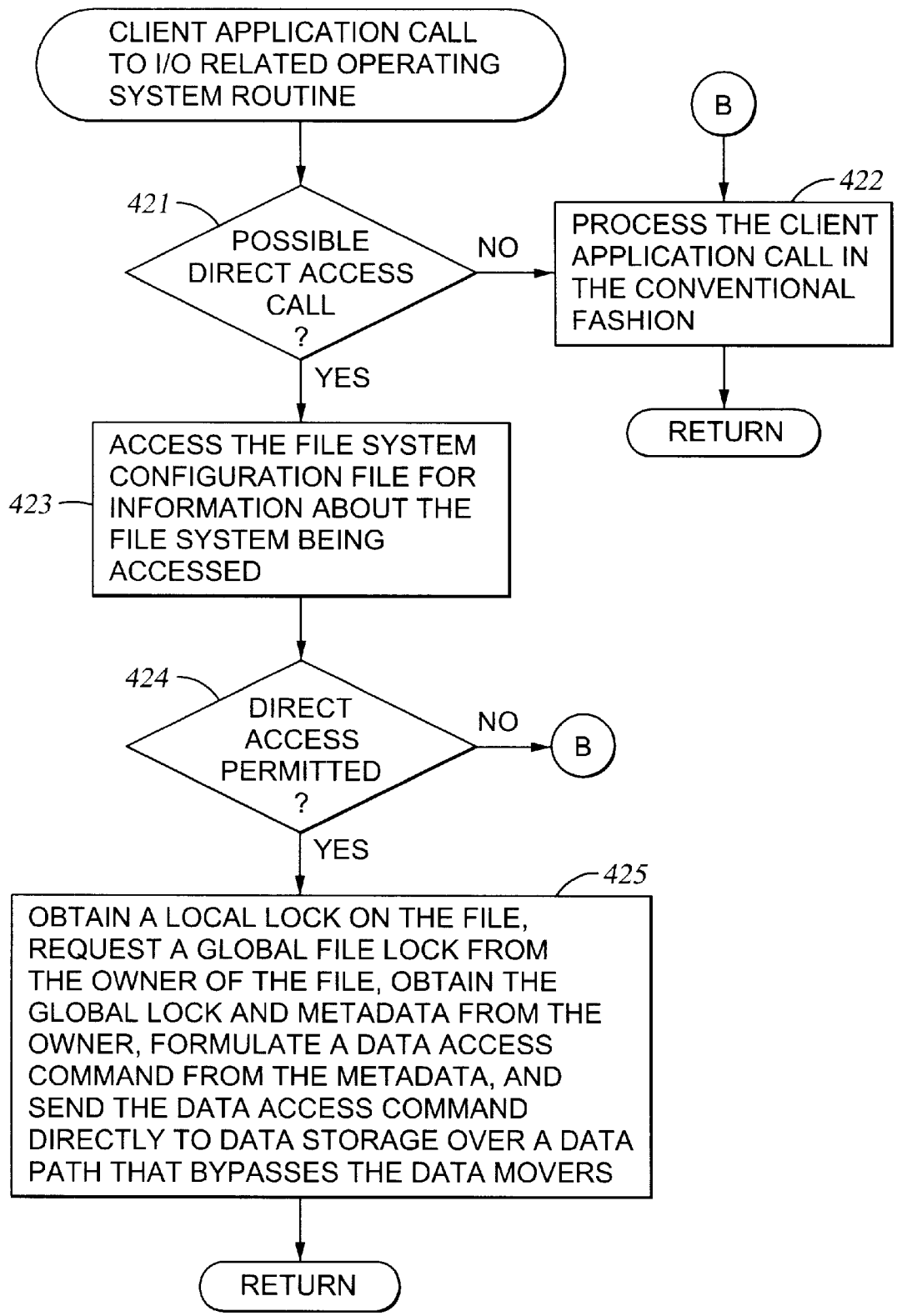
FIG. 26 is a flowchart depicting the operation of the client's operating system program that responds to storage access calls from application programs.

With reference to FIG. 26, there is shown a flowchart of the procedure followed by the client's operating system program in response to a client application call to an I/O related operating system routine. In step 421, execution branches to step 422 to process the client application call in the conventional fashion if it is not possible or desirable to process the application call by requesting the owner of the file to be access to place a lock on the file and return metadata to the client. For example. Execution branches from step 421 to step 422 unless the client application call is for an open, close, read, write, seek, or flush operation. Otherwise, execution continues from step 421 to step 423. In step 423, the operating system routine accesses the file system configuration file (395 in FIG. 24) for information about the file system being accessed. If this information indicates that the client cannot directly access the file system over a data path that bypasses the data movers, then execution branches to step 422 and the client application call is processed in the conventional fashion. Otherwise, execution continues from step 424 to step 425. In step 425, the client processes the application call by obtaining a local lock on the file, requesting a global lock from the owner of the file, obtaining the global lock and any new metadata from the owner, using the metadata to formulate a data access command, and sending the data access command directly to data storage over a data path that bypasses the data movers.

The network file server architecture of FIG. 4 allows file sharing among heterogeneous clients, and supports multiple file access protocols concurrently. The architecture permits clients using traditional file access protocols to inter-operate with clients using the new distributed locking and metadata management protocol for direct data access at the channel speed of the data storage devices. This provides a scaleable solution for full file system functionality for coexisting large and small files.

What is claimed is:

1. In a network file server system having at least a first data mover computer coupled to a data network for servicing data access requests from at least one network client, and at least a second data mover computer coupled to the first data mover computer for servicing data access requests from the first data mover computer, at least one file system in data storage being accessible to the second data mover computer, a method of operating the first data mover computer to use a connection-oriented protocol for maintaining a connection with the client for permitting the client to access the file system, said method comprising:

the first data mover computer using the connection-oriented protocol to obtain client context information and to respond to a session setup request from the client by authenticating the client, and then the first data mover computer responding to a file system connection request from the client by forwarding the client context information and the file system connection request to the second data mover computer, and then the first data mover computer maintaining a connection between the first data mover computer and the second data mover computer when the client accesses the file system and the first data mover computer passes file access requests from the client to the second data mover computer and returns responses to the file access requests from the second data mover computer to the client;

wherein each of the session setup request, the file system connection request, and the file access requests is a respective separate request from the client to the first data mover computer.

2. The method as claimed in claim 1, wherein the first data mover computer assigns a user identification number in response to the session setup request, and the first data mover computer assigns a tree identification number in response to the file system connection request.

3. The method as claimed in claim 2, wherein the second data mover computer assigns at least one file identifier in response to at least one of the file access requests passed by the first data mover computer from the client to the second data mover computer.

4. The method as claimed in claim 1, wherein the client context information forwarded from the first data mover computer to the second data mover computer includes a negotiated dialect, a user identification number, a client operating system, a connection identification number, and a maximum network packet size.

5. The method as claimed in claim 1, wherein the connection-oriented protocol is the Common Internet File System (CIFS) Protocol, and first data mover computer and the second data mover computer support the same set of CIFS dialects.

6. In a network file server system having at least a first data mover computer coupled to a data network for servicing data access requests from at least one network client, and at least a second data mover computer coupled to the first data mover computer for servicing data access requests from the first data mover computer, at least one file system in data storage being accessible to the second data mover computer, a method of operating the first data mover computer to use a connection-oriented protocol for maintaining a connection with the client for permitting the client to access the file system, said method comprising:

the first data mover computer using the connection-oriented protocol to obtain client context information and to respond to a session setup request from the client by authenticating the client, and then the first data mover computer responding to a file system connection request from the client by forwarding the client context information and the file system connection request to the second data mover computer, and then the first data mover computer maintaining a connection between the first data mover computer and the second data mover computer when the client accesses the file system and the first data mover computer passes file access requests from the client to the second data mover computer and returns responses to the file access requests from the second data mover computer to the client;

wherein the first data mover computer forwards the client context information and the file system connection request to the second data mover computer by appending the client context information to the file system connection request and forwarding the file system connection request including the appended client context information to the second data mover computer.

7. In a network file server system having at least a first data mover computer coupled to a data network for servicing data access requests from at least one network client, and at least a second data mover computer coupled to the first data mover computer for servicing data access requests from the first data mover computer, at least one file system in data storage being accessible to the second data mover computer, a method of operating the first data mover computer to use a connection-oriented protocol for maintaining a connection with the client for permitting the client to access the file system, said method comprising:

the first data mover computer using the connection-oriented protocol to obtain client context information and to respond to a session setup request from the client by authenticating the client, and then the first data mover computer responding to a file system connection request from the client by forwarding the client context information and the file system connection request to the second data mover computer, and then the first data mover computer maintaining a connection between the first data mover computer and the second data mover computer when the client accesses the file system and the first data mover computer passes file access requests from the client to the second data mover computer and returns responses to the file access requests from the second data mover computer to the client;

wherein a limited number of open connections are preallocated between the first data mover computer and the second data mover computer for the forwarding of file access requests.

8. he method as claimed in claim 7, wherein the first data mover computer responds to the file system connection request from the client by assigning one of the preallocated open connections for the forwarding of data access requests from the client for access to the file system.

9. The method as claimed in claim 7, wherein servicing of certain data access requests from clients serviced by the first data mover computer uses dedicated open connections between the first data mover computer and the second data mover computer for the forwarding of the data access requests from the first data mover computer to the second data mover computer, and wherein the first data mover computer responds to receipt of one of said certain data access requests from one of the clients serviced by the first data mover computer by dynamically assigning an open connection from a pool of pre-opened connections between the first data mover computer and the second data mover computer.

10. In a network file server system having at least a first data mover computer coupled to a data network for servicing data access requests from at least one network client, and at least a second data mover computer coupled to the first data mover computer for servicing data access requests from the first data mover computer, at least one file system in data storage being accessible to the second data mover computer, a method of operating the first data mover computer to use a connection-oriented protocol for maintaining a connection with the client for permitting the client to access the file system, said method comprising:

the first data mover computer using the connection-oriented protocol to obtain client context information and to respond to a session setup request from the client by authenticating the client, and then the first data mover computer responding to a file system connection request from the client by forwarding the client context information and the file system connection request to the second data mover computer, and then the first data mover computer maintaining a connection between the first data mover computer and the second data mover computer when the client accesses the file system and the first data mover computer passes file access requests from the client to the second data mover computer and returns responses to the file access requests from the second data mover computer to the client;

wherein multiple clients of the first data mover computer request access to file systems accessed through the second data mover computer and the multiple clients share at least one connection between the first data mover computer and the second data mover computer by allocation of virtual channels within the shared connection, and data packets of more than one of the virtual channels are multiplexed over the shared connection.

11. The method as claimed in claim 10, wherein a virtual connection for the client is established over an allocated virtual channel by the first data mover computer modifying a context identifier (Cid) field of the file system connection request from the client by inserting a context identifier (Fctx_id) for identifying context of the virtual connection in the first data mover computer, and the first data mover computer forwarding the file system connection request including the modified context identifier field over the shared connection to the second data mover computer, and wherein the first data mover computer receives from the second data mover computer a reply including a context identifier field (Cid) including a context identifier (Pctx_id) set by the second data mover computer for identifying context of the virtual connection in the second data mover computer.

12. In a network file server system having at least a first data mover computer coupled to a data network for servicing data access requests from at least one network client, and at least a second data mover computer coupled to the first data mover computer for servicing data access requests from the first data mover computer, at least one file system in data storage being accessible to the second data mover computer, a method of operating the first data mover computer to use the Common Internet File System (CIFS) Protocol for maintaining a connection with the client for permitting the client to access the file system, said method comprising:

the first data mover computer using the Common Internet File System (CIFS) Protocol to respond to a negotiate request from the client and to respond to a session setup request from the client to authenticate the client and assign a user identification for a client session, and then the first data mover computer responding to a file system connection request from the client by assigning a tree identifier and forwarding the user identification for the client session and the tree identifier and the file system connection request to the second data mover computer, and then the first data mover computer maintaining a connection between the first data mover computer and the second data mover computer when the client accesses the file system and the first data mover computer passes file access requests from the client to the second data mover computer and returns responses to the file access requests from the second data mover computer to the client;

wherein each of the session setup request, the file system connection request, and the file access requests is a respective separate request from the client to the first data mover computer.

13. The method as claimed in claim 12, wherein the second data mover computer assigns at least one file identifier in response to at least one of the file access requests passed by the first data mover computer from the client to the second data mover computer.

14. In a network file server system having at least a first data mover computer coupled to a data network for servicing data access requests from at least one network client, and at least a second data mover computer coupled to the first data mover computer for servicing data access requests from the first data mover computer, at least one file system in data storage being accessible to the second data mover computer, a method of operating the first data mover computer to use the Common Internet File System (CIFS) Protocol for maintaining a connection with the client for permitting the client to access the file system, said method comprising:

the first data mover computer using the Common Internet File System (CIFS) Protocol to respond to a negotiate request from the client and to respond to a session setup request from the client to authenticate the client and assign a user identification for a client session, and then the first data mover computer responding to a file system connection request from the client by assigning a tree identifier and forwarding the user identification for the client session and the tree identifier and the file system connection request to the second data mover computer, and then the first data mover computer maintaining a connection between the first data mover computer and the second data mover computer when the client accesses the file system and the first data mover computer passes file access requests from the client to the second data mover computer and returns responses to the file access requests from the second data mover computer to the client;

wherein the first data mover computer forwards the user identification for the client session and the tree identifier and the file system connection request to the second data mover computer by appending stream context information to the file system connection request and forwarding the file system connection request including the appended stream context information to the second data mover computer, the stream context information including the user identification for the client session, the tree identifier, a server message block (SMB) protocol dialect, a maximum SMB message packet size, and access credentials associated with the user identification.

15. The method as claimed in claim 12, wherein the first data mover computer and the second data mover computer support the same set of CIFS dialects.

16. In a network file server system having at least a first data mover computer coupled to a data network for servicing data access requests from at least one network client, and at least a second data mover computer coupled to the first data mover computer for servicing data access requests from the first data mover computer, at least one file system in data storage being accessible to the second data mover computer, a method of operating the first data mover computer to use the Common Internet File System (CIFS) Protocol for maintaining a connection with the client for permitting the client to access the file system, said method comprising:

the first data mover computer using the Common Internet File System (CIFS) Protocol to respond to a negotiate request from the client and to respond to a session setup request from the client to authenticate the client and assign a user identification for a client session, and then the first data mover computer responding to a file system connection request from the client by assigning a tree identifier and forwarding the user identification for the client session and the tree identifier and the file system connection request to the second data mover computer, and then the first data mover computer maintaining a connection between the first data mover computer and the second data mover computer when the client accesses the file system and the first data mover computer passes file access requests from the client to the second data mover computer and returns responses to the file access requests from the second data mover computer to the client;

wherein a limited number of open Transmission Control Protocol (TCP) connections are preallocated between the first data mover computer and the second data mover computer for the forwarding of file access requests.

17. The method as claimed in claim 16, wherein the first data mover computer responds to the file system connection request from the client by assigning one of the preallocated open TCP connections for the forwarding of data access requests from the client for access to the file system.

18. The method as claimed in claim 16, wherein servicing of certain data access requests from clients serviced by the first data mover computer uses dedicated open TCP connections between the first data mover computer and the second data mover computer for the forwarding of the data access requests from the first data mover computer to the second data mover computer, and wherein the first data mover computer responds to receipt of one of said certain data access requests from one of the clients serviced by the first data mover computer by dynamically assigning an open TCP connection from a pool of pre-opened TCP connections between the first data mover computer and the second data mover computer.

19. In a network file server system having at least a first data mover computer coupled to a data network for servicing data access requests from at least one network client, and at least a second data mover computer coupled to the first data mover computer for servicing data access requests from the first data mover computer, at least one file system in data storage being accessible to the second data mover computer, a method of operating the first data mover computer to use the Common Internet File System (CIFS) Protocol for maintaining a connection with the client for permitting the client to access the file system, said method comprising:

the first data mover computer using the Common Internet File System (CIFS) Protocol to respond to a negotiate request from the client and to respond to a session setup request from the client to authenticate the client and assign a user identification for a client session, and then the first data mover computer responding to a file system connection request from the client by assigning a tree identifier and forwarding the user identification for the client session and the tree identifier and the file system connection request to the second data mover computer, and then the first data mover computer maintaining a connection between the first data mover computer and the second data mover computer when the client accesses the file system and the first data mover computer passes file access requests from the client to the second data mover computer and returns responses to the file access requests from the second data mover computer to the client;

wherein multiple clients of the first data mover computer request access to file systems accessed through the second data mover computer and the multiple clients share at least one Transmission Control Protocol (TCP) connection between the first data mover computer and the second data mover computer by allocation of virtual channels within the shared TCP connection, and data packets of more than one of the virtual channels are multiplexed over the shared TCP connection.

20. The method as claimed in claim 19, wherein a virtual connection for the client is established over an allocated virtual channel by the first data mover computer modifying a context identifier (Cid) field of the file system connection request from the client by inserting a context identifier (Fctx_id) for identifying context of the virtual connection in the first data mover computer, and the first data mover computer forwarding the file system connection request including the modified context identifier field over the shared TCP connection to the second data mover computer, and wherein the first data mover computer receives from the second data mover computer a reply including a context identifier field (Cid) including a context identifier (Pctx_id) set by the second data mover computer for identifying context of the virtual connection in the second data mover computer.

21. In a network file server system having at least a first data mover computer coupled to a data network for servicing data access requests from at least one network client, and at least a second data mover computer coupled to the first data mover computer for servicing data access requests from the first data mover computer, at least one file system in data storage being accessible to the second data mover computer, a method of operating the first data mover computer to use the Common Internet File System (CIFS) Protocol for maintaining a connection with the client for permitting the client to access the file system, said method comprising:

the first data mover computer using the Common Internet File System (CIFS) Protocol to respond to a negotiate request from the client and to respond to a session setup request from the client to authenticate the client and assign a user identification for a client session, and then the first data mover computer responding to a file system connection request from the client by assigning a tree identifier and forwarding the user identification for the client session and the tree identifier and the file system connection request to the second data mover computer, and then the first data mover computer maintaining a connection between the first data mover computer and the second data mover computer when the client accesses the file system and the first data mover computer passes file access requests from the client to the second data mover computer and returns responses to the file access requests from the second data mover computer to the client;

wherein the first data mover computer forwards the user identification for the client session and the tree identifier and the file system connection request to the second data mover computer by appending stream context information to the file system connection request and forwarding the file system connection request including the appended stream context information to the second data mover computer, the stream context information including the user identification for the client session, the tree identifier, a server message block (SMB) protocol dialect, a maximum SMB message packet size, and access credentials associated with the user identification; and wherein multiple clients of the first data mover computer request access to file systems accessed through the second data mover computer and the multiple clients share at least one Transmission Control Protocol (TCP) connection between the first data mover computer and the second data mover computer by allocation of virtual channels within the shared TCP connection, and data packets of more than one of the virtual channels are multiplexed over the shared TCP connection.

22. The method as claimed in claim 21, wherein a virtual connection for the client is established over an allocated virtual channel by the first data mover computer modifying a context identifier (Cid) field of the file system connection request from the client by inserting a context identifier (Fctx_id) for identifying context of the virtual connection in the first data mover computer, and the first data mover computer forwarding the file system connection request including the modified context identifier field over the shared TCP connection to the second data mover computer, and wherein the first data mover computer receives from the second data mover computer a reply including a context identifier field (Cid) including a context identifier (Pctx_id) set by the second data mover computer for identifying context of the virtual connection in the second data mover computer.

23. A network file server comprising a first data mover computer having a port for coupling to a data network for servicing data access requests from at least one network client, and at least a second data mover computer coupled to the first data mover computer for servicing data access requests from the first data mover computer, at least one file system in data storage being accessible to the second data mover computer, wherein the first data mover computer is programmed to use a connection-oriented protocol for maintaining a connection with the client for permitting the client to access the file system, and wherein the first data mover computer is programmed for:

using the connection-oriented protocol to obtain client context information and to respond to a session setup request from the client by authenticating the client, and then responding to a file system connection request from the client by forwarding the client context information and the file system connection request to the second data mover computer, and then maintaining a connection between the first data mover computer and the second data mover computer when the client accesses the file system and the first data mover computer passes file access requests from the client to the second data mover computer and returns responses to the file access requests from the second data mover computer to the client;

wherein each of the session setup request, the file system connection request, and the file access requests is a respective separate request from the client to the first data mover computer.

24. The network file server as claimed in claim 23, wherein the first data mover computer is programmed for assigning a user identification number in response to the session setup request, and for assigning a tree identification number in response to the file system connection request.

25. The network file server as claimed in claim 23, wherein the first data mover computer is programmed for forwarding to the second data mover computer client context information including a negotiated dialect, a user identification number, a client operating system, a connection identification number, and a maximum network packet size.

26. The network file server as claimed in claim 23, wherein the first data mover computer is programmed so that the connection-oriented protocol is the Common Internet File System (CIFS) Protocol, and first data mover computer and the second data mover computer support the same set of CIFS dialects.

27. A network file server comprising a first data mover computer having a port for coupling to a data network for servicing data access requests from at least one network client, and at least a second data mover computer coupled to the first data mover computer for servicing data access requests from the first data mover computer, at least one file system in data storage being accessible to the second data mover computer, wherein the first data mover computer is programmed to use a connection-oriented protocol for maintaining a connection with the client for permitting the client to access the file system, and wherein the first data mover computer is programmed for:

using the connection-oriented protocol to obtain client context information and to respond to a session setup request from the client by authenticating the client, and then responding to a file system connection request from the client by forwarding the client context information and the file system connection request to the second data mover computer, and then maintaining a connection between the first data mover computer and the second data mover computer when the client accesses the file system and the first data mover computer passes file access requests from the client to the second data mover computer and returns responses to the file access requests from the second data mover computer to the client;

wherein the first data mover computer is programmed for forwarding the client context information and the file system connection request to the second data mover computer by appending the client context information to the file system connection request and forwarding the file system connection request including the appended client context information to the second data mover computer.

28. A network file server comprising a first data mover computer having a port for coupling to a data network for servicing data access requests from at least one network client, and at least a second data mover computer coupled to the first data mover computer for servicing data access requests from the first data mover computer, at least one file system in data storage being accessible to the second data mover computer, wherein the first data mover computer is programmed to use a connection-oriented protocol for maintaining a connection with the client for permitting the client to access the file system, and wherein the first data mover computer is programmed for:

using the connection-oriented protocol to obtain client context information and to respond to a session setup request from the client by authenticating the client, and then responding to a file system connection request from the client by forwarding the client context information and the file system connection request to the second data mover computer, and then maintaining a connection between the first data mover computer and the second data mover computer when the client accesses the file system and the first data mover computer passes file access requests from the client to the second data mover computer and returns responses to the file access requests from the second data mover computer to the client;

wherein the first data mover computer is programmed for responding to the file system connection request from the client by assigning one of a limited number of preallocated open connections for the forwarding of data access requests from the client for access to the file system.

29. A network file server comprising a first data mover computer having a port for coupling to a data network for servicing data access requests from at least one network client, and at least a second data mover computer coupled to the first data mover computer for servicing data access requests from the first data mover computer, at least one file system in data storage being accessible to the second data mover computer, wherein the first data mover computer is programmed to use a connection-oriented protocol for maintaining a connection with the client for permitting the client to access the file system, and wherein the first data mover computer is programmed for:

using the connection-oriented protocol to obtain client context information and to respond to a session setup request from the client by authenticating the client, and then responding to a file system connection request from the client by forwarding the client context information and the file system connection request to the second data mover computer, and then maintaining a connection between the first data mover computer and the second data mover computer when the client accesses the file system and the first data mover computer passes file access requests from the client to the second data mover computer and returns responses to the file access requests from the second data mover computer to the client;

wherein the first data mover computer is programmed for permitting multiple clients of the first data mover computer to share at least one connection between the first data mover computer and the second data mover computer by allocating virtual channels within the shared connection, and data packets of more than one of the virtual channels are multiplexed over the shared connection.

30. The network file server as claimed in claim 29, wherein the first data mover computer is programmed to establish a virtual connection for the client over an allocated virtual channel by modifying a context identifier (Cid) field of the file system connection request from the client by inserting a context identifier (Fctx_id) for identifying context of the virtual connection in the first data mover computer, and forwarding the file system connection request including the modified context identifier field over the shared connection to the second data mover computer, and receiving a reply from the second data mover computer, the reply including a context identifier field (Cid) including a context identifier (Pctx_id) set by the second data mover computer for identifying context of the virtual connection in the second data mover computer.

31. A program storage device containing a program for at least a first data mover computer in a network file server, the first data mover computer having a port for coupling to a data network for servicing data access requests from at least one network client, the first data mover computer being coupled to at least a second data mover computer for servicing data access requests from the first data mover computer, at least one file system in data storage being accessible to the second data mover computer, wherein the program is executable by the first data mover computer for using a connection-oriented protocol for maintaining a connection with the client for permitting the client to access the file system, and wherein the program is executable by the first data mover computer for:

using the connection-oriented protocol to obtain client context information and to respond to a session setup request from the client by authenticating the client, and then responding to a file system connection request from the client by forwarding the client context information and the file system connection request to the second data mover computer, and then maintaining a connection between the first data mover computer and the second data mover computer when the client accesses the file system and the first data mover computer passes file access requests from the client to the second data mover computer and returns responses to the file access requests from the second data mover computer to the client;

wherein each of the session setup request, the file system connection request, and the file access requests is a respective separate request from the client to the first data mover computer.

32. The program storage device as claimed in claim 31, wherein the program is executable by the first data mover computer for assigning a user identification number in response to the session setup request, and for assigning a tree identification number in response to the file system connection request.

33. The program storage device as claimed in claim 31, wherein the program is executable by the first data mover computer for forwarding to the second data mover computer client context information including a negotiated dialect, a user identification number, a client operating system, a connection identification number, and a maximum network packet size.

34. The program storage device as claimed in claim 31, wherein the program is executable by the first data mover computer so that the connection-oriented protocol is the Common Internet File System (CIFS) Protocol.

35. A program storage device containing a program for at least a first data mover computer in a network file server, the first data mover computer having a port for coupling to a data network for servicing data access requests from at least one network client, the first data mover computer being coupled to at least a second data mover computer for servicing data access requests from the first data mover computer, at least one file system in data storage being accessible to the second data mover computer, wherein the program is executable by the first data mover computer for using a connection-oriented protocol for maintaining a connection with the client for permitting the client to access the file system, and wherein the program is executable by the first data mover computer for:

using the connection-oriented protocol to obtain client context information and to respond to a session setup request from the client by authenticating the client, and then responding to a file system connection request from the client by forwarding the client context information and the file system connection request to the second data mover computer, and then maintaining a connection between the first data mover computer and the second data mover computer when the client accesses the file system and the first data mover computer passes file access requests from the client to the second data mover computer and returns responses to the file access requests from the second data mover computer to the client;

wherein the program is executable by the first data mover computer for forwarding the client context information and the file system connection request to the second data mover computer by appending the client context information to the file system connection request and forwarding the file system connection request including the appended client context information to the second data mover computer.

36. A program storage device containing a program for at least a first data mover computer in a network file server, the first data mover computer having a port for coupling to a data network for servicing data access requests from at least one network client, the first data mover computer being coupled to at least a second data mover computer for servicing data access requests from the first data mover computer, at least one file system in data storage being accessible to the second data mover computer, wherein the program is executable by the first data mover computer for using a connection-oriented protocol for maintaining a connection with the client for permitting the client to access the file system, and wherein the program is executable by the first data mover computer for:

using the connection-oriented protocol to obtain client context information and to respond to a session setup request from the client by authenticating the client, and then responding to a file system connection request from the client by forwarding the client context information and the file system connection request to the second data mover computer, and then maintaining a connection between the first data mover computer and the second data mover computer when the client accesses the file system and the first data mover computer passes file access requests from the client to the second data mover computer and returns responses to the file access requests from the second data mover computer to the client;

wherein the program is executable by the first data mover computer for responding to the file system connection request from the client by assigning one of a limited number of preallocated open connections for the forwarding of data access requests from the client for access to the file system.

37. A program storage device containing a program for at least a first data mover computer in a network file server, the first data mover computer having a port for coupling to a data network for servicing data access requests from at least one network client, the first data mover computer being coupled to at least a second data mover computer for servicing data access requests from the first data mover computer, at least one file system in data storage being accessible to the second data mover computer, wherein the program is executable by the first data mover computer for using a connection-oriented protocol for maintaining a connection with the client for permitting the client to access the file system, and wherein the program is executable by the first data mover computer for:

using the connection-oriented protocol to obtain client context information and to respond to a session setup request from the client by authenticating the client, and then responding to a file system connection request from the client by forwarding the client context information and the file system connection request to the second data mover computer, and then maintaining a connection between the first data mover computer and the second data mover computer when the client accesses the file system and the first data mover computer passes file access requests from the client to the second data mover computer and returns responses to the file access requests from the second data mover computer to the client;

wherein the program is executable by the first data mover computer for permitting multiple clients of the first data mover computer to share at least one connection between the first data mover computer and the second data mover computer by allocating virtual channels within the shared connection, and data packets of more than one of the virtual channels are multiplexed over the shared connection.

38. The program storage device as claimed in claim 37, wherein the program is executable to establish a virtual connection for the client over an allocated virtual channel by modifying a context identifier (Cid) field of the file system connection request from the client by inserting a context identifier (Fctx_id) for identifying context of the virtual connection in the first data mover computer, and forwarding the file system connection request including the modified context identifier field over the shared connection to the second data mover computer, and receiving a reply from the second data mover computer, the reply including a context identifier field (Cid) including a context identifier (Pctx_id) set by the second data mover computer for identifying context of the virtual connection in the second data mover computer.

* * * * *

UNITED STATES PATENT AND TRADEMARK OFFICE
CERTIFICATE OF CORRECTION

PATENT NO.     : 6,453,354 B1
DATED          : September 17, 2002
INVENTOR(S)    : Xiaoye Jiang et al.

Page 1 of 1

It is certified that error appears in the above-identified patent and that said Letters Patent is hereby corrected as shown below:

<u>Column 40,</u>
Line 11, change "he" to -- The --.

Signed and Sealed this

Twenty-eighth Day of January, 2003

JAMES E. ROGAN
*Director of the United States Patent and Trademark Office*